US010624024B2

(12) United States Patent
Sahin et al.

(10) Patent No.: US 10,624,024 B2
(45) Date of Patent: Apr. 14, 2020

(54) CORRELATION-ENHANCED FREQUENCY SCANNING

(71) Applicant: QUALCOMM Incorporated, San Diego, CA (US)

(72) Inventors: Mustafa Emin Sahin, San Diego, CA (US); Raghu Challa, San Diego, CA (US); Pengkai Zhao, San Jose, CA (US); Parisa Cheraghi, San Diego, CA (US); Supratik Bhattacharjee, San Diego, CA (US); Yongle Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/792,361

(22) Filed: Oct. 24, 2017

(65) Prior Publication Data

US 2019/0124586 A1    Apr. 25, 2019

(51) Int. Cl.
*H04W 48/16* (2009.01)
*H04B 17/382* (2015.01)
*H04J 11/00* (2006.01)

(52) U.S. Cl.
CPC .......... *H04W 48/16* (2013.01); *H04B 17/382* (2015.01); *H04J 11/00* (2013.01); *H04J 11/0069* (2013.01)

(58) Field of Classification Search
CPC ...... H04W 36/14; H04W 48/16; H04W 48/18
USPC ....... 455/434, 432.1, 436–439; 370/331–332
See application file for complete search history.

(56) References Cited

U.S. PATENT DOCUMENTS

| 4,912,549 A | 3/1990 | Altman et al. |
| 9,083,569 B2 * | 7/2015 | Jeon .................... H04L 27/0012 |
| 9,479,218 B2 | 10/2016 | Li et al. |
| 2006/0126491 A1 | 6/2006 | Ro et al. |
| 2008/0043858 A1 | 2/2008 | Lim et al. |

(Continued)

OTHER PUBLICATIONS

Manolakis K., et al., "A Closed Concept for Synchronization and Cell Search in 3GPP LTE Systems", IEEE Communications Society Subject Matter Experts for Publication in the WCNC, Apr. 2009, 7 pages.

(Continued)

*Primary Examiner* — Congvan Tran
(74) *Attorney, Agent, or Firm* — Holland & Hart LLP

(57) ABSTRACT

Methods, systems, and devices for wireless communications are described. An exemplary method includes receiving a signal corresponding to a frequency band, scanning for communications activity within the frequency band, wherein scanning for communications activity within the frequency band comprises performing a correlation calculation on samples of the signal, and determining whether to attempt a connection establishment within the frequency band based at least in part on the correlation calculation on samples of the signal. When the scanning identifies an indication of activity, a scanning device may attempt to establish a connection with a base station within the frequency band. When the scanning identifies an indication of no activity, a scanning device may refrain from attempting to establish a connection with a base station within the frequency band, and may perform the correlation-enhanced frequency scanning on a different frequency band.

28 Claims, 25 Drawing Sheets

(56) References Cited

U.S. PATENT DOCUMENTS

| | | | |
|---|---|---|---|
| 2013/0315213 A1 | 11/2013 | Demir et al. | |
| 2014/0066055 A1* | 3/2014 | Balakrishnan | H04W 36/14 |
| | | | 455/432.1 |
| 2014/0286190 A1* | 9/2014 | Vallabhu | H04W 52/0241 |
| | | | 370/254 |
| 2015/0078360 A1* | 3/2015 | Wang | H04W 48/18 |
| | | | 370/338 |
| 2016/0238694 A1* | 8/2016 | Kishigami | G01S 7/023 |
| 2017/0171833 A1* | 6/2017 | Vamaraju | H04W 60/04 |
| 2017/0264406 A1 | 9/2017 | Lei et al. | |

OTHER PUBLICATIONS

Sriharsha M.R., et al., "A Complete Cell Search and Synchronization in LTE", EURASIP Journal on Wireless Communications and Networking, 2017, pp. 1-14.

International Search Report and Written Opinion—PCT/US2018/056538—ISA/EPO—dated Jan. 22, 2019(174300WO).

Qualcomm Incorporated: "NB-PSS and NB-SSS Design (Revised)", 3GPP TSG RAN WG1 NB-loT Ad-Hoc Meeting, R1-161981, Mar. 22,2016, XP051081092, Retrieved from the Internet: URL:http://www.3gpp.org/ftp/tsg_ran/WG1_RL1/TSGR1_AH/LTE_NB-loT_1603/Docs/ [retrieved on Mar. 22, 2016], 24 pages.

* cited by examiner

Raw Correlation Values

Weighting Operation
610

Weighted Correlation Values

CORRELATION-ENHANCED FREQUENCY SCANNING

BACKGROUND

The following relates generally to wireless communication, and more specifically to correlation-enhanced frequency scanning.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Prior to attempting to establish a connection with a base station, a UE may perform a frequency scan (FSCAN) operation to identify candidate frequency channels for establishing a connection. According to certain legacy FSCAN operations, a UE may return 30 candidate frequency channels for each frequency band it scans. However, a UE may spend approximately 40 milliseconds on each candidate frequency channel for initial acquisition of any cell in that frequency band. In frequency bands that are not being used for active communications by a cell (e.g., an empty frequency band), an FSCAN operation may waste up to 1.2 seconds while attempting to identify candidate frequency channels within the empty frequency band.

SUMMARY

The described techniques relate to improved methods, systems, devices, and apparatuses that support correlation-enhanced frequency scanning. According to one or more aspects of the present disclosure, a UE may perform correlation-enhanced frequency scanning for communications activity within a frequency band prior to attempting to establish a connection within the frequency band (e.g., prior to performing operations associated with a legacy FSCAN procedure, attempting time or frequency synchronization, or other operations). The correlation-enhanced frequency scanning may include calculating a correlation between samples of different sampling intervals (e.g., determining whether the samples of the different sampling intervals are well-correlated), where the correlation, or lack thereof, between different sampling intervals may provide an indication of communications activity within the frequency band. When the UE identifies an indication of such activity, the UE may attempt to establish a connection with a base station within the frequency band (e.g., establishing a connection with a cell). When the UE identifies an indication of no such activity, the UE may refrain from attempting to establish a connection with a base station within the frequency band, and may perform the correlation-enhanced frequency scanning on a different frequency band. Thus, in accordance with aspects of the present disclosure, a UE may more quickly identify whether a cell is operating within a frequency band, and may avoid certain operations associated with attempting to establish a connection in an empty frequency band that may cause delays associated with establishing a connection.

A method of wireless communication is described. The method may include receiving a signal corresponding to a frequency band, performing a correlation calculation between samples of the received signal in each of a plurality of first sampling intervals and samples of the received signal in each of a respective one of a plurality of second sampling intervals, wherein each of the plurality of first sampling intervals and the respective one of the plurality of second sampling intervals is associated with a respective one of a plurality of correlation pairs, applying a weight to results of the correlation calculation for each of the plurality of correlation pairs, determining a communications activity detection metric based at least in part on the weighted results of the correlation calculation of each of the plurality of correlation pairs, and determining whether to attempt a connection establishment within the frequency band based at least in part on the communications activity detection metric.

An apparatus for wireless communication is described. The apparatus may include means for receiving a signal corresponding to a frequency band, means for performing a correlation calculation between samples of the received signal in each of a plurality of first sampling intervals and samples of the received signal in each of a respective one of a plurality of second sampling intervals, wherein each of the plurality of first sampling intervals and the respective one of the plurality of second sampling intervals is associated with a respective one of a plurality of correlation pairs, means for applying a weight to results of the correlation calculation for each of the plurality of correlation pairs, means for determining a communications activity detection metric based at least in part on the weighted results of the correlation calculation of each of the plurality of correlation pairs, and means for determining whether to attempt a connection establishment within the frequency band based at least in part on the communications activity detection metric.

Another apparatus for wireless communication is described. The apparatus may include a processor, memory in electronic communication with the processor, and instructions stored in the memory. The instructions may be executable by the processor to cause the apparatus to receive a signal corresponding to a frequency band, perform a correlation calculation between samples of the received signal in each of a plurality of first sampling intervals and samples of the received signal in each of a respective one of a plurality of second sampling intervals, wherein each of the plurality of first sampling intervals and the respective one of the plurality of second sampling intervals is associated with a respective one of a plurality of correlation pairs, apply a weight to results of the correlation calculation for each of the plurality of correlation pairs, determine a communications activity detection metric based at least in part on the weighted results of the correlation calculation of each of the plurality of correlation pairs, and determine whether to attempt a connection establishment within the frequency band based at least in part on the communications activity detection metric.

A non-transitory computer-readable medium storing code for wireless communication is described. The code may include instructions executable by a processor to receive a signal corresponding to a frequency band, perform a correlation calculation between samples of the received signal in each of a plurality of first sampling intervals and samples of the received signal in each of a respective one of a plurality of second sampling intervals, wherein each of the plurality of first sampling intervals and the respective one of the plurality of second sampling intervals is associated with a respective one of a plurality of correlation pairs, apply a weight to results of the correlation calculation for each of the plurality of correlation pairs, determine a communications activity detection metric based at least in part on the weighted results of the correlation calculation of each of the plurality of correlation pairs, and determine whether to attempt a connection establishment within the frequency band based at least in part on the communications activity detection metric.

In some examples of the method, apparatus, and non-transitory computer-readable medium, applying the weight to results of the correlation calculation for each of the plurality of correlation pairs is based at least in part on load condition associated with the respective one of the plurality of correlation pairs, a signal quality associated with the respective one of the plurality of correlation pairs, or a combination thereof.

In some examples of the method, apparatus, and non-transitory computer-readable medium, each of the plurality of correlation pairs is associated with one of a plurality of lags, each of the plurality of lags corresponding to a different sampling time shift that is shorter than a correlation period between a beginning of one of the plurality of first sampling intervals and a beginning of the respective one of the plurality of second sampling intervals associated with one of the plurality of correlation pairs.

Some examples of the method, apparatus, and non-transitory computer-readable medium may further include operations, features, means, or instructions for summing, for each of the plurality of lags, the weighted results of the correlation calculation for correlation pairs associated with the respective one of the plurality of lags, and determining the communications activity detection metric may be based at least in part on the summed correlation calculation results for each of the plurality of lags.

In some examples of the method, apparatus, and non-transitory computer-readable medium, determining the communications activity detection metric includes dividing a maximum of the summed correlation calculation results for each of the plurality of lags by an average of summed correlation calculation results for each of the plurality of lags.

In some examples of the method, apparatus, and non-transitory computer-readable medium, the communications activity detection metric may be determined to be below a communications activity detection threshold, and the method, apparatus, or non-transitory computer-readable medium may include operations, features, means, or instructions for summing, for each position of a periodic repetition, results of the correlation calculation for ones of the plurality of correlation pairs associated with the respective position, applying a comb filter to the summed results for the plurality of positions, determining a second communications activity detection metric based at least in part on the comb filtered results, and determining whether to attempt a connection establishment within the frequency band based at least in part on the second communications activity detection metric.

A method of wireless communication is described. The method may include receiving a signal corresponding to a frequency band, performing a correlation calculation between samples of the received signal in each of a plurality of first sampling intervals and samples of the received signal in each of a respective one of a plurality of second sampling intervals, wherein each of the plurality of first sampling intervals and the respective one of the plurality of second sampling intervals is associated with a respective one of a plurality of correlation pairs, summing, for each position of a periodic repetition, results of the correlation calculation for ones of the plurality of correlation pairs associated with the respective position, applying a comb filter to the summed results for the plurality of positions, determining a communications activity detection metric based at least in part on the comb filtered results, and determining whether to attempt a connection establishment within the frequency band based at least in part on the communications activity detection metric.

An apparatus for wireless communication is described. The apparatus may include means for receiving a signal corresponding to a frequency band, means for performing a correlation calculation between samples of the received signal in each of a plurality of first sampling intervals and samples of the received signal in each of a respective one of a plurality of second sampling intervals, wherein each of the plurality of first sampling intervals and the respective one of the plurality of second sampling intervals is associated with a respective one of a plurality of correlation pairs, means for summing, for each position of a periodic repetition, results of the correlation calculation for ones of the plurality of correlation pairs associated with the respective position, means for applying a comb filter to the summed results for the plurality of positions, means for determining a communications activity detection metric based at least in part on the comb filtered results, and means for determining whether to attempt a connection establishment within the frequency band based at least in part on the communications activity detection metric.

Another apparatus for wireless communication is described. The apparatus may include a processor, memory in electronic communication with the processor, and instructions stored in the memory. The instructions may be executable by the processor to cause the apparatus to receive a signal corresponding to a frequency band, perform a correlation calculation between samples of the received signal in each of a plurality of first sampling intervals and samples of the received signal in each of a respective one of a plurality of second sampling intervals, wherein each of the plurality of first sampling intervals and the respective one of the plurality of second sampling intervals is associated with a respective one of a plurality of correlation pairs, sum, for each position of a periodic repetition, results of the correlation calculation for ones of the plurality of correlation pairs associated with the respective position, apply a comb filter to the summed results for the plurality of positions, determine a communications activity detection metric based at least in part on the comb filtered results, and determine whether to attempt a connection establishment within the frequency band based at least in part on the communications activity detection metric.

A non-transitory computer-readable medium storing code for wireless communication is described. The code may include instructions executable by a processor to receive a signal corresponding to a frequency band, perform a correlation calculation between samples of the received signal in each of a plurality of first sampling intervals and samples of the received signal in each of a respective one of a plurality of second sampling intervals, wherein each of the plurality of first sampling intervals and the respective one of the plurality of second sampling intervals is associated with a respective one of a plurality of correlation pairs, sum, for each position of a periodic repetition, results of the correlation calculation for ones of the plurality of correlation pairs associated with the respective position, apply a comb filter to the summed results for the plurality of positions, determine a communications activity detection metric based at least in part on the comb filtered results, and determine whether to attempt a connection establishment within the frequency band based at least in part on the communications activity detection metric.

In some examples of the method, apparatus, and non-transitory computer-readable medium, each of the plurality of correlation pairs is associated with one of a plurality of lags, each of the plurality of lags corresponding to a different sampling time shift that is shorter than a correlation period between a beginning of one of the plurality of first sampling intervals and a beginning of the respective one of the plurality of second sampling intervals associated with one of the plurality of correlation pairs. In some examples the summing may include operations, features, means, or instructions for summing, for each of the plurality of lags, results of the correlation calculation associated with the respective one of the plurality of lags.

In some examples of the method, apparatus, and non-transitory computer-readable medium, the periodic repetition may correspond to a slot duration having a plurality of OFDMA symbol durations, each position corresponding to a different one of the plurality of OFDMA symbol durations, and the comb filter may be configured according to a cell-specific reference signal (CRS) transmission pattern of a cell having slot-level periodicity.

In some examples of the method, apparatus, and non-transitory computer-readable medium, the periodic repetition may correspond to a frame duration having a plurality of subframe durations, each position corresponding to a different one of the plurality of subframe durations, and the comb filter may be configured according to an uplink/downlink (UL/DL) time division duplexing (TDD) configuration having frame-level periodicity.

A method of wireless communication is described. The method may include receiving a signal corresponding to a frequency band, scanning for communications activity within the frequency band, wherein scanning for communications activity within the frequency band includes performing a correlation calculation on samples of the signal, and determining whether to attempt a connection establishment within the frequency band based at least in part on the correlation calculation on samples of the signal.

An apparatus for wireless communication is described. The apparatus may include means for receiving a signal corresponding to a frequency band, means for scanning for communications activity within the frequency band, wherein scanning for communications activity within the frequency band includes performing a correlation calculation on samples of the signal, and means for determining whether to attempt a connection establishment within the frequency band based at least in part on the correlation calculation on samples of the signal.

Another apparatus for wireless communication is described. The apparatus may include a processor, memory in electronic communication with the processor, and instructions stored in the memory. The instructions may be executable by the processor to cause the apparatus to receive a signal corresponding to a frequency band, scan for communications activity within the frequency band, wherein scanning for communications activity within the frequency band includes performing a correlation calculation on samples of the signal, and determine whether to attempt a connection establishment within the frequency band based at least in part on the correlation calculation on samples of the signal.

A non-transitory computer-readable medium storing code for wireless communication is described. The code may include instructions executable by a processor to receive a signal corresponding to a frequency band, scan for communications activity within the frequency band, wherein scanning for communications activity within the frequency band includes performing a correlation calculation on samples of the signal, and determine whether to attempt a connection establishment within the frequency band based at least in part on the correlation calculation on samples of the signal.

In some examples of the method, apparatus, and non-transitory computer-readable medium, scanning for communications activity within the frequency band includes operations, features, means, or instructions for performing the correlation calculation between samples of each of a plurality of first sampling intervals and samples of a respective one of a plurality of second sampling intervals, and each of the plurality of first sampling intervals and the respective one of the plurality of second sampling intervals may be associated with a respective one of a plurality of correlation pairs.

In some examples of the method, apparatus, and non-transitory computer-readable medium, scanning for communications activity within the frequency band may include operations, features, means, or instructions for applying a weight to results of the correlation calculation associated with each of the plurality of correlation pairs, where the weight is based at least in part on load condition associated with the respective one of the plurality of correlation pairs, a signal quality associated with the respective one of the plurality of correlation pairs, or a combination thereof.

In some examples of the method, apparatus, and non-transitory computer-readable medium, each of the plurality of correlation pairs is associated with one of a plurality of lags, each of the plurality of lags corresponding to a different sampling time shift that may be shorter than a correlation period between a beginning of one of the plurality of first sampling intervals and a beginning of the respective one of the plurality of second sampling intervals associated with one of the plurality of correlation pairs.

In some examples of the method, apparatus, and non-transitory computer-readable medium, scanning for communications activity within the frequency band includes operations, features, means, or instructions for summing, for each of the plurality of lags, the results of the correlation calculation for correlation pairs associated with the respective one of the plurality of lags, and determining the communications activity detection metric may be based at least in part on the summed correlation calculation results for each of the plurality of lags.

In some examples of the method, apparatus, and non-transitory computer-readable medium, scanning for communications activity within the frequency band includes operations, features, means, or instructions for determining a detection metric by dividing a maximum of the summed correlation calculation results for each of the plurality of lags by an average of summed correlation calculation results for each of the plurality of lags, and determining a first indication of communications activity within the frequency band based at least in part on the detection metric.

In some examples of the method, apparatus, and non-transitory computer-readable medium, the first indication of communications activity within the frequency band does not indicate activity within the frequency band, and scanning for communications activity within the frequency band may include operations, features, means, or instructions for processing, according to a plurality of correlation windows, results of performing the correlation calculation between the samples of each of the plurality of first sampling intervals and the samples of the respective one of the plurality of second sampling intervals, applying a comb filter to the results processed according to the plurality of correlation windows, and determining a second indication of communications activity within the frequency band based at least in part on the comb filtered results.

In some examples of the method, apparatus, and non-transitory computer-readable medium, receiving the signal corresponding to the frequency band includes receiving the signal via a plurality of antennas, and the method, apparatus, or non-transitory computer-readable medium may include operations, features, means, or instructions for summing, for each of the plurality of lags, the results of the correlation calculation includes summing results of the correlation calculation for correlation pairs for each of the plurality of antennas.

In some examples of the method, apparatus, and non-transitory computer-readable medium, receiving the signal corresponding to the frequency band includes receiving the signal across a plurality of correlation windows that may be consecutive in the time domain, and summing, for each of the plurality of lags, the results of the correlation calculation includes operations, features, means, or instructions for summing results of the correlation calculation for correlation pairs for each of the plurality of correlation windows.

In some examples of the method, apparatus, and non-transitory computer-readable medium, scanning for communications activity within the frequency band includes operations, features, means, or instructions for processing, according to a plurality of correlation windows that are consecutive in the time domain, results of performing the correlation calculation between the samples of each of the plurality of first sampling intervals and the samples of a respective one of the plurality of second sampling intervals, and applying a comb filter to the results processed according to the plurality of correlation windows. In various examples the comb filter may be configured according to a timing of CRS transmissions, or the comb filter may be configured according to one or more UL/DL TDD configurations.

Some examples of the method, apparatus, and non-transitory computer-readable medium may include operations, features, means, or instructions for applying the comb filter after determining an initial indication of inactivity on the frequency band.

In some examples of the method, apparatus, and non-transitory computer-readable medium, scanning for communications activity within the frequency band includes determining a detection metric for each of a plurality of positions of the comb filter, and determining the detection metric includes dividing a result of the correlation calculation for the respective one of the plurality of positions of the comb filter by an average result of the correlation calculation for the plurality of positions of the comb filter, and determining an indication of communications activity within the frequency band based at least in part on a maximum detection metric from the detection metrics determined for each the plurality of positions of the comb filter.

In some examples of the method, apparatus, and non-transitory computer-readable medium, for each of the plurality of correlation pairs, a beginning of the respective one of the plurality of first sampling intervals and a beginning of the respective one of the plurality of second sampling intervals may be separated in time by a correlation period equal to a cyclic prefix repetition period.

In some examples of the method, apparatus, and non-transitory computer-readable medium, scanning for communications activity within the frequency band includes operations, features, means, or instructions for generating the samples of each of the plurality of first sampling intervals to span a sampling frequency bandwidth, and generating the samples of each of the plurality of second sampling intervals to span the sampling frequency bandwidth. In some examples of the method, apparatus, and non-transitory computer-readable medium, the sampling frequency bandwidth is greater than a bandwidth of a sub carrier.

In some examples of the method, apparatus, and non-transitory computer-readable medium, determining whether to attempt a connection establishment within the frequency band includes determining to not attempt a connection establishment within the frequency band, and the method, apparatus, or non-transitory computer-readable medium may include operations, features, means, or instructions for receiving a second signal corresponding to a second frequency band, scanning for communications activity within the second frequency band, wherein scanning for communications activity within the second frequency band includes performing the correlation calculation on samples of the second signal, and determining whether to attempt a connection establishment within the second frequency band based at least in part on the correlation calculation on samples of the second signal.

In some examples of the method, apparatus, and non-transitory computer-readable medium, determining whether to attempt a connection establishment within the frequency band includes determining to attempt a connection establishment within the frequency band, and the method, apparatus, or non-transitory computer-readable medium may include operations, features, means, or instructions for attempting to establish a connection with a base station over a channel within the frequency band.

In some examples of the method, apparatus, and non-transitory computer-readable medium, determining whether to perform a connection establishment within the frequency band includes determining a candidate list of frequency channels for attempting to establish a connection with a base station within the frequency band.

In some examples of the method, apparatus, and non-transitory computer-readable medium, attempting to establish a connection with the base station over the channel within the frequency band includes performing a synchronization with the base station.

DETAILED DESCRIPTION

Figure 1:
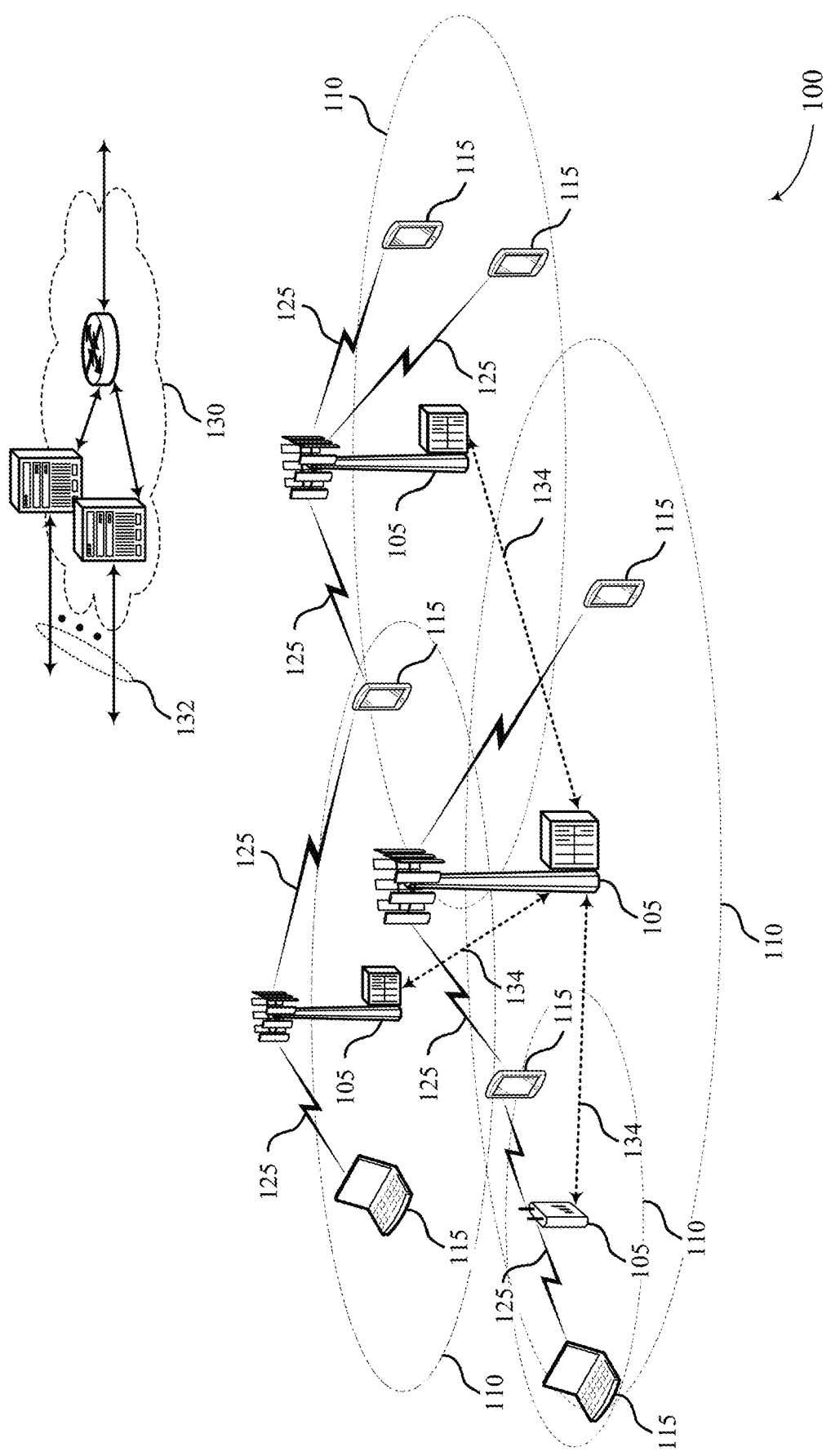
FIG. 1 illustrates an example of a system for wireless communication that supports correlation-enhanced frequency scanning, in accordance with aspects of the present disclosure.

The described techniques relate to improved methods, systems, devices, and apparatuses that support correlation-enhanced frequency scanning. According to one or more aspects of the present disclosure, a UE may perform correlation-enhanced frequency scanning for communications activity within a frequency band prior to attempting to establish a connection within the frequency band (e.g., prior to performing an FSCAN procedure, attempting time or frequency synchronization, or other operations). The correlation-enhanced frequency scanning may include calculating a correlation between samples of different sampling intervals (e.g., determining whether the samples of different sampling intervals are well-correlated), where the correlation, or lack thereof, between the first sampling interval and the second sampling interval may provide an indication of communications activity within the frequency band. When the UE identifies an indication of such activity, the UE may attempt to establish a connection with a base station within the frequency band. When the UE identifies an indication of no such activity, the UE may refrain from attempting to establish a connection with a base station within the frequency band, and may perform the correlation-enhanced frequency scanning on a different frequency band. Thus, in accordance with aspects of the present disclosure, a UE may more quickly identify whether a cell is operating within a frequency band, and may avoid certain operations associated with attempting to establish a connection in an empty frequency band that may cause delays associated with establishing a connection.

In some examples, frequency bands and frequency channels may arranged according to Evolved Universal Terrestrial Access (E-UTRA) standards. For example, portions of a radio frequency spectrum band may be identified by a E-UTRA band number, which may be associated with various characteristics of the portion of the radio frequency spectrum band such as a nominal frequency, a bandwidth, a common name, a duplex mode, uplink and downlink partitions, duplex spacing, and frequency channel bandwidths. Particular channels within a frequency band may be associated with an E-UTRA absolute radio frequency channel number (EARFCN), which may identify a particular frequency carrier. A frequency carrier may be further divided into subcarriers, each of which may carry the transmission of particular OFDMA symbols.

In one example, the correlation-enhanced frequency scanning may leverage the repetitive characteristics of cyclic prefix (CP) transmission, where a CP is a copy of the last portion of an OFDMA symbol that is appended to the beginning of the OFDMA symbol. In such an example, the first and second sampling intervals of a correlation pair may each have a duration that is less than or equal to a CP duration, and may be separated in time by a CP repetition period. Accordingly, the correlation-enhanced frequency scanning may include performing a correlation calculation between the first and second sampling intervals of a correlation pair to evaluate whether CP transmissions and their counterparts at the end of OFDMA symbols are present within the frequency band, which may provide an indication of whether a cell is operating within the frequency band.

In some examples of the correlation-enhanced frequency scanning, samples of the sampling intervals may be generated according to a bandwidth that is wider than a subcarrier, and therefore may include multiple OFDMA symbol transmissions in the frequency domain. Further, in some examples the samples of the sampling intervals may be generated according to a bandwidth that is wider than a bandwidth of a frequency channel, and therefore may support scanning multiple frequency channels signals in the frequency domain. In other words the samples generated to perform the correlation-enhanced frequency scanning may be a sum of sinusoids that may otherwise appear random in nature, similar to noise. However, the sum of sinusoids may be well-correlated between certain sampling intervals as a result of the repetitive nature of OFDMA symbol transmissions.

In various examples, the samples of the correlation-enhanced frequency scanning may be generated to span a system bandwidth of a corresponding to a portion of an E-UTRA band (e.g., a system bandwidth of 1.4 MHz, 3 MHz, 5 MHz, 10 MHz, 15 MHz, 20 MHz, 40 MHz, 80 MHz, or others), as compared with a channel frequency bandwidth (e.g., a frequency carrier bandwidth of 180 kHz according to certain EARFCNs), and a subcarrier bandwidth (e.g., a subcarrier bandwidth of 15 kHz). According to one illustrative example, the correlation-enhanced frequency scanning may simultaneously scan for communications activity across a 5 MHz system bandwidth that includes 25 frequency channels (e.g., 25 resource blocks in the frequency domain), based on an indication of CP transmission activity that may be included in OFDMA symbols transmitted across over 300 subcarriers. Thus, the correlation-enhanced frequency scanning may leverage known repetitive characteristics of CP signals in the time domain, but may scan across a significantly wider bandwidth than a single OFDMA symbol associated with a single CP transmission.

Because a device performing the correlation-enhanced frequency scanning may not be synchronized with OFDMA symbol transmissions (e.g., may not have performed time of frequency synchronization with a cell), the correlation calculation of the correlation-enhanced frequency scanning may be repeated for correlation pairs having various shifts in time, which may be referred to as "lags." Each of the lags may correspond to a different sampling time shift, and may be configured such that one of the lags is most likely to be aligned with a repetitive transmission of CP signals by a cell. The lag with the most favorable alignment with OFDMA symbol transmission may be identified by signal processing techniques such as maximum ratio combining (MRC) as described herein. For example, MRC may include identifying a particular lag that is associated with a highest correlation, and identifying communications activity based at least in part on the identified lag when the ratio of the highest correlation to the average correlation across all lags exceeds a threshold.

In some examples, detecting a presence of communications activity based on an indication of CP signal transmission may be more difficult when performing the correlation-enhanced frequency scanning in an area with relatively low downlink communications traffic from a cell, or in an area of a cell that supports a relatively high proportion of uplink traffic compared with downlink traffic (e.g., because the cell may be transmitting fewer OFDMA symbols associated with CP signals). Thus, the correlation-enhanced frequency scanning may be further improved by applying comb filtering as described herein, which may amplify the detection of CP signal activity according to other known repetitive characteristics of communications activity. For example, a comb filter may be configured according to transmission pattern of a CRS, in order to amplify the detection of OFDMA symbols associated with CRS transmissions that occur even when there is no downlink traffic in the cell. Additionally or alternatively, a comb filter may be configured according to transmission patterns of one or more UL/DL TDD configurations, in order to amplify the detection of OFDMA symbols associated with DL signal patterns of the one or more UL/DL TDD configurations (e.g., according to normal DL traffic in a particular UL/DL TDD configuration, or according to signals not necessarily associated with DL traffic such as CRS symbols in a particular UL/DL TDD configuration).

Thus, in accordance with aspects of the present disclosure, the correlation-enhanced frequency scanning may support a binary decision about the existence of communications activity (e.g., an LTE signal) within the scanned portion of the band, which may be characterized by a high probability of detection ($P_d$) and low probability of false alarm ($P_{fa}$). When the correlation-enhanced frequency scanning indicates that the scanned frequency band contains no communications activity (e.g., no LTE signals that would include CP transmission), the candidate frequency channels (e.g., candidate EARCFNs) within the frequency band that would have otherwise been detected by FSCAN for that portion of the band may be filtered out, and the device performing the scanning may switch to a different frequency band (e.g., a different E-UTRA band number, or a different portion of an E-UTRA band number) for attempting to establish a connection. Each candidate frequency channel that is filtered out in this manner may provide a time savings of 40 milliseconds as compared with a legacy FSCAN procedure performed in an empty frequency band. For example, if the correlation-enhanced frequency scanning indicates no communications activity for any portion of a certain frequency band, that band can be considered as empty, which may save a total of 1.2 seconds of an unsuccessful FSCAN in an empty frequency band. When the correlation-enhanced frequency scanning indicates that the scanned frequency band contains communications activity (e.g., a presence LTE signals that would include CP transmission), the device performing the scanning may proceed with attempting to establish a connection within the scanned frequency band (e.g., proceeding with aspects of a legacy FSCAN, performing time or frequency synchronization with a serving cell, and others).

Aspects of the disclosure are initially described in the context of a wireless communications system. Aspects of the disclosure are further illustrated by and described with reference to illustrated transmission and sampling arrangements, simulated scanning correlations, apparatus diagrams, system diagrams, and flowcharts that relate to correlation-enhanced frequency scanning.

FIG. 1 illustrates an example of a wireless communications system 100 that supports correlation-enhanced frequent scanning, in accordance with aspects of the present disclosure. The wireless communications system 100 includes base stations 105, UEs 115, and a core network 130. In some examples, the wireless communications system 100 may be an LTE network, an LTE-A network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

According to one or more aspects of the present disclosure, a UE 115 may perform correlation-enhanced frequency scanning for communications activity within a frequency band prior to attempting to establish a connection within the frequency band (e.g., prior to performing operations associated with a legacy FSCAN procedure, attempting time or frequency synchronization, or other operations). The correlation-enhanced frequency scanning may include calculating a correlation between samples of different sampling intervals (e.g., determining whether the samples of different sampling intervals are well-correlated), where the correlation, or lack thereof, between the first sampling interval and the second sampling interval may provide an indication of communications activity within the frequency band. When the UE 115 identifies an indication of such activity, the UE 115 may attempt to establish a connection with a base station within the frequency band. When the UE 115 identifies an indication of no such activity, the UE 115 may refrain from attempting to establish a connection with a base station within the frequency band, and may perform the correlation-enhanced frequency scanning on a different frequency band. Thus, in accordance with aspects of the present disclosure, a UE 115 may more quickly identify whether a cell is operating within a frequency band, and may avoid certain operations associated with attempting to establish a connection in an empty frequency band that may cause delays associated with establishing a connection.

Figure 2:
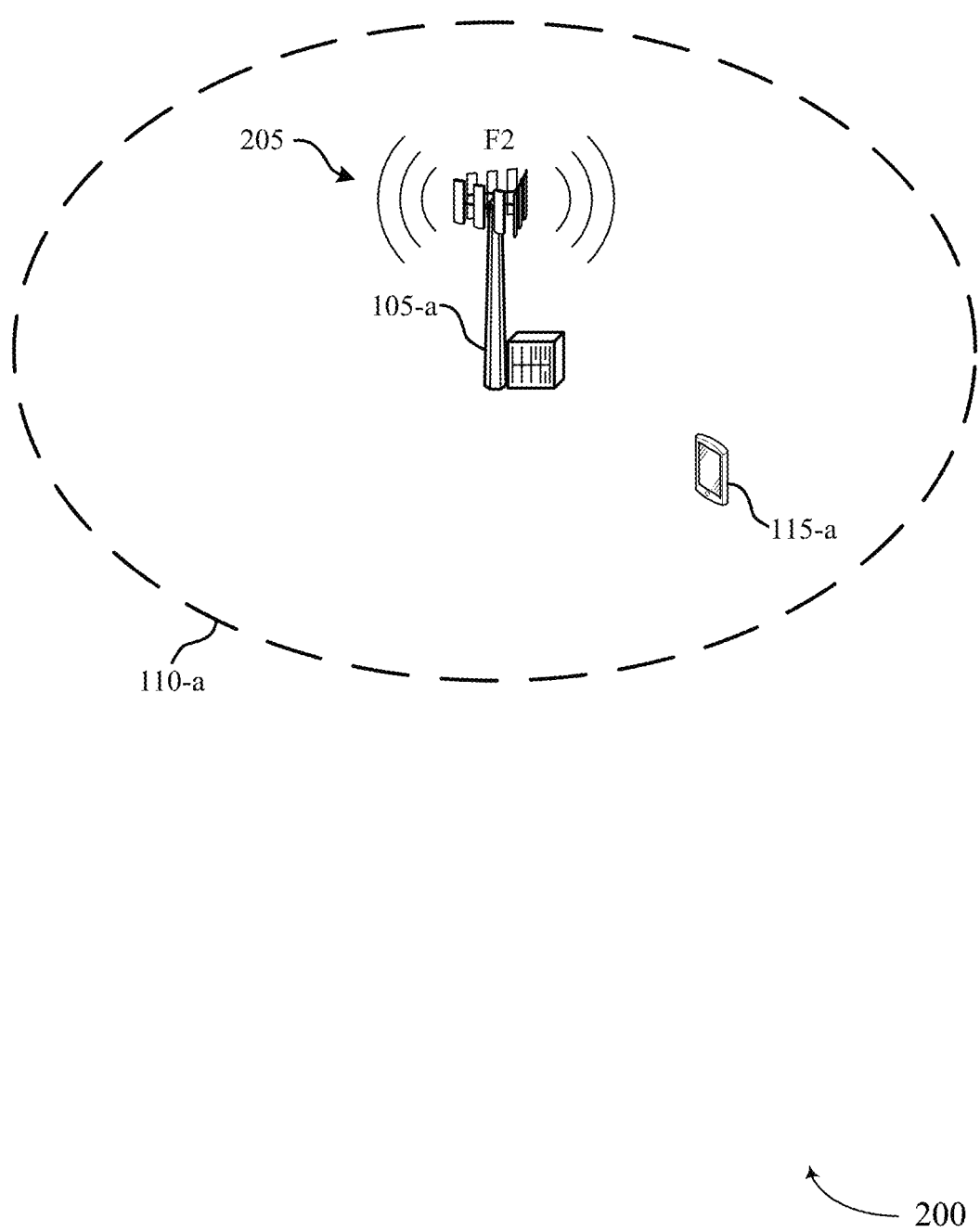
FIG. 2 illustrates an example of a wireless communications system that supports correlation-enhanced frequency scanning, in accordance with aspects of the present disclosure.

FIG. 2 illustrates an example of a wireless communications system 200 that supports correlation-enhanced frequency scanning in accordance with aspects of the present disclosure. In some examples, wireless communications system 200 may implement aspects of wireless communications system 100. The wireless communications system 200 may include a base station 105-a, which is operating in a frequency band F2 (e.g., according to a system bandwidth of 1.4 MHz, 3 MHz, 5 MHz, 10 MHz, 15 MHz, 20 MHz, 40 MHz, 80 MHz, or others). The wireless communications system 200 may also include a UE 115-a, within the geographic coverage area 110-a of the base station 105-a, that is attempting to establish a connection.

In accordance with aspects of the present disclosure, the UE 115-a may perform a correlation-enhanced frequency scanning procedure prior to attempting to establish a connection with a base station. For example, the UE 115-a may perform such scanning within a frequency band F1 (e.g., according to a system bandwidth of 1.4 MHz, 3 MHz, 5 MHz, 10 MHz, 15 MHz, 20 MHz, 40 MHz, 80 MHz, or others), which may include various correlation calculations, and subsequent weighting, summing, filtering, and other processing operations including those described herein. Because the frequency band F1 is not associated with communications activity in the example of wireless communications system 200, the performed correlation-enhanced frequency scanning may indicate a lack of communications activity within frequency band F1, and the UE 115-a may accordingly refrain from attempting to establish a connection within frequency band F1 (e.g., refraining from performing an FSCAN procedure within frequency band F1, refraining from performing time or frequency synchronization within frequency band F1, and others). In one example, by refraining from performing an FSCAN procedure, the UE 115-a may save 1.2 seconds that may have otherwise been spent on performing an FSCAN procedure on the empty frequency band F1.

Following the correlation-enhanced frequency scanning on frequency band F1, indicating a lack of communications activity on frequency band F1, the UE 115-a may perform the correlation-enhanced frequency scanning on frequency band F2. Because the frequency band F2 is associated with communications activity by the base station 105-a in the example of wireless communications system 200, the performed correlation-enhanced frequency scanning may indicate a presence of communications activity within the frequency band F2, and the UE 115-a may accordingly proceed with attempting to establish a connection within frequency band F2 (e.g., performing an FSCAN procedure within frequency band F2, identifying candidate EARFCNs within the frequency band, performing time or frequency synchronization within frequency band F2, and others).

In some examples a candidate EARFCN may span across two correlation-enhanced frequency scans (e.g., when the scanning is performed over two, overlapping frequency bands, or when the scanning is performed over two non-overlapping frequency bands that each include a portion of the bandwidth of the candidate EARFCN). In such examples, the correlation-enhanced frequency scanning for the frequency band that covers more than half of the signal may be taken into account by a subsequent FSCAN operation. For example, if the correlation-enhanced frequency scan for a frequency band includes more than half the bandwidth of a candidate frequency channel, and the scan indicates a lack of activity, the candidate frequency channel may not be included in a subsequent FSCAN operation. If the correlation-enhanced frequency scan for a frequency band includes more than half the bandwidth of a candidate frequency channel, and the scan indicates a presence of activity, the candidate frequency channel may be included in a subsequent FSCAN operation. If a bandwidth of a candidate frequency channel is split in half between two correlation-enhanced frequency scans (e.g., 50% in a first scanned frequency band, and 50% in a second scanned frequency band), and the scanning indicates communications activity in one frequency band but not in the other, that candidate may not be discarded (e.g., a subsequent FSCAN procedure may include the split candidate frequency channel).

In some examples the correlation-enhanced frequency scanning may leverage known, repetitive transmission characteristics associated with signaling of a communications protocol. For example, the base station 105-a may be transmitting a transmission 205 within the frequency band F2, and the transmission 205 may be include the transmission of OFDMA symbols, including CP signals and their respective counterparts, over one or more subcarriers within the frequency band F2. The correlation-enhanced frequency scanning may employ the repetitive characteristics of CP transmission by generating samples for a first sampling interval and a second sampling interval, each having a duration that is less than or equal to a CP duration, and separated in time by a CP repetition period. The samples may be generated to span a bandwidth that is greater than a bandwidth of a single subcarrier, such that the samples may span more than one OFDMA symbol in the frequency domain. Thus, the correlation-enhanced frequency scanning may support the identification of communications activity within the frequency band F2 without specifically identifying a particular CP signal, while also scanning a significantly wider bandwidth.

To support such scanning without the need for time or frequency synchronization, the correlation calculations may be repeated for various shifts in sampling times, referred to herein as lag periods. The correlation-enhanced frequency scanning may be further improved by applying comb filtering, which may amplify the detection of CP signal activity according to other known repetitive characteristics of communications activity (e.g., irregular repetitions such as CRS transmission, UL/DL TDD configurations, and others). Thus, in accordance with various aspects of the present disclosure, a correlation-enhanced frequency scanning may support an evaluation of whether a frequency band is being used for active communications, prior to performing other operations associated with establishing a connection, to reduce time that would be otherwise wasted when performing such operations in an empty frequency band.

Figure 3:
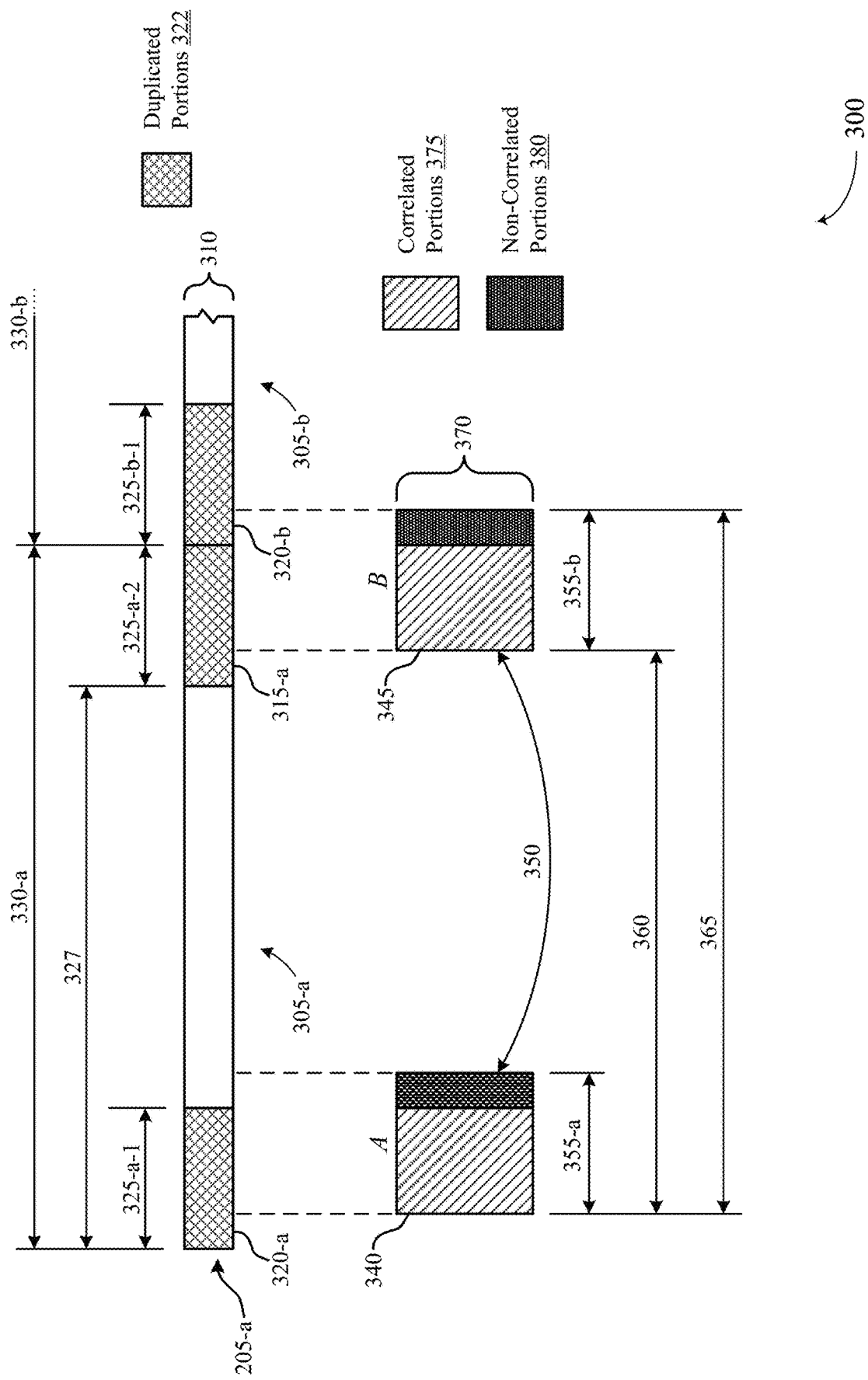
FIG. 3 illustrates an example of a transmission and sampling arrangement that supports correlation-enhanced frequency scanning, in accordance with aspects of the present disclosure.

FIG. 3 illustrates an example of a transmission and sampling arrangement 300 that supports correlation-enhanced frequency scanning in accordance with aspects of the present disclosure. In some examples, aspects of the transmission and sampling arrangement 300 may be implemented by wireless communications systems 100 or 200.

The transmission and sampling arrangement 300 may include a transmission 205-a including a sequence of OFDMA symbols 305 (e.g., OFDMA symbols 305-a and 305-b) each including a CP 320. For example, as illustrated, the OFDMA symbol 305-a may include a CP 320-a, which may be a duplication of a last portion 315-a of the OFDMA symbol 305-a, and appended to the beginning of the OFDMA symbol 305-a (e.g., CP 320-a and last portion 315-a may contain duplicated portions 322). The OFDMA symbol 305-b may include a CP 320-b, which may be a duplication of a last portion 315-b (not shown) of the OFDMA symbol 305-b, and appended to the beginning of the OFDMA symbol 305-b (e.g., CP 320-b and last portion 315-b, not shown, may contain duplicated portions 322, which may be different from the duplicated portions 322 associated with the OFDMA symbol 305-a).

The OFDMA symbols 305 of the transmission 205-a may be transmitted on a frequency subcarrier having a bandwidth 310 (e.g., a subcarrier bandwidth of 15 kHz). Although only a single sequence of OFDMA symbols in the frequency domain (e.g., transmission of a single frequency subcarrier) is illustrated, a transmission 205 may include a plurality of OFDMA symbols 305 in the frequency domain (e.g., transmission spanning one or more frequency carriers, each including a plurality of frequency subcarriers, which may each be associated with an EARFCN). In such cases, the transmission of OFDMA symbols 305 across the plurality of subcarriers, and therefore the transmission of CPs 320 across the plurality of subcarriers, may be aligned in time. In other words, a transmission 205 may include a plurality of subcarriers in the frequency domain that each transmit OFDMA symbols 305 according to the same timing, and accordingly, in aggregate, include a sum of sinusoidal signals containing duplicated portions according to characteristics of CP timing.

The transmission 205-a may include known repetitive characteristics associated with a communications protocol. For example, CPs 320 may be generated according to a known duration, or one of a set of known durations, and therefore contain the same information as a known duration of a last portion 315 of an OFDMA symbol 305. For example, the CP 320-a may have a CP duration 325-a-1, which is equal to a CP duration 325-a-2 of the last portion 315-a of the OFDMA symbol 305-a that correlates with the CP 320-a. The time between a last portion 315 of an OFDMA symbol 305 and an associated CP 320 of the symbol may be referred to as a CP repetition period 327, which may represent the time between a beginning of a CP 320 and a beginning of a last portion 315 of the OFDMA symbol 305. The total duration of an OFDMA symbol 305, including the associated CP 320, may be referred to as an OFDMA symbol duration 330 (e.g., OFDMA symbol duration 330-a for OFDMA symbol 305-a, which may be equal to OFDMA symbol duration 330-b for OFDMA symbol 305-b).

In accordance with aspects of the present disclosure, a correlation-enhanced frequency scanning procedure may employ aspects of repetitive characteristics, such as those described with reference to CPs 320. For example, the correlation-enhanced frequency scanning may include generating samples (e.g., samples of a received signal, which may include transmission 205-a) over a first sampling interval 340 and generating samples over a second sampling interval 345, which collectively form a correlation pair 350. The first sampling interval 340 may have a sampling interval duration 355-a, and the second sampling interval 345 may have a sampling interval duration 355-b that is equal to the sampling interval duration 355-a. In various examples, a sampling interval duration 355 may be less than or equal to a CP duration 325. The first sampling interval 340 and the second sampling interval 345 may be spaced in time by a correlation period 360, which may be equal in time to a CP repetition period 327, and may also be referred to as a Fast-Fourier Transform (FFT) size that is measured in a number of FFT samples N. Further, the first sampling interval 340 and the second sampling interval 345 may be associated with a correlation window duration 365 that contains the first sampling interval 340 and the second sampling interval 345, and may have a same duration as an OFDMA symbol duration 330.

In further accordance with aspects of the present disclosure, the samples of the first sampling interval 340 and the second sampling interval 345 may be generated to span a sampling frequency bandwidth 370, which may span multiple frequency subcarriers (e.g., multiples of the bandwidth 310). For example, the sampling frequency bandwidth 370 may be equal to a system bandwidth (e.g., a system bandwidth of 1.4 MHz, 3 MHz, 5 MHz, 10 MHz, 15 MHz, 20 MHz, 40 MHz, 80 MHz, or others). Thus, the generated samples of the first sampling interval 340 and the second sampling interval 345 may contain an aggregate of a plurality of OFDMA symbols 305 in the frequency domain when the samples are generated from a cell (e.g., of a base station 105) that includes communications activity.

The durations associated with the transmission 205-a and sampling of the correlation-enhanced frequency scanning may be described in the context of FFT samples that may be generated by a device (e.g., a UE) performing the scanning. In an illustrative example, an FFT size for an OFDMA symbol 305 (e.g., CP repetition period 327) may be N=2048 samples. Therefore the correlation period 360 (e.g., a duration between a beginning of the first sampling interval 340 and a beginning of the second sampling interval 345) may also span 2048 samples. Various CP durations 325 may be supported, which may vary by communications configuration (e.g., a normal CP configuration or an extended CP configuration), or may vary by symbol number within a subframe configuration. For example, a CP 320 associated with a first OFDMA symbol 305 of a subframe (e.g., a symbol 0) may have a CP duration 325 of 160 samples, whereas CPs 320 associated with other OFDMA symbols 305 of a subframe (e.g., a non-symbol 0) may have a CP duration 325 of 144 samples. In order to accommodate both conditions, a sampling interval duration 355 may be chosen to be less than or equal to the CP durations 325 associated with a transmission 205. Thus, in the illustrative example, the sampling interval duration 355 may be 144 samples in duration. Despite the difference in CP durations 325, the overall OFDMA symbol duration 330, and therefore the correlation window duration 365, may stay the same during subsequent correlation windows, and a correlation-enhanced frequency scanning may compensate for repetitions of different CP durations 325 by periodically shifting correlation pairs 350 accordingly. Although the illustrative example is described with reference to an FFT size of 2048 samples for an OFDMA symbol 305, other FFT sizes may be used. In another illustrative example an FFT size of 1536 (e.g., 75% of 2048) samples for an OFDMA symbol 305 may be used, and the described durations may be scaled accordingly.

Thus, the first sampling interval 340 and the second sampling interval 345 may have the same number of samples (e.g., in the time domain), and may be cross-correlated to check for the existence of OFDMA symbol transmissions. In some examples samples of the first sampling interval 340 (e.g., a sampling interval "A") and the second sampling interval 345 (e.g., a sampling interval "B") may be expressed in terms of FFT sample indexes n according to the following:

$$A = y(n), i \leq n < i+N_{CP}$$

$$B = y(n), i+N \leq n < i+N+N_{CP} \quad (1)$$

where i is the index of the first FFT sample of the correlation window duration 365 for the correlation pair 350, N is the FFT Size, and $N_{CP}$ is the CP Size. The FFT samples may each have a complex value (e.g., a real component and an imaginary component) as sampled from the transmission 205-a by the device performing the correlation-enhanced frequency scanning.

The correlation between the first sampling interval 340 and the second sampling interval 345 of a particular correlation pair 350 may be calculated by the following:

$$Corr(A, B) = A \times B' = \sum_{m=1}^{N_{CP}} A(m)B'(m) \quad (2)$$

where A and B are row vectors that contain the respective sets of m samples (e.g., for the first sampling interval 340 and the second sampling interval 345), and the correlation includes a cross product vector multiplication of A with the transpose of B (e.g., B', which may be interpreted as converting a row vector into a column vector for the purposes of matrix multiplication).

Because the device performing the correlation-enhanced frequency scanning may not be synchronized with the device transmitting a transmission 205, the first sampling interval 340 and the second sampling interval may not be aligned with a CP 320 and a last portion 315 of an OFDMA symbol 305, respectively. Thus, as illustrated in the example of transmission and sampling arrangement 300, each of the first sampling interval 340 and the second sampling interval 345 may contain a correlated portion 375 and a non-correlated portion 380. In the case of the first sampling interval 340 illustrated in transmission and sampling arrangement 300, the correlated portion 375 may contain samples associated with one or more CPs 320 (e.g., including CP 320-a) and the non-correlated portion 380 may contain samples associated with a main portion of one of more OFDMA symbols 305 (e.g., including OFDMA symbol 305-a). In the case of the second sampling interval 345 illustrated in transmission and sampling arrangement 300, the correlated portion 375 may contain samples associated with last portions 315 of one or more OFDMA symbols 305 (e.g., including last portion 315-a of OFDMA symbol 305-a, which correlates with the corresponding portion of CP 320-a) and the non-correlated portion 380 may contain samples associated with CPs 320 of a one or more subsequent OFDMA symbols 305 (e.g., including CP 320-b of OFDMA symbol 305-b, which does not correlate with the corresponding main portion of OFDMA symbol 305-a). Thus, in some examples a correlation-enhanced frequency scanning procedure may repeat a correlation calculation for correlation pairs 350 having an incremental shift in time, referred to as lags, to accommodate a lack of synchronization.

Figure 4:
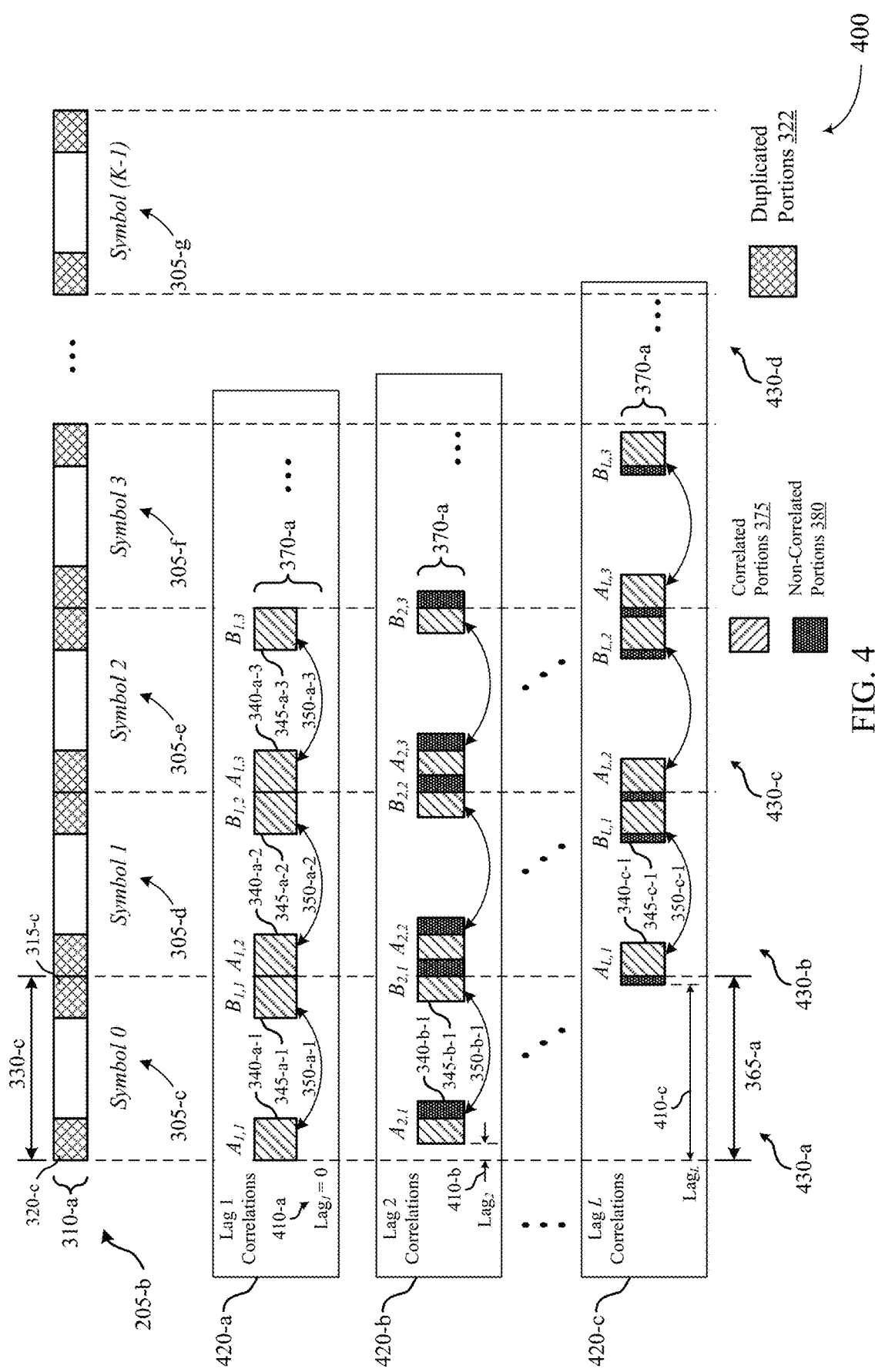
FIG. 4 illustrates an example of a transmission and sampling arrangement that supports correlation-enhanced frequency scanning, in accordance with aspects of the present disclosure.

FIG. 4 illustrates an example of a transmission and sampling arrangement 400 that supports correlation-enhanced frequency scanning in accordance with aspects of the present disclosure. In some examples, aspects of the transmission and sampling arrangement 400 may be implemented by wireless communications systems 100 or 200 Transmission and sampling arrangement 400 may implement aspects of the transmission and sampling arrangement 300.

The transmission and sampling arrangement 400 may include a transmission 205-b including a sequence of K OFDMA symbols 305 (e.g., a first OFDMA symbol 305-c, referred to as "Symbol 0" through a last OFDMA symbol 305-g, referred to as "Symbol (K−1)) each including a CP 320 (e.g., CP 320-c of OFDMA symbol 305-c). The OFDMA symbols 305 may each have an OFDMA symbol duration 330 (e.g., OFDMA symbol duration 330-c associated with OFDMA symbol 305-c), and in some examples each of the OFDMA symbols 305 of the transmission 205-b may have the same OFDMA symbol duration 330. Each of the OFDMA symbols 305 may include duplicated portions 322, which may be different between one OFDMA symbol 305 and another OFDMA symbol 305. Although only a single sequence of OFDMA symbols 305 in the frequency domain (e.g., a single frequency subcarrier) is illustrated, the transmission 205-b may include a plurality of OFDMA symbols 305 in the frequency domain (e.g., one or more frequency carriers, each including a plurality of frequency subcarriers, which may each be associated with an EAR-FCN).

In accordance with aspects of the present disclosure, a correlation-enhanced frequency scanning procedure may employ aspects of repetitive characteristics, such as those described with reference to CPs 320. For example, the correlation-enhanced frequency scanning may include generating samples over a plurality of first sampling intervals 340 and generating samples over a plurality of second sampling intervals 345, which collectively form a plurality of respective correlation pairs 350. The samples of the first sampling intervals 340 and the second sampling intervals 345 may be generated to span a sampling frequency bandwidth 370-a, which spans multiple frequency subcarriers (e.g., multiples of the bandwidth 310-a). For example, the sampling frequency bandwidth 370-a may be equal to a system bandwidth (e.g., a system bandwidth of 1.4 MHz, 3 MHz, 5 MHz, 10 MHz, 15 MHz, 20 MHz, 40 MHz, 80 MHz, or others). Thus, the generated samples of the first sampling intervals 340 and the second sampling intervals 345 may contain an aggregate of a plurality of OFDMA symbols 305 in the frequency domain.

The correlation pairs 350 may each be associated with one of a plurality of correlation windows 430, where each of the correlation windows 430 may be associated with a correlation window duration 365 (e.g., correlation window duration 365-a associated with correlation window 430-a). The correlation window durations 365 may each be equal to an OFDMA symbol duration 330 (e.g., OFDMA symbol duration 330-c) that may be used in the transmission 205-b. The correlation windows 430 may support dividing correlation pairs into sequential time periods, such that results can be processed according to different repetitive periods that may be used in the transmission 205-b (e.g., periodic repetitions according to symbol periods, subframe periods, slot periods, subframe periods, or others).

Because the device performing the correlation-enhanced frequency scanning may not be synchronized with a device transmitting the transmission 205-b, correlations may also be performed according to a plurality of lags 410 that accommodate for the lack of synchronization. Each of the lags 410 may correspond to a different sampling time shift applied to various correlation pairs 350. In other words, the lags 410 may correspond to a sampling time shift or step size applied between correlation pairs 350 associated with different lags. For example, for correlation pairs 350-a, each associated with lag 410-a, the respective first sampling intervals 340-a may be aligned with the beginning of the respective correlation windows 430. In other words, lag 410-a may represent a "zero" lag condition. For correlation pairs 350-b, each associated with lag 410-b, the respective first sampling intervals 340-b may be offset from the beginning of the respective correlation windows 430 by the duration of lag 410-b. For correlation pairs 350-c, each associated with lag 410-c, the respective first sampling intervals 340-c may offset from the beginning of the respective correlation windows 430 by the amount of lag 410-c. In other words, lags 410-b through 410-c may represent non-zero offsets that shift correlation pairs with respect to the beginning of a correlation windows 430.

Each of the lags 410 may be associated with a set of correlation pairs 350, which may be used to determine a lag correlation set 420 (e.g., lag correlation set 420-*a*, including correlation pairs 350-*a* associated with lag 410-*a*). In some examples the number of correlation pairs 350 included in a lag correlation set 420 may be equal to K−1, where K is a number of available OFDMA symbol durations 330 received in a transmission 205, and used in a correlation-enhanced frequency scanning. In one illustrative example, when a transmission 205 spans 70 OFDMA symbol durations 330, a correlation-enhanced frequency scanning may include 69 correlation windows, and therefore the summed, weighted correlation calculations for each lag may include the sum of 69 correlations (e.g., each associated with a different correlation window 430). In some examples for a zero lag 410 (e.g., lag 410-*a*), because of the alignment of correlation pairs 350 within the boundaries of a correlation window 430, the number of correlation pairs 350 associated with the zero lag 410 may be equal to K.

Each of the lags may have a duration that is shorter than a correlation period 360 used in a correlation calculation. Further, the difference between adjacent lags (e.g., the difference between lag 410-*a* and lag 410-*b*, which may be referred to as a lag step size) may be a configurable parameter. Generally, a lag step size may be selected or configured to balance between computational considerations (e.g., where smaller lag step sizes may be associated with more lags 410, and therefore greater computational requirements) and alignment considerations (e.g., where too few lags may result in relatively poor alignment between the transmission of OFDMA symbols 305 and a nearest correlation pairs 350).

In some examples a lag step size may be smaller than the sampling interval durations 355 associated with the first sampling intervals 340 and the second sampling intervals 345 (e.g., shorter than a CP duration 325). In one illustrative example, adjacent lags may be separated by half the duration of a CP 320 (e.g., half of a CP duration of 144 FFT samples, equal to 72 FFT samples between adjacent lags 410), which may be a default lag step size. Thus, correlations may be calculated for different locations of correlation pairs 350 within the correlation windows 430 such that the correlation windows 430 need not be aligned with the OFDMA symbols 305 of a transmission 205 for the correlation-enhanced frequency scanning to identify the presence of communications that include CP transmissions.

The number of lags 410 may be determined in such a way that a correlation window duration 365 is slightly exceeded (e.g., by a second sampling interval 345 associated with the longest lag 410) so that all collected FFT samples are used. For example, when using a lag step size of half of a CP duration 325, a number of lags L may be calculated by the following:

$$L = \lfloor (N + N_{CP})/(0.5 * N_{CP}) \rfloor \qquad (3)$$

where N is the FFT size which may be expressed as a number of FFT samples, and $N_{CP}$ is the CP duration which may also be expressed as a number of FFT samples. As shown, Equation 3 may include a floor function that outputs a greatest integer that is less than or equal to $(N+N_{CP})/(0.5 N_{CP})$.

In an illustrative example for an FFT size of N=2048 FFT samples and a CP duration 325 of $N_{CP}$=144 FFT samples, L may be calculated to be equal to 30 lags 410. In the illustrative example each of the lags 410 may be separated by 72 FFT samples (e.g., $N_{CP}/2$), and for 30 lags 410, the first lag 410 and the last lag 410 may be separated by 2088 FFT samples. In such an example, the correlation window duration 365 is not an integer multiple of the lag step size.

In other words, given an OFDMA symbol duration 330 of 2192 samples (e.g., equal to an FFT duration 327 of 2048 FFT samples and a CP duration 325 of 144 samples), as compared with a span of lags 410 equal to 2088 FFT samples, a correlation-enhanced frequency scanning may insert a jump of 104 samples between a last lag 410 of a first correlation window 430 and a first lag 410 of a subsequent correlation window 430.

In some examples, an OFDMA symbol duration 330 may change according to different positions of a repeating pattern in a transmission 205. For example, a transmission 205 may be arranged according to slots having 7 OFDMA symbols 305. A first OFDMA symbol 305 of a slot may have a CP duration 325 of 160 FFT samples, while the other OFDMA symbols 305 of the slot may have a CP duration 325 of 144 FFT samples. In such an example, when using sampling window durations 355 of 144 FFT samples, for every seventh correlation window 430 a correlation-enhanced frequency scanning may insert a jump of 16 samples between a last lag 410 of a correlation window 430 (e.g., the seventh correlation window 430) and a first lag 410 of a subsequent correlation window 430 (e.g., an eighth correlation window 430).

Therefore, a correlation-enhanced frequency scanning may shift correlation pairs 350 or correlation windows 430 according to a symbol duration (e.g., an OFDMA symbol duration 330), as well as according to a slot duration, to ensure that the correlation pairs 350 (e.g., first sampling intervals 340 and associated second sampling intervals 345) do not drift across OFDMA symbols 305 of a transmission 205 (e.g., in terms of lags).

As illustrated, each of the first sampling intervals 340 may include a vector of samples that may be referred to as $A_{l,k}$, where l refers to the lag for the respective first sampling interval 340, and k refers to the correlation window 430 for the respective first sampling interval 340. Likewise, each of the second sampling intervals 345 may include a vector of samples that may be referred to as $B_{l,k}$, where l refers to the lag for the respective second sampling interval 345, and k refers to the correlation window 430 for the respective second sampling interval 345. In other words, each of the correlation pairs 350 may be associated with one of the lags 410, and also be associated with one of the correlation windows 430.

In the example of transmission and sampling arrangement 400, the correlation windows 430 are shown as being aligned with the OFDMA symbols 305 of the transmission 205-*b*. Accordingly, the correlation pairs 350-*a* (e.g., correlation pair 350-*a*-1, correlation pair 350-*a*-2, and so on) associated with lag 410-*a* are aligned with the CPs 320 and the corresponding last portions 315 of the OFDMA symbols 305. In other words, the correlation pairs 350-*a* associated with the lag 410-*a* contain largely (e.g., entirely) correlated portions 375, whereas correlation pairs 350 associated with other lags 410 (e.g., correlation pair 350-*b*-1, correlation pair 350-*c*-1, and so on) contain varying degrees of correlated portions 375 and non-correlated portions 380 depending on their alignment with the OFDMA symbols 305. Thus, when calculating correlation results for the various correlation pairs 350 for each of the lags 410, the correlation results associated with the lag 410-*a* are likely to show the strongest correlation. In other examples the correlation windows 430 may not be aligned with OFDMA symbols 305 of a transmission 205, and accordingly the correlation results for a different lag 410 (e.g., a lag 410 having correlation pairs 350 containing the largest portion of correlated portions 375 compared with non-correlated portions 380) may be more likely to show the strongest correlation.

Figure 5:
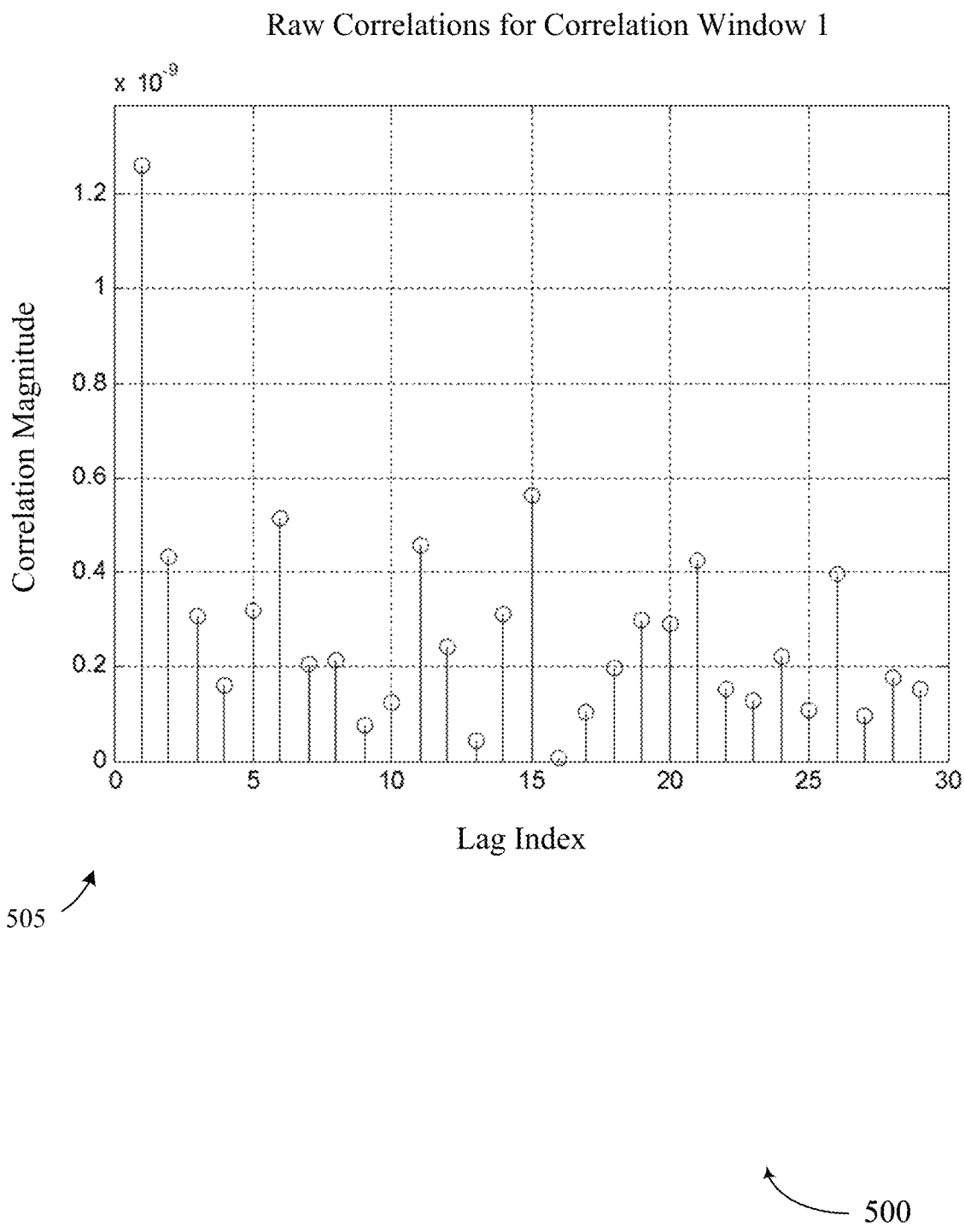
FIG. 5 provides a graph illustrating raw correlation calculation results for a plurality of lags within a single correlation window of a correlation-enhanced frequency scan, in accordance with aspects of the present disclosure.

FIG. 5 provides a graph 500 illustrating raw correlation calculation results 505 for a plurality of lags 410 within a single correlation window 430 of a correlation-enhanced frequency scan, in accordance with aspects of the present disclosure. In some examples, aspects of the raw correlation calculation results 505 may illustrate aspects of wireless communications systems 100 or 200 described with reference to FIGS. 1 and 2, and may implement aspects of the transmission and sampling arrangements 300 or 400 described with reference to FIGS. 3 and 4.

The raw correlation calculation results 505 may be based on a simulated communications environment (e.g., as experienced by wireless communications system 100 or 200) with a characteristic amount of background and communications signal noise, and may correspond to the timing of transmission and sampling arrangement 400. In the illustrated example, the magnitudes of the raw correlation calculation results 505 obtained for all lags 410 across a single correlation window 430 are shown, though in various examples the raw correlation calculation results 505 may include complex correlation values. For example, in accordance with the transmission and sampling arrangement 400 described with reference to FIG. 4, the raw correlation calculation results 505 may refer to a first correlation window 430-$a$, referred to as "Correlation Window 1," and aligned with a first OFDMA symbol 305-$c$. The results for each of the lags 410 may be referred to by their lag index l, from 1 to L, as described above.

In the example of raw correlation calculation results 505, the correlation associated with "lag 1" may be relatively high because the correlation pair 350-$a$-1 associated with lag 410-$a$ is aligned with the CP 320-$c$ and the corresponding last portions 315-$c$ of the OFDMA symbol 305-$c$ (e.g., along with corresponding portions of other OFDMA symbols 305 in the frequency domain that may be transmitted on other subcarriers). In other words, the correlation pair 350-$a$-1 associated with the lag 410-$a$ contains largely (e.g., entirely) correlated portions 375. By way of contrast, correlation pairs 350 associated with other lags 410 contain varying degrees of non-correlated portions 380 depending on their alignment with the OFDMA symbol 305-$c$ of the transmission 205-$b$. Thus, the correlation associated with lags other than lag 1 may be relatively low. However, some of the other lags 410 may also display peaks, due to the fact that sometimes the samples in the respective first sampling intervals 340 and second sampling intervals 345 may include signal or noise contributions that cause them to be arbitrarily similar, and hence, may yield a relatively high correlation despite not being aligned with CP repetitions.

In some examples, obtaining a high $P_d$ at low $P_{fa}$ may require strong correlation values. However, signal power may scale with the load in the samples captured. For example, at three different load levels of a cell (e.g., full load, light load, and CRS-only), if each load level is associated with the same per-tone signal-to-noise ratio (SNR), a correlation calculation may yield very different $P_d$ values. Thus, it may be beneficial for a correlation-enhanced frequency scanning procedure to take the load condition (e.g., number of subcarriers with active communications compared to a total number of subcarriers within a scanning bandwidth) into account, as well as the signal quality, when performing a correlation calculation. In accordance with aspects of the present disclosure, a correlation-enhanced frequency scan may include MRC operations, which may facilitate identifying correlations indicative of communications activity within a frequency band.

An MRC operation may include determining a weighting coefficient $W_{Corr}$ for a correlation calculation according to the following:

$$W_{Corr(A_{l,k},B_{l,k})} = \left| \frac{A_{l,k} \times B'_{l,k}}{B_{l,k} \times B'_{l,k} - A_{l,k} \times B'_{l,k}} \right| \quad (4)$$

According to Equation 4, the weighting coefficient $W_{Corr}$ may be relatively large when the generated samples in the sampling intervals $A_{l,k}$ and $B_{l,k}$ are relatively large (e.g., where relatively strong signals associated with a relatively high load condition result in a relatively large numerator in Equation 4). The weighting coefficient $W_{Corr}$ may also be relatively large when the generated samples in the sampling intervals are well-correlated (e.g., where well-correlated signals between sampling intervals result in a relatively small numerator in Equation 4). Based on the weighting coefficient $W_{Corr}$, a weighted correlation calculation may be determined by the following:

$$\widetilde{Corr}_{(A_{l,k},B_{l,k})} = \sqrt{W_{Corr(A_{l,k},B_{l,k})}} * Corr(A_{l,k},B_{l,k}) \quad (5)$$

where the weighted correlation results for the various correlation pairs 350 may be used to improve the identification of correlated signals (e.g., across a plurality of lags 410).

Figure 6:
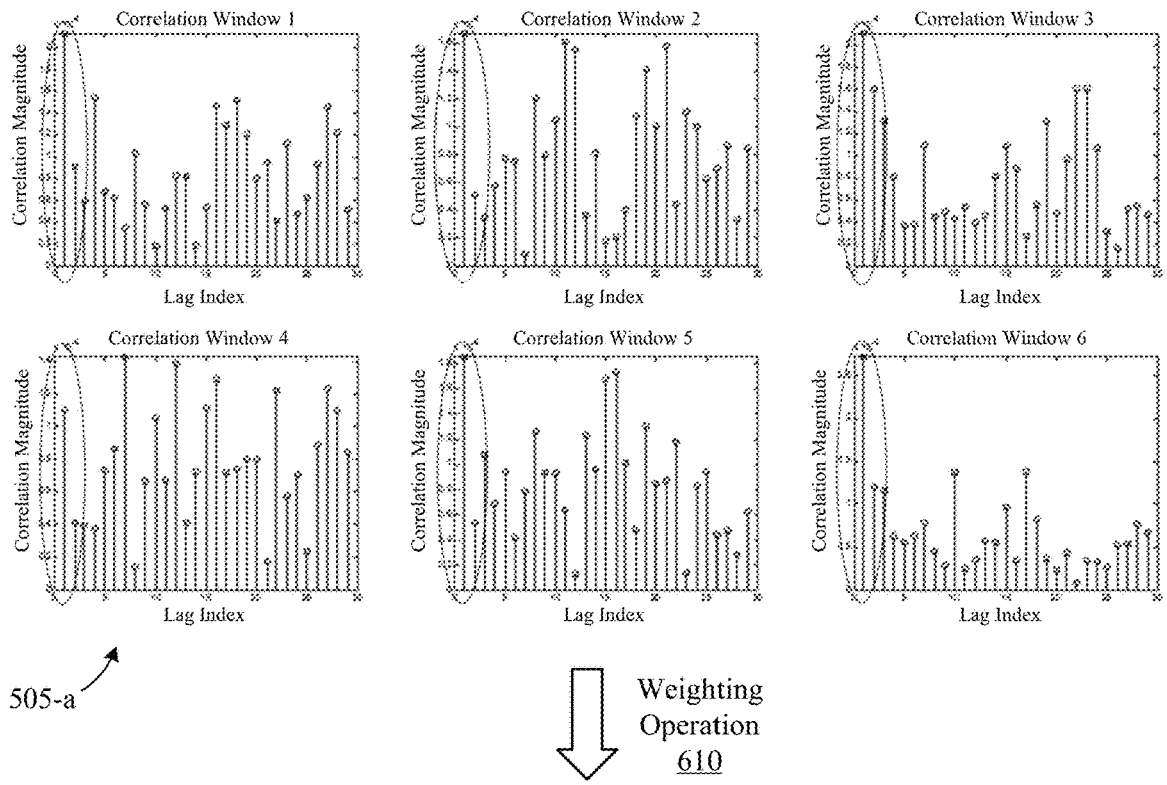
FIG. 6 provides an illustration of weighting the results of a correlation calculation to support a correlation-enhanced frequency scanning, in accordance with aspects of the present disclosure.
Figure 6:
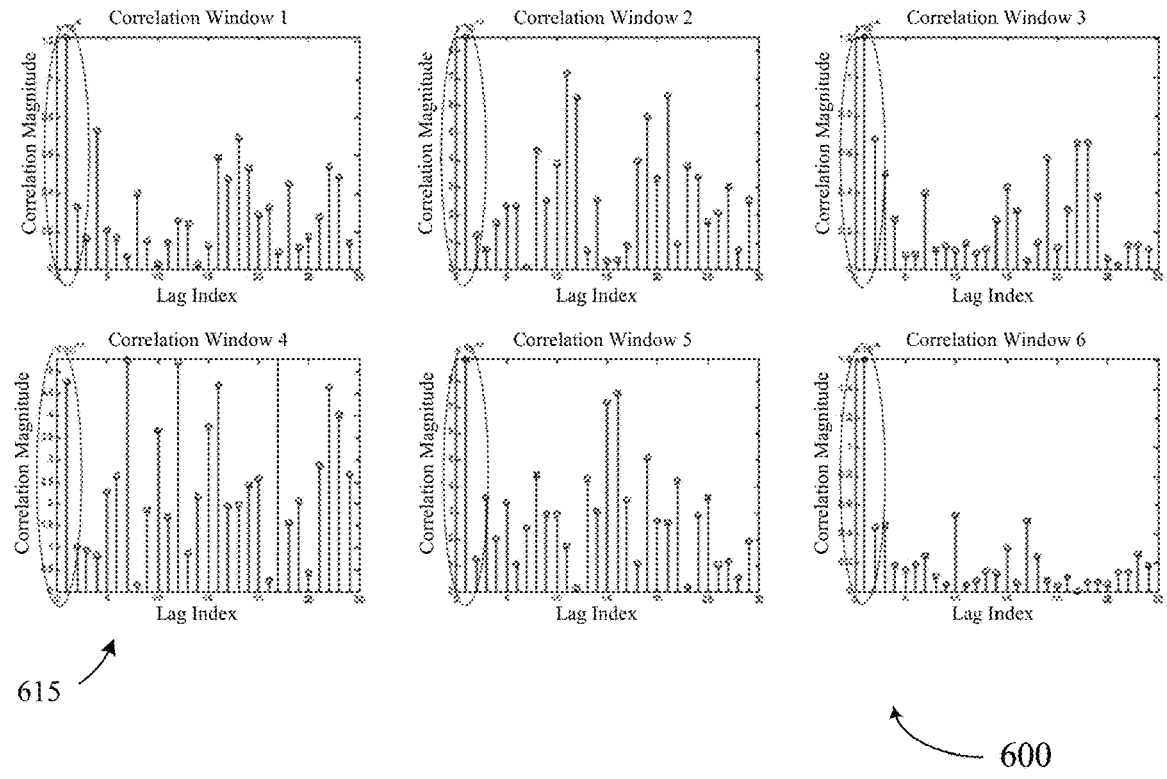

FIG. 6 provides an illustration 600 of weighting the results of a correlation calculation to support a correlation-enhanced frequency scanning, in accordance with aspects of the present disclosure. In some examples, aspects of the illustration 600 may illustrate aspects of wireless communications systems 100 or 200 described with reference to FIGS. 1 and 2, and may implement aspects of the transmission and sampling arrangements 300 or 400 described with reference to FIGS. 3 and 4.

The illustration 600 may include raw correlation calculation results 505-$a$ associated with a plurality of correlation windows 430, and a plurality of lags 410. The raw correlation calculation results 505-$a$ may be based on a simulated communications environment (e.g., as experienced by a wireless communications system 100 or 200) with a characteristic amount of background and communications signal noise, and may correspond to the timing of transmission and sampling arrangement 400. In the illustrated example, the raw correlation calculation results 505-$a$ show an absolute value of correlations obtained for all lags 410 across a single correlation window 430, though in various examples the raw correlation calculation results 505 may represent complex correlation values. The raw correlation calculation results 505-$a$ may refer to six different correlation windows 430 (e.g., in accordance with the transmission and sampling arrangement 400 described with reference to FIG. 4). The results for each of the lags 410 may be referred to by their lag index l, from 1 to L, as described above.

In accordance with aspects of the present disclosure, a weighting operation 610 (e.g., according to Equations 4 and 5) may be applied to the raw correlation calculation results 505-$a$, to generate weighted correlation results 615 for the plurality of correlation windows 430 and the plurality of lags 410. As shown in the illustration 600, for all 6 correlation windows shown, the improvement in correlation of the first lag 410-$a$ (e.g., a lag 410 that is aligned with OFDMA symbols 305 of a transmission 205) as compared to the other lags 410 is noteworthy In some examples of the correlation-enhanced frequency scanning, weighted correlations may be summed across all available symbols. Accordingly, misleading peaks may be substantially averaged out since the desired peaks (e.g., corresponding to correlated signals according to CP repetition characteristics) add coherently while the peaks caused by noise add non-coherently. In some examples the weighted correlations are summed for each lag across all correlation windows to obtain the combined correlation for each lag. Further, in examples where a device performing the correlation-enhanced frequency scanning has multiple antennas, the weighted correlations may be summed for each lag and each antenna across all correlation windows to obtain the combined correlation for each lag.

In one illustrative example, for a device employing two antennas (e.g., Ant0 and Ant1) across K correlation windows 430 in a correlation-enhanced frequency scanning, a combined correlation for each lag may be calculated by the following:

$$R_{MRC}(l) = \sum_{k=1}^{K-1} \overline{Corr}_{Ant0(A_{l,k}, B_{l,k})} + \overline{Corr}_{Ant1(A_{l,k}, B_{l,k})} \quad (6)$$

Thus, for a transmission 205 that spans K OFDMA symbol durations 330, the combined correlation for each lag may be the sum of K−1 weighted correlation calculations for each antenna used in a correlation-enhanced frequency scanning.

Figure 7:
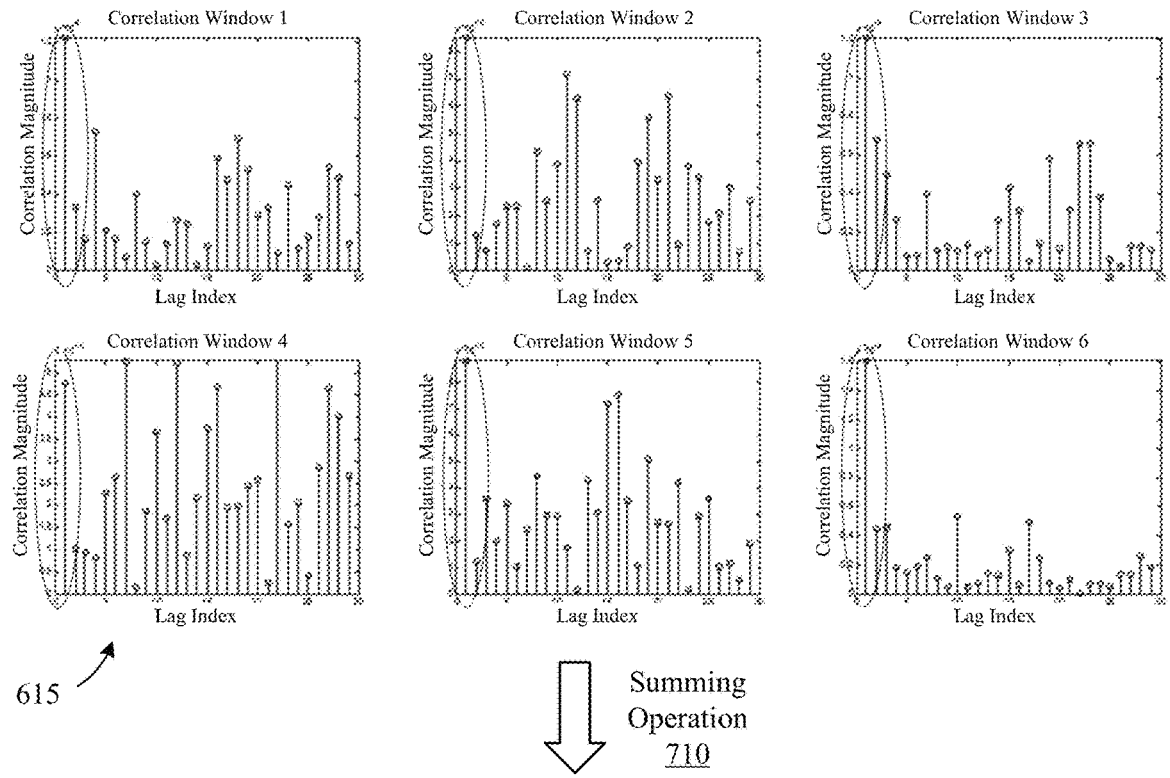
FIG. 7 provides an illustration of summing the weighted results of a correlation calculation to support a correlation-enhanced frequency scanning, in accordance with aspects of the present disclosure.
Figure 7:
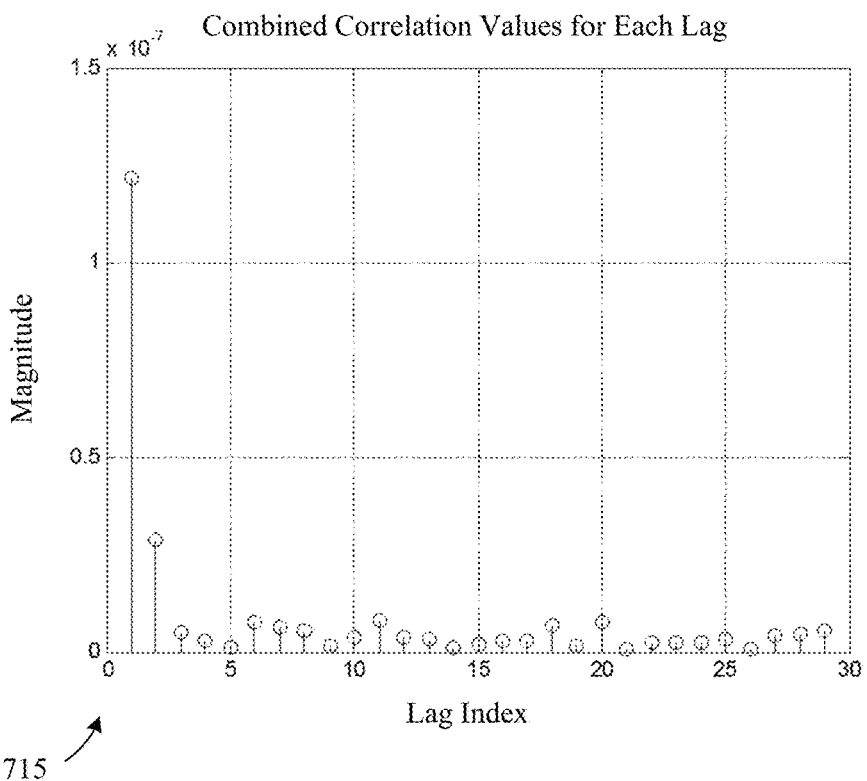

FIG. 7 provides an illustration 700 of summing the weighted results of a correlation calculation to support a correlation-enhanced frequency scanning, in accordance with aspects of the present disclosure. In some examples, aspects of the illustration 700 may illustrate aspects of wireless communications systems 100 or 200 described with reference to FIGS. 1 and 2, and may implement aspects of the transmission and sampling arrangements 300 or 400 described with reference to FIGS. 3 and 4.

The illustration 700 may include weighted correlation results 615 associated with a plurality of correlation windows 430 and a plurality of lags 410, as described with reference to FIG. 6. Although the weighted correlation results 615 are shown as absolute values, in various examples the weighted correlation results 615 may represent complex correlation values.

In accordance with aspects of the present disclosure, a summing operation 710 (e.g., according to Equation 6) may be applied to the weighted correlation results 615, to generate combined correlations 715 for each of the plurality of lags 410. As shown in the illustration 700, peaks associated with particular lags 410 in each of the correlation windows 430 may be substantially averaged out since the desired peaks (e.g., correlated results aligned with CP signals) add coherently while the peaks caused by noise add non-coherently.

Based at least in part on the combined correlations for all of the lags, a detection metric may be determined from a transmission 205 as an indication of whether or not a particular frequency band (e.g., a sampling frequency bandwidth 370) contains signals indicative of active communications. In one example, a detection metric $\gamma_{MRC}$ may be determined by the following:

$$\gamma_{MRC} = \frac{\max_L \{|R_{MRC}|^2\}}{\mathrm{mean}_L \{|R_{MRC}|^2\}} \quad (7)$$

where $\{|R_{MRC}|^2\}$ is the set of combined correlations for each of the lags, expressed as a square of each of the combined correlation magnitudes. In other words, the detection metric $\gamma_{MRC}$ may represent the ratio of the maximum combined correlation from all of the L lags to the mean of the combined correlations of all the L lags.

The detection metric may be compared against a predetermined detection threshold $\tau_{MRC}$ to determine an MRC-based activity metric $\Gamma_{MRC}$, used to determine whether the correlation-enhanced frequency scanning indicates communications activity (e.g., a transmission 205 containing OFDMA symbols) within the sampling frequency bandwidth 370, by the following:

$$\Gamma_{MRC} = \begin{cases} 0, & \gamma_{MRC} \leq \tau_{MRC} \\ 1, & \gamma_{MRC} > \tau_{MRC} \end{cases} \quad (8)$$

where $\Gamma_{MRC}=0$ indicates no activity within the frequency band, and $\Gamma_{MRC}=1$ indicates activity within the frequency band. Accordingly, when a device calculates an activity metric $\Gamma_{MRC}=1$, the device may attempt to establish a connection within the sampling frequency bandwidth 370 (e.g., initiating an FSCAN procedure within the sampling frequency bandwidth 370, attempting to establish time or frequency synchronization, or other operations). When a device calculates an activity metric $\Gamma_{MRC}=0$, the device may refrain from attempting to establish a connection within the sampling frequency bandwidth 370, or may perform further processing within the frequency band, such as repeating the MRC-based scanning for a different communications configuration (e.g., performing a correlation-enhanced frequency scan according to an extended CP configuration having a longer OFDMA symbol duration 330), or by performing a comb filtering operation as described herein, which in some example may be based at least in part on a same received transmission 205. In the event that the device refrains from attempting to establish a connection within the sampling frequency bandwidth 370, in some examples the device may perform a subsequent correlation-enhanced frequency scan over different sampling frequency bandwidth 370.

In some examples, detecting a presence of communications activity based on an indication of CP signal transmission may be more difficult when performing the correlation-enhanced frequency scanning in an area with relatively light downlink communications traffic, or a relatively high proportion of uplink traffic compared with downlink traffic (e.g., because a cell may be transmitting relatively fewer OFDMA symbols 305 associated with CPs as compared with a fully or partially loaded bandwidth having relatively more OFDMA symbol transmissions by a cell).

For example, in the event that a cell is not associated with active communications with other devices, the transmissions of the cell may be limited to CRS transmissions or other pilot transmissions that occur even when not actively communicating with other devices. Although CRS transmissions (e.g., CRS symbols) also include CP signals, the CRS transmissions may repeat at irregular intervals (e.g., not in every symbol period or with irregular spacing between repeated CRS transmissions). Thus, when applying the weighting and summing operations described above (e.g., weighting operation 610 or summing operation 710), correlation windows 430 that are aligned with a CRS transmission may see a limited relative improvement in detecting CP signals associated with CRS transmissions, but other correlation windows 430 that are not aligned with a CRS transmission may result in an amplification of non-correlated signals, such as signal noise that is not associated with communications activity. In other words, correlation peaks due to noise may also be amplified by the MRC operations described herein. Thus, in the illustrated example, operations that support amplifying correlation results associated with CRS symbols may be more successful in detecting the communications activity associated with CRS-only transmissions.

In accordance with aspects of the present disclosure, correlation-enhanced frequency scanning may be further improved by applying comb filtering as described herein, which may amplify the detection of OFDMA symbol transmission activity according to other known repetitive characteristics of communications activity. For example, a comb filter may be configured according to a repetitive periodic transmission pattern of a CRS, in order to amplify the detection of CP signals associated with CRS transmissions that occur even when there is no downlink traffic from the base station. In another example, a comb filter may be configured according to repetitive periodic transmission patterns of one or more UL/DL TDD configurations, in order to amplify the detection of CP signals associated with DL signal patterns of the one or more UL/DL TDD configurations.

Figure 8:
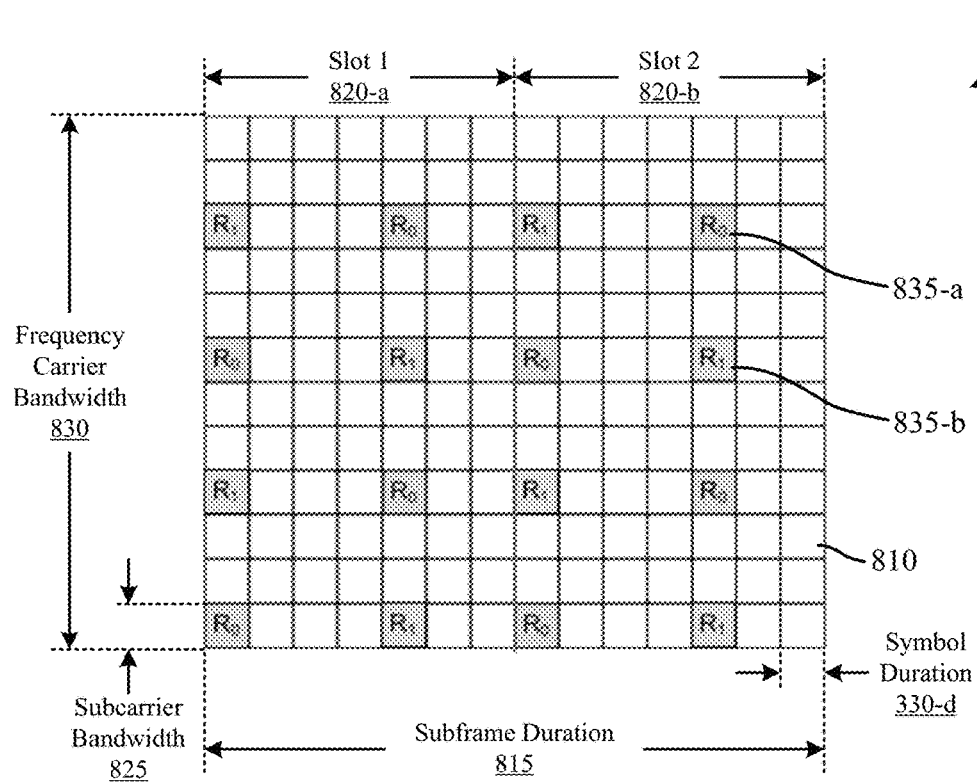
FIG. 8 illustrates an example of a comb filtering arrangement that supports correlation-enhanced frequency scanning, in accordance with aspects of the present disclosure.

FIG. 8 illustrates an example of a comb filtering arrangement 800 that supports correlation-enhanced frequency scanning, in accordance with aspects of the present disclosure. In some examples, aspects of the comb filtering arrangement 800 may illustrate aspects of wireless communications systems 100 or 200 described with reference to FIGS. 1 and 2, and may implement aspects of the transmission and sampling arrangements 300 or 400 described with reference to FIGS. 3 and 4. The comb filtering arrangement 800 illustrates a comb filtering that is configured according to a transmission pattern of CRS transmissions.

According to certain communications protocols, a cell may be associated with CRS transmissions according to a particular pattern in the time and frequency domain. In the illustrated example, the comb filtering arrangement 800 includes a subframe 805 with one such pattern of CRS symbols 835, which may be part of a transmission 205 as described herein. The subframe 805 may be associated with a frequency carrier bandwidth 830 (e.g., a frequency carrier bandwidth of 180 kHz) that is divided into a number of subcarrier bandwidths 825 (e.g., 12 subcarriers, which may each have a subcarrier bandwidth 825 of 15 kHz). Further, the subframe 805 may have a subframe duration 815 (e.g., a duration of 10 milliseconds) which is divided into two slots (e.g., slot 820-*a* and slot 820-*b*). Each slot 820 may be divided into a number of OFDMA symbol durations 330 (e.g., OFDMA symbol duration 330-*d*), which may depend on a communications configuration used by a transmitting device. For example, in normal CP configurations each slot 820 may contain 7 OFDMA symbol durations 330, and in extended CP configurations each slot 820 may contain 6 OFDMA symbol durations 330.

In the example of comb filtering arrangement 800, the subframe 805 is illustrated with slots 820 containing 7 OFDMA symbol durations, with each slot being associated with a pattern of CRS transmission that repeats from slot to slot. For example, in each slot 820, CRS symbols 835 (e.g., a combination of CRS symbols 835-*a* of a first type "R₁", and CRS symbols 835-*b* of a second type "R₂") are located in the first OFDMA symbol duration 330-*d* of the slot 820 (e.g., a symbol 0) and in the fifth OFDMA symbol duration 330-*d* of the slot 820 (e.g., a symbol 4). Accordingly, the periodicity of CRS symbols 835 in the subframe 805 is 7 OFDMA symbol durations 330-*d* (e.g., slot-level periodicity), within which there is an irregular spacing of CRS symbols 835 in the time domain.

In some examples (e.g., when attempting to establish a connection within a frequency band associated with an FDD configuration), a correlation-enhanced frequency scanning may be configured to amplify correlations associated with irregular patterns of transmission that occur at a known periodicity. For example, the uneven spacing of CRS symbols 835 within a slot-level periodicity may be used by a comb filtering configuration 850 to determine a comb filtering matrix 860, which may map correlation windows 430 to different possibilities of alignment (e.g., "positions") with slots 820 of a transmission 205.

In the illustrated example, the first row of the comb filtering matrix 860 may be determined by assuming that a first correlation window 430 (e.g., having a correlation window duration 365 that is equal to the OFDMA symbol duration 330-*d*) is most closely aligned with the first OFDMA symbol duration 330 of a particular slot 820. Accordingly, the first row of the comb filtering matrix 860 may have a value of 1 in the first column and the fifth column, which would align with CRS symbols 835 within the alignment assumed for the first row. The other columns for the first row of the comb filtering matrix 860 may have a value of 0, which would align with a lack of CRS symbols 835 within the alignment assumed for the first row. Thus, the first row of the comb filtering matrix 860 may effectively filter out OFDMA symbol durations 330 that are not associated with CRS symbols 835 according to the assumed alignment for the first row.

In the illustrated example, the second row of the comb filtering matrix 860 may be determined by assuming that a second correlation window 430 is most closely aligned with the first OFDMA symbol duration 330 of a particular slot 820. Accordingly, the second row of the comb filtering matrix 860 may have a value of 1 in the second column and the sixth column, which would align with CRS symbols 835 within the alignment assumed for the second row. The other columns for the second row of the comb filtering matrix 860 may have a value of 0, which would align with a lack of CRS symbols 835 within the alignment assumed for the second row. Thus, the second row of the comb filtering matrix 860 may effectively filter out OFDMA symbol durations 330 that are not associated with CRS symbols 835 according to the assumed alignment for the second row.

The other rows of the comb filtering matrix 860 may be similarly determined for different assumptions of alignment between correlation windows 430 and slots 820, which may include wrapping the value of 1 around to beginning of a row. For example, the fifth row of the comb filtering matrix 860 may have a value of 1 in the fifth column, which would align with CRS symbols 835 in a first OFDMA symbol duration 330 of a slot 820 according to the alignment assumed for the fifth row. For CRS symbols 835 in a fifth OFDMA symbol duration 330 of a slot 820 (e.g., four OFDMA symbol durations 330 later than the first OFDMA symbol duration 330), because the comb filtering matrix 860 does not include a ninth column, the fifth row of the comb filtering matrix 860 may have a value of 1 in the second column (e.g., the ninth column wrapped around to the beginning of the row), which would align with CRS symbols 835 in the fifth OFDMA symbol duration 330 of a slot 820.

In the illustrated example, the 7×7 comb filtering matrix 860 may be used for identifying communications activity having a normal CP configuration, associated with a slot 820 having 7 OFDMA symbol durations 330 (e.g. corresponding to the 7 columns of the comb filtering matrix 860), and therefore 7 different possibilities for alignment between correlation windows 430 and slots 820 (e.g., corresponding to the 7 rows of the comb filtering matrix 860). Additionally or alternatively, a correlation-enhanced frequency scanning may attempt to detect CRS signal transmission having an extended CP configuration, which may be associated with slots 820 having 6 OFDMA symbol durations 330. In other words, a correlation-enhanced frequency scanning according to an extended CP configuration may include a comb filtering configuration 850 that generates a 6×6 comb filtering matrix 860.

To use apply the comb filtering matrix 860, the correlation-enhanced frequency scanning may include folding correlation calculations obtained from all available correlation windows 430 into a pattern having the same number of elements as the periodicity associated with the comb filtering matrix 860 (e.g., the 7 columns of the comb filtering matrix 860, associated with the slot-level periodicity of slots 820 having 7 OFDMA symbol durations 330). In some examples such an arrangement may include correlation results from multiple antennas, and sorting according to lags described above.

In one illustrative example, a folded summation matrix $R_{sum}$ may be determined according to a number of elements r (e.g., "positions") within a repeating pattern (e.g., a number of OFDMA symbol durations 330 within a slot-level repeating pattern, such as the 7 OFDMA symbol durations 330 in the slots 820 of the subframe 805), a number of lags 1, and two antennas (e.g., Ant0 and Ant1) according to the following:

$$R_{sum}(r, l) = \sum_{k=1}^{K-1} Corr_{Ant0}(A_{l,k}, B_{l,k}) + Corr_{Ant1}(A_{l,k}, B_{l,k}) \quad (9)$$

where K is again the number of correlation windows 430 included in the sampling of a transmission 205 by the correlation-enhanced frequency scanning procedure, and A and B are the vectors of samples of the respective sampling intervals. For detecting according to a repeating pattern of 7 symbol durations, the row number r may be equal to mod(k, 7). In other words, the row may contain results for every seventh correlation window 430.

Figure 9:
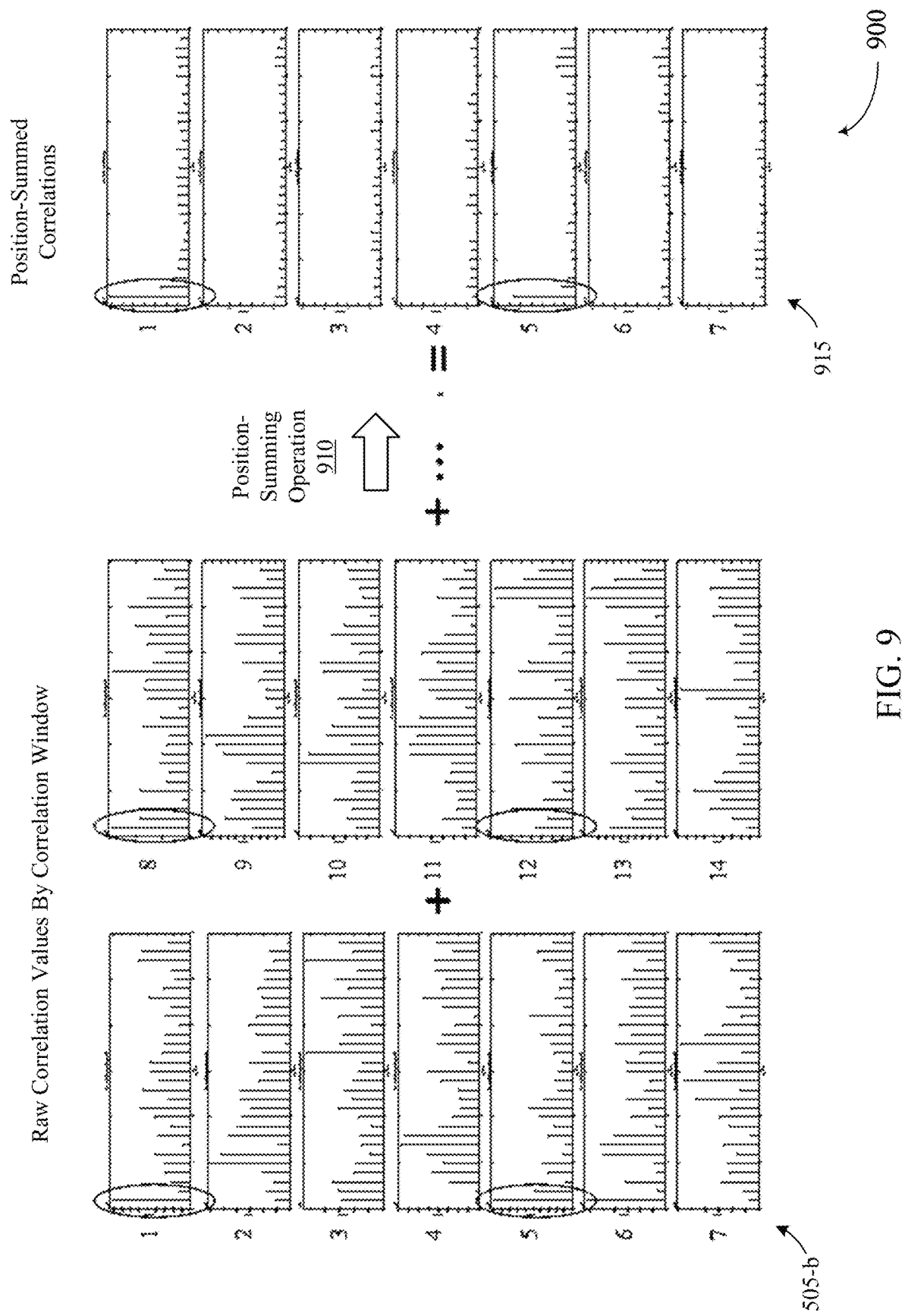
FIG. 9 provides an illustration of summing raw results of a correlation calculation to support comb filtering in a correlation-enhanced frequency scanning, in accordance with aspects of the present disclosure.

FIG. 9 provides an illustration 900 of summing raw results of a correlation calculation to support comb filtering in a correlation-enhanced frequency scanning, in accordance with aspects of the present disclosure. In some examples, aspects of the illustration 900 may illustrate aspects of wireless communications systems 100 or 200 described with reference to FIGS. 1 and 2, and may implement aspects of the transmission and sampling arrangements 300 or 400 described with reference to FIGS. 3 and 4, or the transmission of CRS transmissions described with reference to FIG. 8.

The illustration 900 may include raw correlation calculation results 505-*b* associated with a plurality of correlation windows 430 and a plurality of lags 410, such as those described with reference to FIG. 6. Although the raw correlation calculation results 505-*b* are shown as absolute values, in various examples the weighted correlation results 615 may represent complex correlation values that are used in a position-summing operation 910.

In accordance with aspects of the present disclosure, a position-summing operation 910 (e.g., according to Equation 9) may be applied to the raw correlation calculation results 505-*b*, to generate position-summed correlations 915 for each of the plurality of lags 410 (e.g., a folded matrix $R_{sum}$). The position-summing operation 910 may support a comb filtering operation associated with 7 positions, such as a comb filtering configured according to CRS transmissions that are repeated according to a slot pattern having 7 OFDMA symbol durations 330 (e.g., slots 820 described with reference to FIG. 8). Thus, for each of the positions, the position-summing operation 910 may add respective raw correlation calculation results 505-*b* associated with every seventh correlation window 430. In other words, for position 1 of the position-summed correlations 915, the summing operation may add the raw correlation values for correlation windows 1, 8, and so on. For position 2 of the position-summed correlations 915, the summing operation may add the raw correlation values for correlation windows 2, 9, and so on.

Thus, the position-summed correlations 915 may include values for each of the 30 illustrated lags 410 as summed according to a desired periodicity (e.g., a periodicity of one slot 820, having 7 OFDMA symbol duration 330). Accordingly, the position-summed correlations 915 may support forming a 7×30 folded summation matrix $R_{sum}$ as described above with reference to Equation 9. As shown in the illustration 900, peaks associated with particular lags 410 in each of the correlation windows 430, and each of the positions, may be substantially averaged out since the desired peaks (e.g., correlated results aligned with CRS symbols, which may be aligned with the first lag of each of the correlation windows 1, 5, 8, 12, and so on) add coherently while the peaks caused by noise add non-coherently.

The folded summation matrix $R_{sum}$ (e.g., the 7×30 matrix of position-summed correlations 915) may then be multiplied with the comb filter C (e.g., the 7×7 comb filtering matrix 860) to generate comb-filtered correlations by the following:

$$R_{comb} = C \times R_{sum} \quad (10)$$

where × indicates matrix multiplication.

Figure 10:
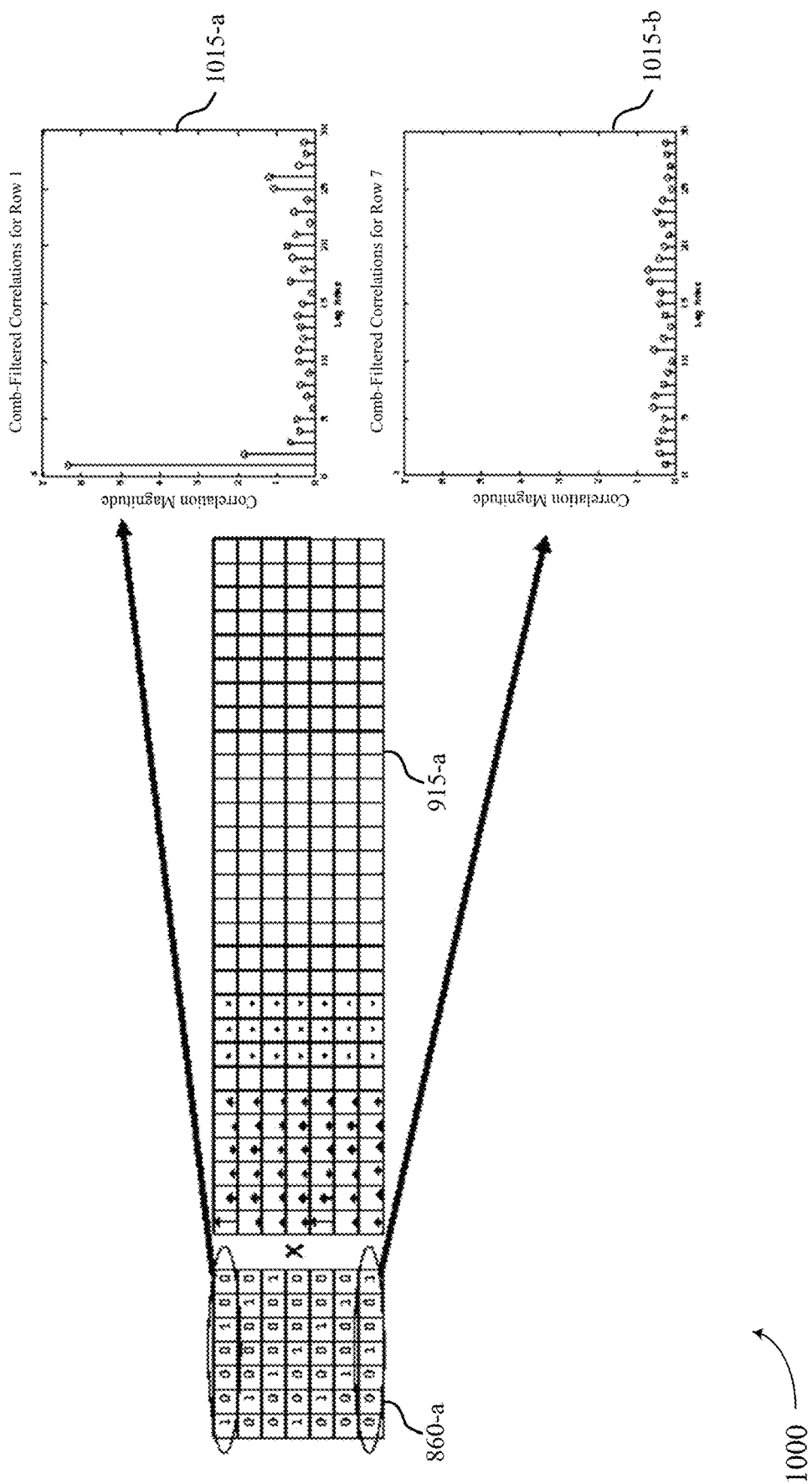
FIG. 10 provides an illustration of applying a comb filter to support a correlation-enhanced frequency scanning, in accordance with aspects of the present disclosure.

FIG. 10 provides an illustration 1000 of applying a comb filter to support a correlation-enhanced frequency scanning, in accordance with aspects of the present disclosure. In some examples, aspects of the illustration 700 may illustrate aspects of wireless communications systems 100 or 200 described with reference to FIGS. 1 and 2, and may implement aspects of the transmission and sampling arrangements 300 or 400 described with reference to FIGS. 3 and 4, or the transmission of CRS symbols described with reference to FIG. 8.

The illustration 1000 may illustrate aspects of multiplying a comb filtering matrix 860-*a* with a folded summation matrix $R_{sum}$ (e.g., matrix of position-summed correlations 915). For example, the first row of the comb filtering matrix 860-*a* may correspond to a first assumption for transmission and sampling alignment of the comb filtering matrix 860-*a*, which is associated with a set of correlation windows 430 that are aligned with CRS transmissions as described with reference to FIG. 8. Thus, the results 1015-*a* (e.g., a first set of partial results of comb-filtered correlations) of multiplying the first row of the comb filtering matrix 860 by the matrix of position-summed correlations 915 may demonstrate a relatively high peak for the first lag, because the first position of the comb filter is associated with correlation windows 430 that are aligned with the transmission of CRS symbols 835, and the first lag corresponds to an aligned position with respect to transmission of OFDMA symbols 305. On the other hand, the results 1015-b (e.g., a second set of partial results of comb-filtered correlations) of multiplying the last row of the comb filtering matrix 860 by the matrix of position-summed correlations 915 may demonstrate relatively low correlations across all lags, because the respective correlation windows 430 are not aligned with a transmission of CRS symbols 835, and therefore the correlation calculations may be substantially averaged out since the desired peaks (e.g., correlated results aligned with CP signals of CRS symbols) add coherently while the peaks caused by noise add non-coherently.

Based at least in part on the comb-filtered correlations for all of the lags, a detection metric may be determined from a transmission 205 as an indication of whether or not a particular frequency band (e.g., a sampling frequency bandwidth 370) contains signals indicative of active communications. In one example, a detection metric $\gamma_{comb}$ may be determined by the following:

$$\gamma_{comb} = \frac{\max_{r,L}\{|R_{comb}|^2\}}{\mathrm{mean}_{r,L}\{|R_{comb}|^2\}} \quad (11)$$

where $\{|R_{MRC}|^2\}$ is the set of comb-filtered correlations for each of the lags, expressed as a square of each of the comb-filtered correlation magnitudes. In other words, the detection metric $\gamma_{comb}$ may represent the ratio of the maximum comb-filtered correlation from all of the L lags to the mean of the comb-filtered correlations of all the L lags and R positions (e.g., rows).

The detection metric may be compared against a predetermined detection threshold $\tau_{comb}$ (which may or may not be equal to detection threshold $\tau_{MRC}$) to determine an activity metric $\Gamma_{comb}$, used to indicate whether the correlation-enhanced frequency scanning indicates communications activity (e.g., a transmission 205 containing OFDMA symbols) within the sampling frequency bandwidth 370, by the following:

$$\Gamma_{comb} = \begin{cases} 0, \gamma_{comb} \leq \tau_{comb} \\ 1, \gamma_{comb} > \tau_{comb} \end{cases} \quad (12)$$

where $\Gamma_{comb}=0$ indicates no activity within the frequency band, and $\Gamma_{comb}=1$ indicates activity within the frequency band. Accordingly, when a device calculates an activity metric $\Gamma_{comb}=1$, the device may attempt to establish a connection within the sampling frequency bandwidth 370. When a device calculates an activity metric $\Gamma_{comb}=0$, the device may refrain from attempting to establish a connection within the sampling frequency bandwidth 370, or may perform further processing within the frequency band, such as further comb filtering described herein. In the event that the device refrains from attempting to establish a connection within the sampling frequency bandwidth 370, the device may perform a subsequent correlation-enhanced frequency scan over different sampling frequency bandwidth 370.

Although described with reference to the detection of CP signals associated with CRS symbols 810, comb filtering may also be configured according to other irregular repetitions according to known repetitive periodicity, such as UL/DL TDD configurations. TDD-based implementations of a correlation-enhanced frequency scanning may, for example, be performed when a TDD frequency band is the target frequency band for establishing communications with a cell. In such frequency bands, a UL/DL TDD configuration may not be known beforehand, and scanning for communications activity by attempting to detect transmission of CPs may be particularly difficult when a cell employs a UL/DL TDD configuration having a relatively high proportion of UL subframes compared to DL subframes.

Figure 11:
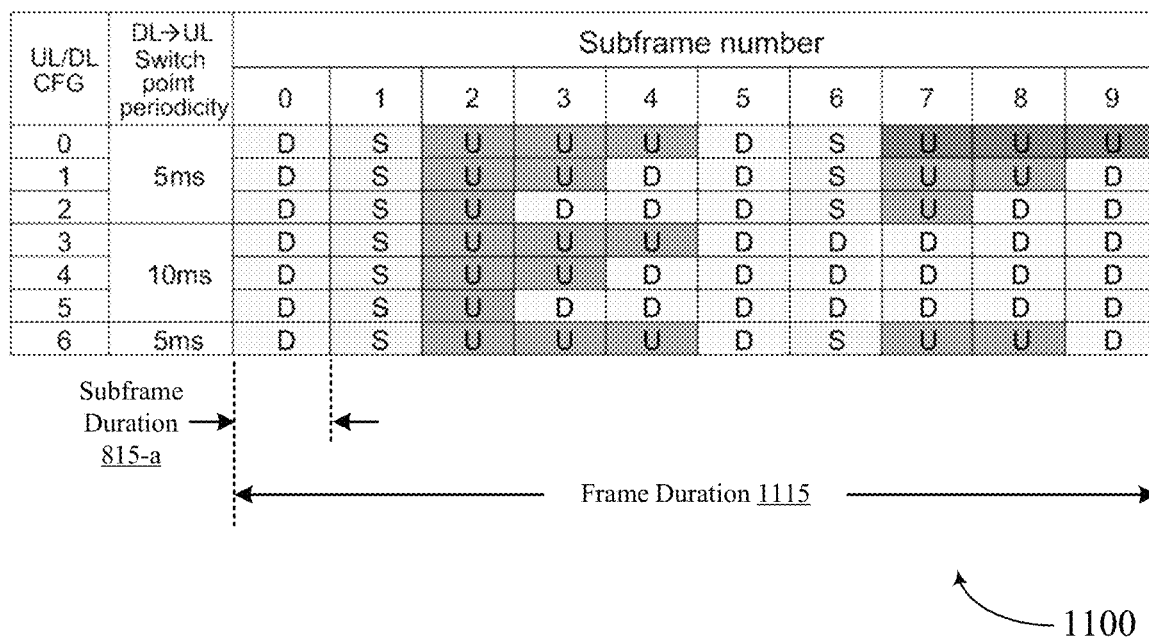
FIG. 11 provides an chart illustrating different UL/DL TDD configurations that may be used to support a correlation-enhanced frequency scanning, in accordance with aspects of the present disclosure.

FIG. 11 provides an chart 1100 illustrating different UL/DL TDD configurations that may be used to support a correlation-enhanced frequency scanning, in accordance with aspects of the present disclosure. In some examples, aspects of the UL/DL TDD configurations may implemented by wireless communications systems 100 or 200 described with reference to FIGS. 1 and 2.

The chart 1100 illustrates examples of different UL/DL TDD configurations that may be selected for communications in a cell. The UL/DL TDD configurations are shown with reference to patterns of subframe configurations, according to a 10-subframe arrangement of a frame. In other words, each of the UL/DL TDD configurations of the chart 1100 may repeat according to a frame-level pattern of repetition including 10 positions (e.g., according to a frame duration 1115 containing ten subframe durations 815-a). According to the various illustrated UL/DL TDD configurations, the patterns of subframes may be associated with DL traffic (indicated as "D" subframes), UL traffic (indicated as "U" subframes), or a special subframe that may be associated with other traffic or switching between UL and DL (indicated as "S" subframes).

When a device is performing a correlation-enhanced frequency scanning procedure within a cell that is using one of the illustrated UL/DL TDD configurations, the scanning may be affected by a proportion of DL to UL subframes that exist in the UL/DL TDD configuration being used by a cell. For example, the scanning may have difficulty identifying OFDMA symbols 305 that occur during DL subframes, because UL subframes may not be in use, or may not be synchronized in the same manner as DL subframes, or may not contain signals of a sufficient strength to be received by a device performing the scanning. In such cases, transmissions during the UL subframes may be interpreted by a correlation-enhanced frequency scan similarly as background signal noise, thereby masking the transmission of OFDMA symbols 305 in DL subframes. Accordingly, it may be relatively difficult for a device to detect communications activity when the illustrated UL/DL TDD configurations 0, 1, or 6 are used, because those configurations have a relatively high proportion of UL subframes.

In accordance with aspects of the present disclosure, a device attempting to establish a connection within a frequency band associated with TDD operation may perform a two-stage implementation of correlation-enhanced frequency scanning. For example, a default operation may include MRC-based operations discussed above (e.g., with reference to Equations 4 through 8 and FIGS. 7 and 8), which may assume that there is enough DL signaling present in a cell to detect the presence of CP signals associated with the transmission of OFDMA symbols 305. In the event that a default MRC-based scanning does not indicate communications activity, the device may perform a secondary operation that improve scanning for UL-heavy UL/DL TDD configurations. Accordingly, given that the UL subframes may have a negative effect on the ability to detect the transmission of OFDMA symbols 305, the detection may be performed on a subframe level. In other examples in accordance with the present disclosure, a correlation-enhanced frequency scan may omit MRC-based scanning (e.g., when it is otherwise known or assumed that a cell is operating with a UL-heavy UL/DL TDD configuration), and proceed directly to scanning operations that target UL-heavy UL/DL TDD configurations, or may perform MRC-based scanning following, or in combination with operations that target UL-heavy UL/DL TDD configurations.

In some examples a correlation-enhanced frequency scanning may include comb filtering according to the illustrated frame-level periodicity of 10 subframe positions. In one example, for a correlation-enhanced frequency scanning in a sampling frequency bandwidth 370 associated with TDD communications, a comb filtering matrix 860 for each UL/DL TDD configuration may be configured with 10 positions (e.g., one position for each subframe duration 815-a in the frame-level periodicity of frame duration 1115), and a value of 1 for a DL position in a particular TDD configuration. Such a comb filtering matrix 860 may be multiplied by a folded summation matrix $R_{sum}$ determined according to a number of subframe durations 815 within a frame duration 1115, such as the ten subframe durations 815-a in the frame duration 1115 of the chart 1100.

In some examples, such comb filtering may be repeated for each of a set of possible UL/DL TDD configurations that may be used by a cell (e.g., a first comb filtering configured according to UL/DL TDD configuration 0, a second comb filtering configured according to UL/DL TDD configuration 6, and so on). Additionally or alternatively, a correlation-enhanced frequency scanning may include other aspects of subframe-level combining in accordance with aspects of the present disclosure.

Figure 12:
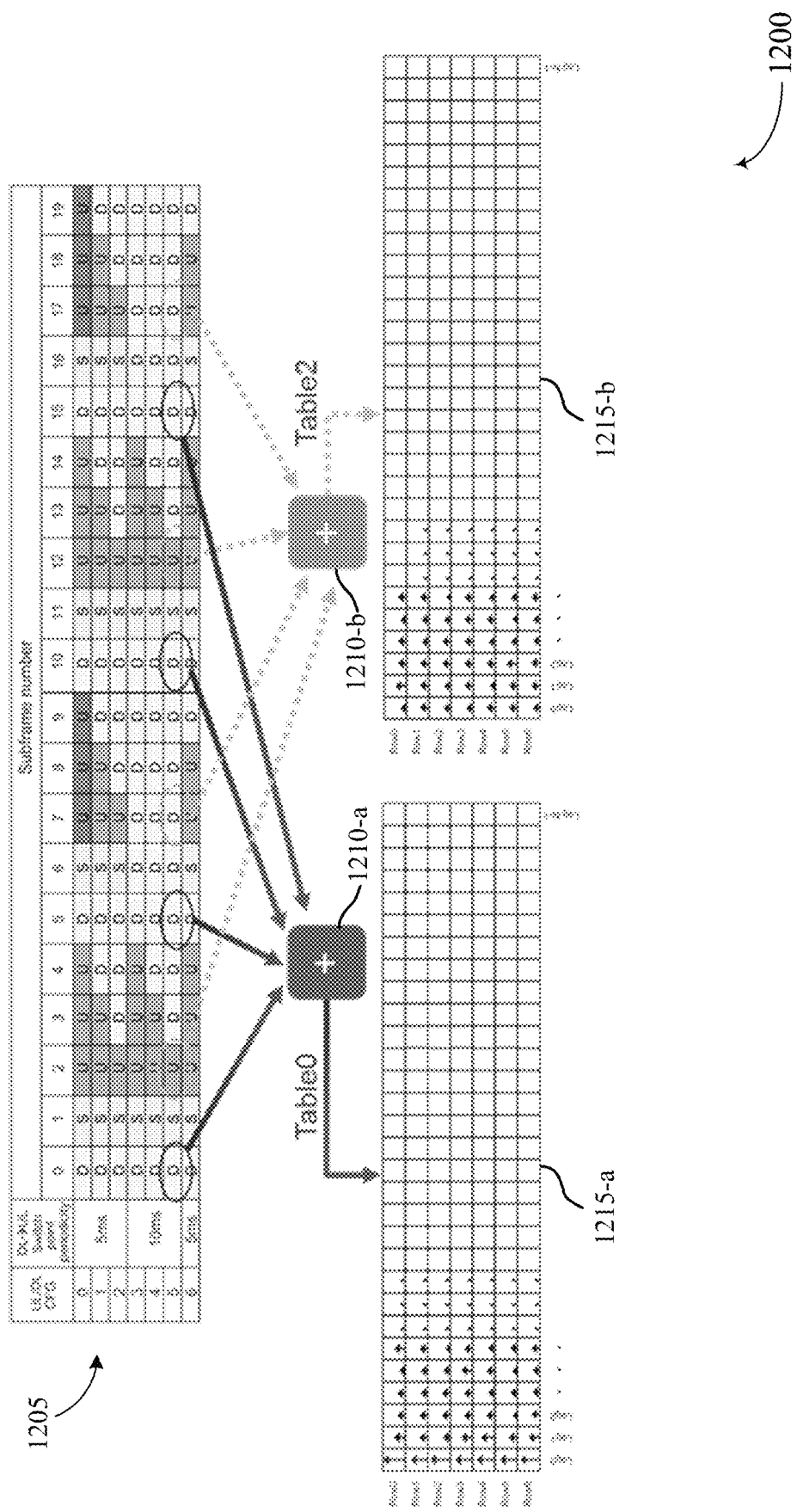
FIG. 12 illustrates an example of a subframe-level combining that supports correlation-enhanced frequency scanning, in accordance with aspects of the present disclosure.

FIG. 12 illustrates an example of a subframe-level combining 1200 that supports correlation-enhanced frequency scanning, in accordance with aspects of the present disclosure. In some examples, aspects of the subframe-level combining 1200 may implemented by wireless communications systems 100 or 200 described with reference to FIGS. 1 and 2.

In the example of subframe-level combining 1200, correlation calculations may be combined according to groups that are in the same subframe-level positions within a half-frame periodicity (e.g., half of a frame duration 1115) of a sequence of correlation windows 430. In other words, correlation windows 430 may be processed according to a periodic repetition of a half-frame having a number of subframe durations 815, and associated correlation calculations may be combined for each of five such positions within a half-frame periodicity.

For example, the frame sequence table 1205 may illustrate subframe configurations for each of seven UL/DL TDD configurations, spanning two frame durations 1115, and accordingly twenty subframe durations 815. The illustrated uplink, downlink, and special subframe configurations may be applied to a transmission 205 that may be received by a device that is performing a correlation-enhanced frequency scanning. For illustrative purposes, it is assumed in the example of subframe-level combining 1200 that the samples generated in the correlation-enhanced frequency scan begin at the same time as the illustrated frame sequence table 1205 (e.g., a first lag 410 of a first correlation window 430 begins at the same time as a first OFDMA symbol 305 of a transmission 205). However, in practice, such synchronization may not be known to a device that is performing such scanning, and therefore various correlation calculation results (e.g., peaks of correlations results associated with detecting signals indicative of OFDMA symbols with CP signals) may be associated with different intervals from those discussed herein.

In one example, the subframe-level combining 1200 may include the summation of raw correlation calculation results 505, such as raw correlation calculation results 505 described with reference to FIGS. 5, 6, and 9. The subframe-level combining may include a first subframe-level summation 1210-a, which may be associated with a first, a fifth, an eleventh, and a sixteenth subframe duration of correlation windows 430 (e.g., in a two-frame duration). The result of the first subframe-level summation 1210-a may include a first table of correlations 1215-a associated with a first alignment assumption of the half-frame-level periodicity of five subframes. The subframe-level combining may also include a second subframe-level summation 1210-b, which may be associated with a third, an eighth, a thirteenth, and an eighteenth subframe duration of correlation windows 430 (e.g., in the two-frame duration). The result of the second subframe-level summation 1210-b may include a first table of correlations 1215-b associated with a third alignment assumption of the half-frame-level periodicity of five subframes. In the illustrated example, the subframe level combining 1200 may include a total of five tables of correlations 1215 where the raw correlation values are kept. In other words, subframe-level summations 1210 may be one means for supporting a calculation of a folded summation matrix $R_{sum}$ that may be used to support comb filtering according to UL/DL TDD configurations.

In some examples, correlation values of particular correlation windows 430 may be kept in separate rows (e.g., according to a normal CP slot-level periodicity of seven sequential OFDMA symbol durations 330 in a slot 820, or according to an extended CP slot-level periodicity of six sequential OFDMA symbol durations 330 in a slot 820). For example, for a normal CP configuration, the row number for correlation values of a correlation window 430 X may be determined by r=mod(X,7), and the table number for correlation values of a correlation window 430 X may be determined by t=mod(($\lfloor X/14 \rfloor$), 5), where $\lfloor X/14 \rfloor$ represents a floor function that outputs a greatest integer that is less than or equal to (X/14), and serves to divide the correlation windows 430 into subframe-level groups (e.g., according to a subframe duration that includes 14 OFDMA symbol durations 330).

In various examples, one of the tables of correlations 1215 will be most likely to be aligned with a downlink-heavy subframe position (e.g., most likely to be aligned with a subframe 0, subframe 5, subframe 10, and subframe 15, which may correspond to a DL hjsubframe configuration for all UL/DL TDD configurations). Because of the described half-frame periodicity of the subframe-level combining 1200, synchronization with a particular frame timing of a cell may not be critical. Accordingly, all of the correlation windows 430 associated with a table of correlations 1215 may be combined, or comb-filtering may be employed in accordance with the operations described herein. In some examples, a detection of communications activity may be determined even if only one of the tables of correlations 1215 indicates that a signal is present, because in case of a UL-heavy UL/DL TDD configuration, or a special subframe configuration with limited DL symbols, only one subframe group may be expected to yield relatively high correlations (e.g., table of correlations 1215-a according to the illustration of subframe-level combining 1200).

Although subframe-level combining 1200 illustrates the application of subframe-level summations 1210 according to the five positions of a half-frame periodicity, correlation results may similarly be combined by multiplying a frame-level comb filtering matrix 860 (e.g., having 10 positions, and values of 1 every fifth position) by a frame-level sorting of correlation windows 430 (e.g., according to a folded summation matrix $R_{sum}$ generated by frame-level periodicity of ten subframe durations 815).

Figure 13:
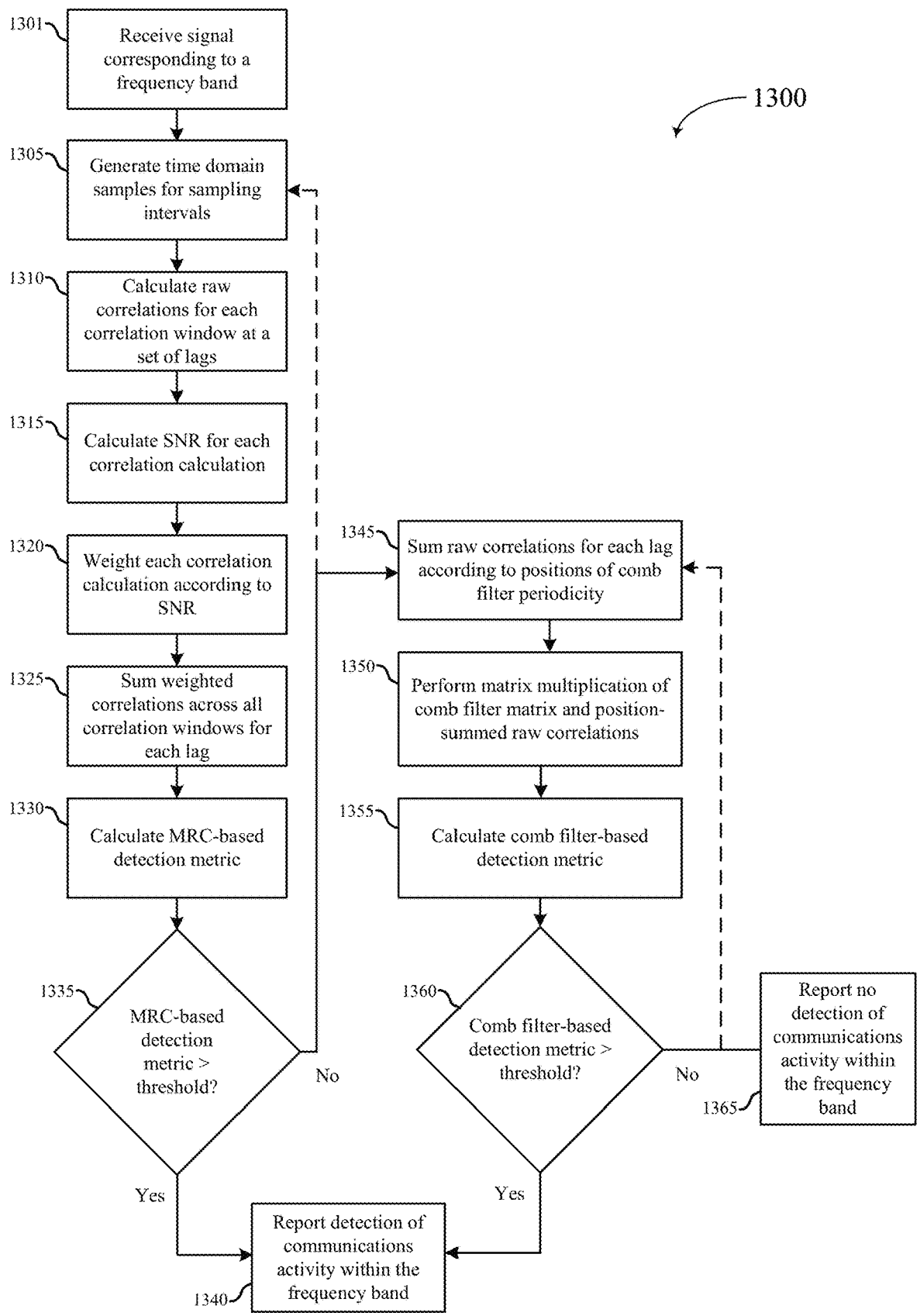
FIG. 13 illustrates a flowchart of an example method that supports correlation-enhanced frequency scanning, in accordance with aspects of the present disclosure.

FIG. 13 illustrates a flowchart of an example method 1300 that supports correlation-enhanced frequency scanning, in accordance with aspects of the present disclosure. In some examples, the method 1300 may implement aspects of wireless communications system 100. For example, the method 1300 may be performed by a UE 115 that is attempting to establish a connection with a cell (e.g., as served by a base station 105)

At 1301, the method 1300 may include receiving a signal corresponding to a frequency band (e.g., a transmission 205 received according to a sampling frequency bandwidth 370). The signal may or may not include the transmission of OFDMA symbols 305, and accordingly may be used to evaluate whether or not the frequency band is being used for active communications. In some examples, the sampling frequency bandwidth 370 may correspond to a system bandwidth as described herein.

At 1305, the method 1300 may include generating time domain samples from the received signal. The time domain samples may span the sampling frequency bandwidth 370, which may correspond to a plurality of subcarriers or a plurality of carriers. The time domain samples may be generated according to one or more correlation pairs 350, each associated with a respective first sampling interval 340 and a second sampling interval 345 (e.g., according to Equation 1 described above).

At 1310, the method 1300 may include calculating raw correlations for each correlation window 430 at a set of lags 410. The raw correlations may be calculated by a vector multiplication such as Equation 2 described above, each of which may include the multiplication of samples of the first sampling interval 340 and the second sampling interval 345 of a respective correlation pair 350.

At 1315, the method 1300 may include calculating an SNR for each correlation calculation, and at 1320 the method 1300 may include weighting each correlation calculation according to the SNR. In some examples, calculating the SNR and weighting may be combined in a single calculation, such as Equation 4 described above. Applying the weighting may include a multiplication such as Equation 5 described above.

At 1325, the method 1300 may include summing the weighted correlations across all correlation windows for each lag. In some examples, the summing at 1325 may also include summing across results from multiple antennas. For example, the summing at 1325 may be performed according to Equation 6 described above.

At 1330, the method 1300 may include calculating an MRC-based detection metric. For example, the detection metric may be a ratio of a maximum correlation calculation across the lags to the average correlation calculation across the lags, such as $\gamma_{MRC}$ calculated by Equation 7 described above.

At 1335, the method 1300 may include determining whether the MRC-based detection metric is greater than a threshold (e.g., $\tau_{MRC}$ described with reference to Equation 8 above). If the MRC-based detection metric is greater than the threshold, the method may proceed to 1340, where the method may include reporting a detection of communications activity. If the MRC-based detection metric is not greater than the threshold, the method 1300 may proceed with further scanning. In some examples, proceeding with further scanning may include returning to 1305 to perform MRC-based scanning according to a different configuration, which may or may not use the same signal as received at 1301. For example, if the first MRC-based scanning was performed according to the timing of a normal CP configuration of 7 OFDMA symbols per slot, the method 1300 may include repeating the MRC-based scanning according to the timing of an extended CP configuration of 6 OFDMA symbols per slot. In some examples, proceeding with further scanning may include proceeding to 1345 to perform scanning according to one or more comb filtering arrangements.

At 1345, the method 1300 may include summing raw correlations for each lag according to positions of comb filter periodicity (e.g., according to positions of a periodic repetition). For example, for a comb filtering configured according to CRS transmissions in a normal CP configuration (e.g., 7 symbols per slot), the method 1300 may include summing raw correlations for every seventh correlation window (e.g., with each correlation window having a same duration as an OFDMA symbol 305). In a scanning with 30 lags, the summing at 1345 may result in a 7×30 matrix corresponding to the 30 lags and 30 symbol positions.

At 1350, the method 1300 may include performing a matrix multiplication of a comb filter matrix 510 and position-summed raw correlations 630. For example, for a comb filtering configured according to CRS transmissions in a normal CP configuration, the method 1300 may include multiplying a 7×7 comb filtering matrix 860 configured according to the spacing of CRS symbols by a 7×30 matrix of position summed raw correlations. Accordingly, the result may be a 7×30 matrix of comb-filtered correlations.

At 1355, the method 1300 may include calculating a comb filter-based detection metric based on the comb-filtered correlations. For example, the detection metric may be a ratio of a maximum correlation calculation across the lags and positions (e.g., rows) to the average correlation calculation across the lags and positions, such as $\gamma_{comb}$ calculated by Equation 11 described above.

At 1335, the method 1300 may include determining whether the comb filter-based detection metric is greater than a threshold (e.g., $\tau_{comb}$ described with reference to Equation 12 above). If the comb filter-based detection metric is greater than the threshold, the method may proceed to 1340, where the method may include reporting a detection of communications activity. If the comb filter-based detection metric is not greater than the threshold, the method 1300 may proceed to 1365, where the method may include reporting no detection of communications activity, or the method 1300 may proceed with further scanning. In some examples, proceeding with further scanning may include returning to 1345 to perform comb filter-based scanning according to a different configuration. For example, if the first comb filter-based scanning was performed according to a configuration of CRS transmissions, the method 1300 may include repeating the comb filter-based scanning according to one or more UL/DL TDD configurations.

In the event that the method 1300 proceeds to 1340, reporting a detection of communications activity, the device may proceed with attempting to establish a connection within the scanned frequency band (e.g., within the sampling frequency bandwidth 370). In various examples, such an attempt may include determining a set of candidate frequency channels (e.g., by way of a legacy FSCAN procedure), establishing time or frequency synchronization, or other steps.

In the event that the method 1300 proceeds to 1365, reporting no detection of communications activity, the device may refrain from attempting to establish a connection within the scanned frequency band. Thus, the device may repeat operations of the method 1300, but in a different frequency band (e.g., a different E-UTRA band number, or a different portion of the same E-UTRA band number).

In some examples, a candidate EARFCN may span across two correlation-enhanced frequency scans (e.g., when the scanning is performed over two, overlapping frequency bands, or when the scanning is performed over two non-overlapping frequency bands that each include a portion of the bandwidth of the candidate EARFCN). In such examples, the correlation-enhanced frequency scanning for the frequency band that covers more than half of the signal should be taken into account by FSCAN ML1. For example, if the correlation-enhanced frequency scan for a frequency band includes more than half the bandwidth of a candidate frequency channel, and the scan indicates a lack of activity, the candidate frequency channel should not be included in a subsequent FSCAN operation. If the correlation-enhanced frequency scan for a frequency band includes more than half the bandwidth of a candidate frequency channel, and the scan indicates a presence of activity, the candidate frequency channel should be included in a subsequent FSCAN operation. If a bandwidth of a candidate frequency channel is split in half between two correlation-enhanced frequency scans (e.g., 50% in a first scanned frequency band, and 50% in a second scanned frequency band) and the scanning indicates signal existence in one frequency band but not in the other, ML1 should not discard that candidate (e.g., a subsequent FSCAN procedure should include the candidate frequency channel).

Figure 14:
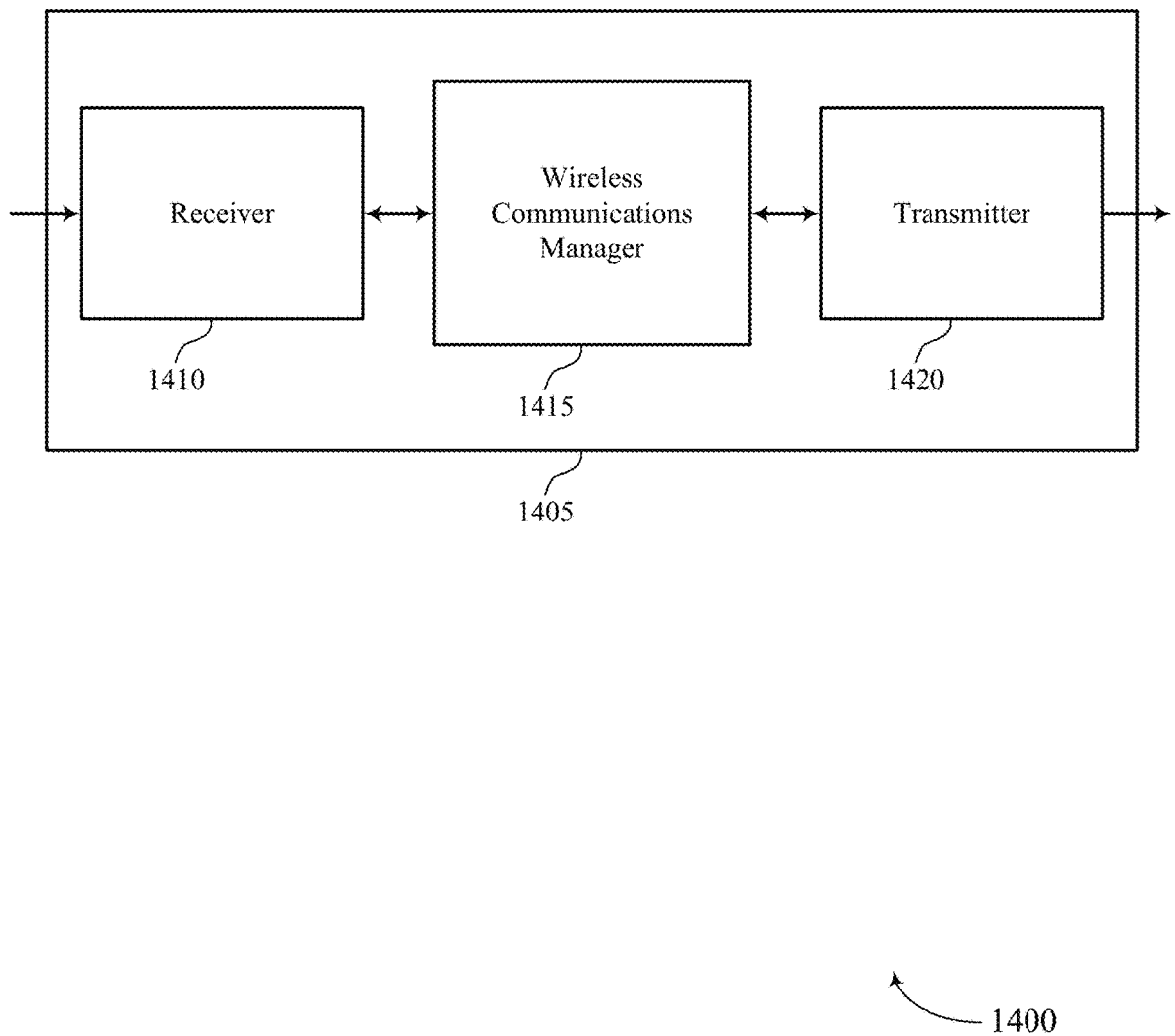
FIGS. 14 through 17 show block diagrams of devices that support correlation-enhanced frequency scanning, in accordance with aspects of the present disclosure.

FIG. 14 shows a block diagram 1400 of a wireless device 1405 that supports correlation-enhanced frequency scanning, in accordance with aspects of the present disclosure. Wireless device 1405 may be an example of aspects of a UE 115 as described herein. Wireless device 1405 may include receiver 1410, wireless communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to correlation-enhanced frequency scanning, etc.). Information may be passed on to other components of the device. The receiver 1410 may be an example of aspects of the transceiver 1935 described with reference to FIG. 19. The receiver 1410 may utilize a single antenna or a set of antennas.

Wireless communications manager 1415 and/or at least some of its various sub-components may be implemented in hardware, software executed by a processor, firmware, or any combination thereof. If implemented in software executed by a processor, the functions of the wireless communications manager 1415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The wireless communications manager 1415 and/or at least some of its various sub-components may be physically located at various positions, including being distributed such that portions of functions are implemented at different physical locations by one or more physical devices. In some examples, wireless communications manager 1415 and/or at least some of its various sub-components may be a separate and distinct component in accordance with various aspects of the present disclosure. In other examples, wireless communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Wireless communications manager 1415 may be an example of aspects of the wireless communications manager 1915 described with reference to FIG. 19.

In some examples the wireless communications manager 1415 may receive a signal corresponding to a frequency band, perform a correlation calculation between samples of the received signal in each of a set of first sampling intervals and samples of the received signal in each of a respective one of a set of second sampling intervals, where each of the set of first sampling intervals and the respective one of the set of second sampling intervals is associated with a respective one of a set of correlation pairs, apply a weight to results of the correlation calculation for each of the set of correlation pairs, determine a communications activity detection metric based on the weighted results of the correlation calculation of each of the set of correlation pairs, and determine whether to attempt a connection establishment within the frequency band based on the communications activity detection metric.

In some examples the wireless communications manager 1415 may receive a signal corresponding to a frequency band, perform a correlation calculation between samples of the received signal in each of a set of first sampling intervals and samples of the received signal in each of a respective one of a set of second sampling intervals, where each of the set of first sampling intervals and the respective one of the set of second sampling intervals is associated with a respective one of a set of correlation pairs, sum, for each position of a periodic repetition, results of the correlation calculation for ones of the set of correlation pairs associated with the respective position, apply a comb filter to the summed results for the set of positions, determine a communications activity detection metric based on the comb filtered results, and determine whether to attempt a connection establishment within the frequency band based on the communications activity detection metric.

In some examples, the wireless communications manager 1415 may receive a signal corresponding to a frequency band, scan for communications activity within the frequency band, where scanning for communications activity within the frequency band includes performing a correlation calculation on samples of the signal, and determine whether to attempt a connection establishment within the frequency band based on the correlation calculation on samples of the signal.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1935 described with reference to FIG. 19. The transmitter 1420 may utilize a single antenna or a set of antennas.

Figure 15:
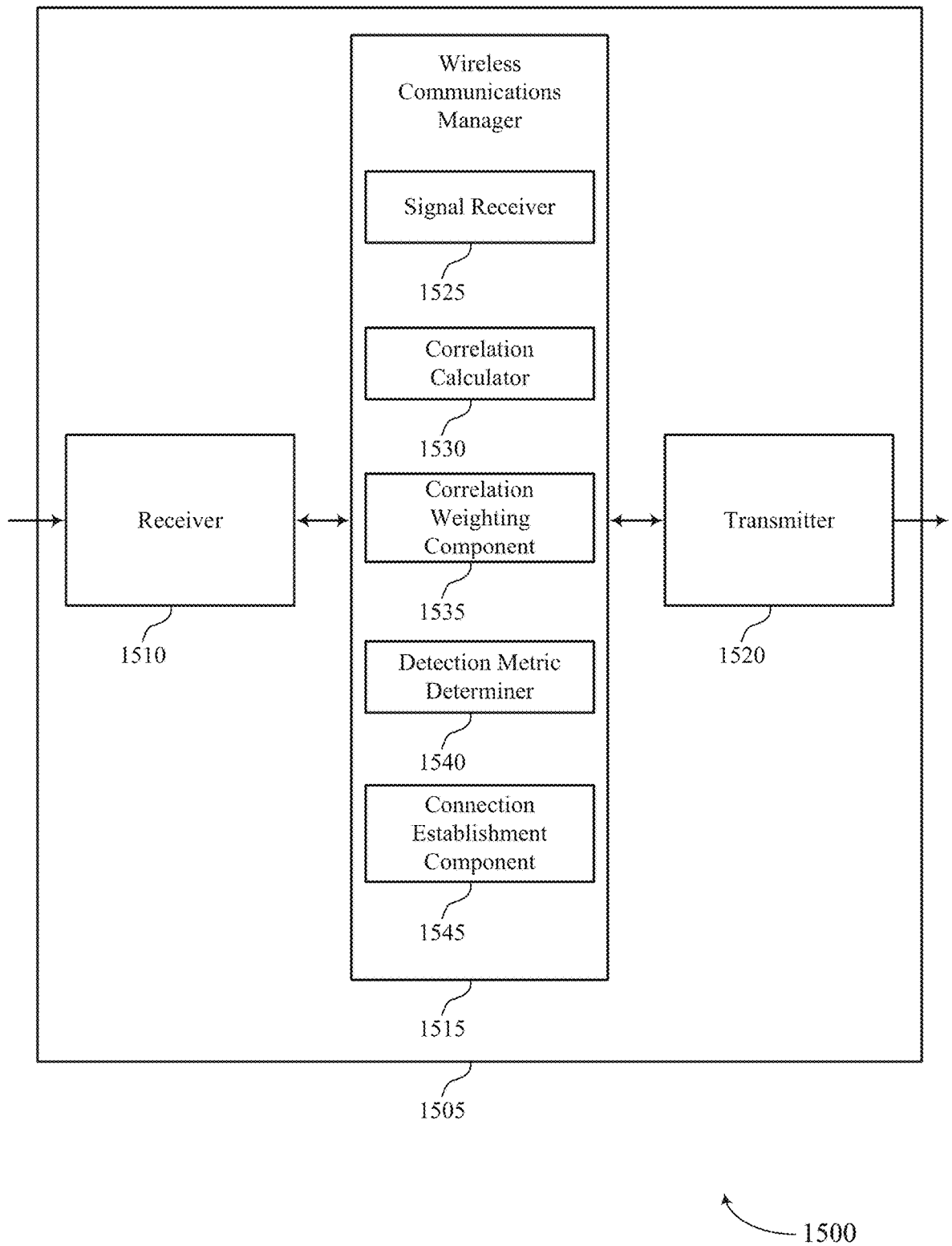

FIG. 15 shows a block diagram 1500 of a wireless device 1505 that supports correlation-enhanced frequency scanning in accordance with aspects of the present disclosure. Wireless device 1505 may be an example of aspects of a UE 115 or a wireless device 1405 as described with reference to FIG. 14. Wireless device 1505 may include receiver 1510, wireless communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to correlation-enhanced frequency scanning, etc.). Information may be passed on to other components of the device. The receiver 1510 may be an example of aspects of the transceiver 1935 described with reference to FIG. 19. The receiver 1510 may utilize a single antenna or a set of antennas.

Wireless communications manager 1515 may be an example of aspects of the wireless communications managers 1415 or 1915 described with reference to FIGS. 14 and 19. Wireless communications manager 1515 may include signal receiver 1525, correlation calculator 1530, correlation weighting component 1535, detection metric determiner 1540, and connection establishment component 1545.

Signal receiver 1525 may receive a signal corresponding to a frequency band. In some examples, receiving the signal corresponding to the frequency band includes receiving the signal via a set of antennas. In some examples, receiving the signal corresponding to the frequency band includes receiving the signal across a set of correlation windows that are consecutive in the time domain.

Correlation calculator 1530 may perform a correlation calculation between samples of the received signal in each of a set of first sampling intervals and samples of the received signal in each of a respective one of a set of second sampling intervals, where each of the set of first sampling intervals and the respective one of the set of second sampling intervals is associated with a respective one of a set of correlation pairs. In some examples, for each of the set of correlation pairs, a beginning of the respective one of the set of first sampling intervals and a beginning of the respective one of the set of second sampling intervals is separated in time by a correlation period equal to a cyclic prefix repetition period. In some cases, each of the set of correlation pairs is associated with one of a set of lags, each of the set of lags corresponding to a different sampling time shift that is shorter than a correlation period between a beginning of one of the set of first sampling intervals and a beginning of the respective one of the set of second sampling intervals associated with one of the set of correlation pairs.

Correlation weighting component 1535 may apply a weight to results of the correlation calculation for each of the set of correlation pairs. In some cases, applying the weight to results of the correlation calculation for each of the set of correlation pairs is based on load condition associated with the respective one of the set of correlation pairs, a signal quality associated with the respective one of the set of correlation pairs, or a combination thereof.

Detection metric determiner 1540 may determine a communications activity detection metric based on the results (e.g., weighted results) of the correlation calculation of each of a set of correlation pairs. In some cases, determining the communications activity detection metric includes dividing a maximum of the summed correlation calculation results for each of the set of lags by an average of summed correlation calculation results for each of the set of lags.

Connection establishment component 1545 may determine whether to attempt a connection establishment within the frequency band based on the communications activity detection metric. In some cases the connection establishment component 1545 may attempt to establish a connection with a base station over a channel within the frequency band. In some cases, determining whether to perform a connection establishment within the frequency band includes determining a candidate list of frequency channels for attempting to establish a connection with a base station within the frequency band. In some cases, attempting to establish a connection with the base station over the channel within the frequency band includes performing a synchronization with the base station.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1935 described with reference to FIG. 19. The transmitter 1520 may utilize a single antenna or a set of antennas.

Figure 16:
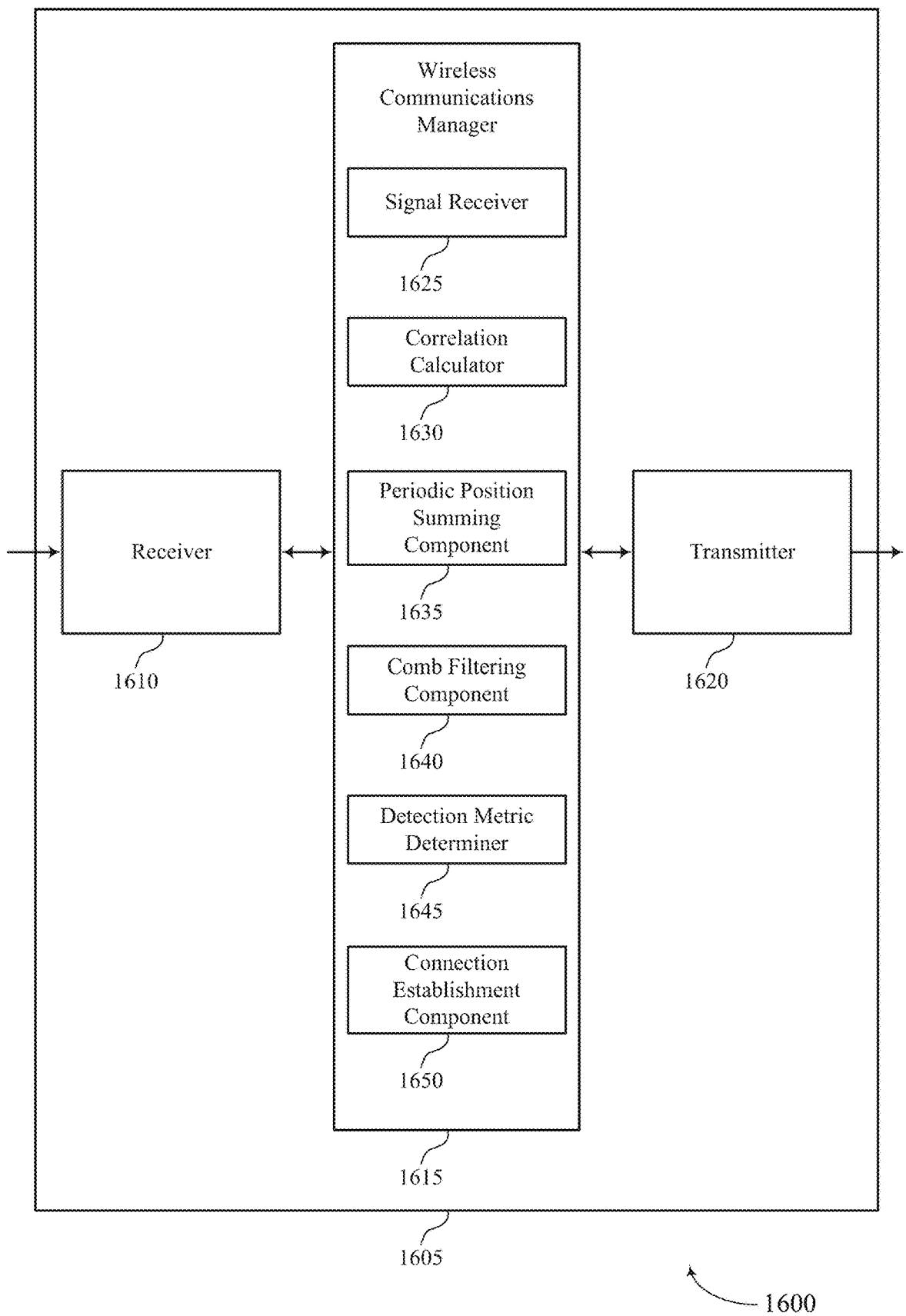

FIG. 16 shows a block diagram 1600 of a wireless device 605 that supports correlation-enhanced frequency scanning in accordance with aspects of the present disclosure. Wireless device 1605 may be an example of aspects of a UE 115 or a wireless device 1405 as described with reference to FIG. 14. Wireless device 1605 may include receiver 1610, wireless communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to correlation-enhanced frequency scanning, etc.). Information may be passed on to other components of the device. The receiver 1610 may be an example of aspects of the transceiver 1935 described with reference to FIG. 19. The receiver 1610 may utilize a single antenna or a set of antennas.

Wireless communications manager 1615 may be an example of aspects of the wireless communications managers 1415 or 1915 described with reference to FIGS. 14 and 19. Wireless communications manager 1615 may include signal receiver 1625, correlation calculator 1630, periodic position summing component 1635, comb filtering component 1640, detection metric determiner 1645, and connection establishment component 1650.

Signal receiver 1625 may receive a signal corresponding to a frequency band. In some examples, receiving the signal corresponding to the frequency band includes receiving the signal via a set of antennas. In some examples, receiving the signal corresponding to the frequency band includes receiving the signal across a set of correlation windows that are consecutive in the time domain.

Correlation calculator 1630 may perform a correlation calculation between samples of the received signal in each of a set of first sampling intervals and samples of the received signal in each of a respective one of a set of second sampling intervals, where each of the set of first sampling intervals and the respective one of the set of second sampling intervals is associated with a respective one of a set of correlation pairs. In some examples, for each of the set of correlation pairs, a beginning of the respective one of the set of first sampling intervals and a beginning of the respective one of the set of second sampling intervals is separated in time by a correlation period equal to a cyclic prefix repetition period. In some cases, each of the set of correlation pairs is associated with one of a set of lags, each of the set of lags corresponding to a different sampling time shift that is shorter than a correlation period between a beginning of one of the set of first sampling intervals and a beginning of the respective one of the set of second sampling intervals associated with one of the set of correlation pairs.

Periodic position summing component 1635 may sum, for each position of a periodic repetition, results of the correlation calculation for ones of the set of correlation pairs associated with the respective position. In some cases, the periodic repetition corresponds to a slot duration having a set of OFDMA symbol durations, each position corresponding to a different one of the set of OFDMA symbol durations, and the comb filter is configured according to a CRS transmission pattern of a cell having slot-level periodicity. In some cases, the periodic repetition corresponds to a frame duration having a set of subframe durations, each position corresponding to a different one of the set of subframe durations, and the comb filter is configured according to a UL/DL TDD configuration having frame-level periodicity.

Comb filtering component 1640 may apply a comb filter to the summed results for the set of positions. In some cases a comb filter may be applied to results processed according to a set of correlation windows. In some cases a comb filter may be applied after determining an initial indication of inactivity on the frequency band. In some cases, the comb filter is configured according to a timing of CRS transmissions. In some cases, the comb filter is configured according to one or more UL/DL TDD configurations.

Detection metric determiner 1645 may determine a communications activity detection metric based on the comb filtered results. In some cases a detection metric may be determined for each of a set of positions of a comb filter, and determining the detection metric includes dividing a result of the correlation calculation for the respective one of the set of positions of the comb filter by an average result of the correlation calculation for the set of positions of the comb filter. In some cases, determining the communications activity detection metric includes dividing a maximum of the summed correlation calculation results for each of a set of lags by an average of summed correlation calculation results for each of the set of lags.

Connection establishment component 1650 may determine whether to attempt a connection establishment within the frequency band based on the communications activity detection metric. In some cases, determining whether to perform a connection establishment within the frequency band includes determining a candidate list of frequency channels for attempting to establish a connection with a base station within the frequency band. In some cases, attempting to establish a connection with the base station over the channel within the frequency band includes performing a synchronization with the base station.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may utilize a single antenna or a set of antennas.

Figure 17:
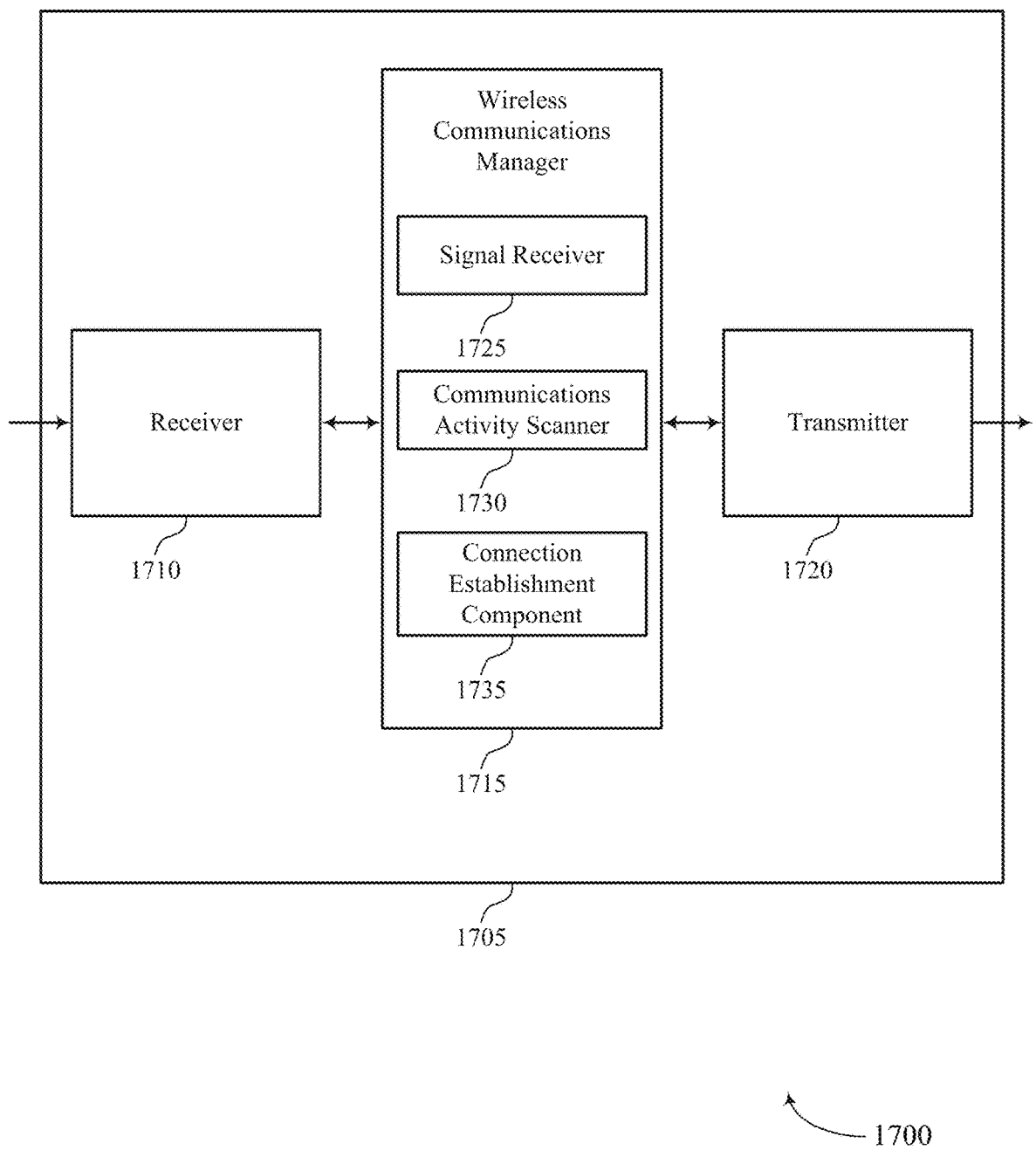

FIG. 17 shows a block diagram 1700 of a wireless device 1705 that supports correlation-enhanced frequency scanning in accordance with aspects of the present disclosure. Wireless device 1705 may be an example of aspects of a wireless device 1405 or a UE 115 as described with reference to FIG. 14. Wireless device 1705 may include receiver 1710, wireless communications manager 1515, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to correlation-enhanced frequency scanning, etc.). Information may be passed on to other components of the device. The receiver 1710 may be an example of aspects of the transceiver 1935 described with reference to FIG. 19. The receiver 1710 may utilize a single antenna or a set of antennas.

Wireless communications manager 1715 may be an example of aspects of the wireless communications managers 1415 or 1915 described with reference to FIGS. 14 and 19. Wireless communications manager 1715 may include signal receiver 1725, communications activity scanner 1730, and connection establishment component 1735.

Signal receiver 1725 may receive a signal corresponding to a frequency band. In some examples, receiving the signal corresponding to the frequency band includes receiving the signal via a set of antennas. In some examples, receiving the signal corresponding to the frequency band includes receiving the signal across a set of correlation windows that are consecutive in the time domain.

Communications activity scanner 1730 may scan for communications activity within the frequency band, where scanning for communications activity within the frequency band includes performing a correlation calculation on samples of the signal. In some examples the communications activity scanner 1730 may determine a first indication of communications activity within the frequency band based on a detection metric. In some examples the communications activity scanner 1730 may determine a second indication of communications activity within the frequency band based on the comb filtered results. In some examples the communications activity scanner 1730 may determine an indication of communications activity within the frequency band based on a maximum detection metric from the detection metrics determined for each the set of positions of the comb filter. In some examples the communications activity scanner 1730 may scan for communications activity within a second frequency band, where scanning for communications activity within the second frequency band includes performing the correlation calculation on samples of the second signal.

Connection establishment component 1735 may determine whether to attempt a connection establishment within the frequency band based on the correlation calculation on samples of the signal. In some cases, determining whether to perform a connection establishment within the frequency band includes: determining a candidate list of frequency channels for attempting to establish a connection with a base station within the frequency band. In some cases, attempting to establish a connection with the base station over the channel within the frequency band includes: performing a synchronization with the base station.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may utilize a single antenna or a set of antennas.

Figure 18:
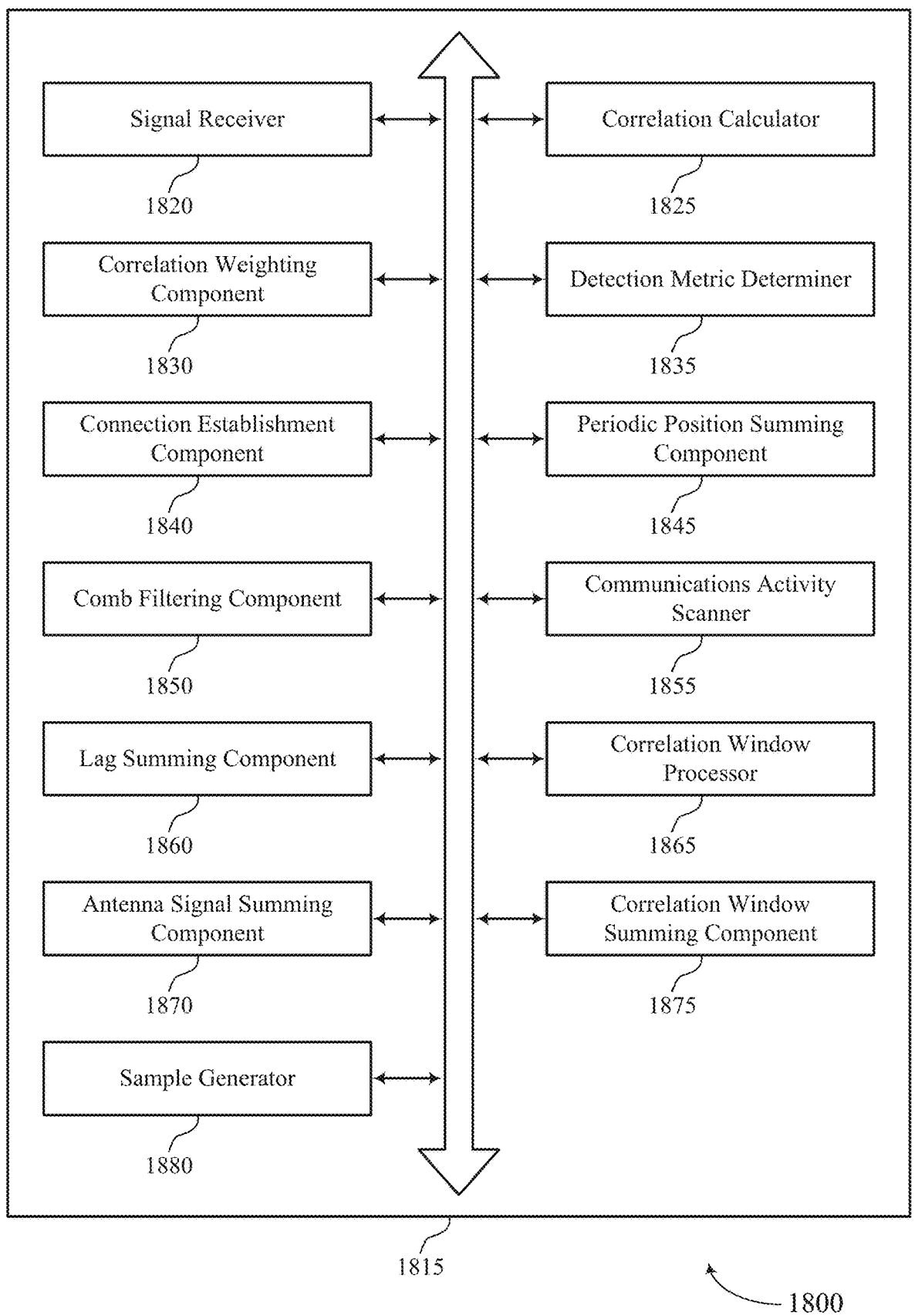
FIG. 18 shows a block diagrams of a wireless communications manager that supports correlation-enhanced frequency scanning, in accordance with aspects of the present disclosure.

FIG. 18 shows a block diagram 1800 of a wireless communications manager 1815 that supports correlation-enhanced frequency scanning in accordance with aspects of the present disclosure. The wireless communications manager 1815 may be an example of aspects of a wireless communications manager 1415, a wireless communications manager 1515, a wireless communications manager 1615, a wireless communications manager 1715, or a wireless communications manager 1915 described with reference to FIGS. 14, 15, 16, 17, and 19. The wireless communications manager 1815 may include signal receiver 1820, correlation calculator 1825, correlation weighting component 1830, detection metric determiner 1835, connection establishment component 1840, periodic position summing component 1845, comb filtering component 1850, communications activity scanner 1855, lag summing component 1860, correlation window processor 1865, antenna signal summing component 1870, correlation window summing component 1875, and sample generator 1880. Each of these modules may communicate, directly or indirectly, with one another (e.g., via one or more buses).

Signal receiver 1820 may receive a signal corresponding to a frequency band. In some cases, receiving the signal corresponding to the frequency band includes receiving the signal via a set of antennas. In some cases, receiving the signal corresponding to the frequency band includes receiving the signal across a set of correlation windows that are consecutive in the time domain, and receive a second signal corresponding to a second frequency band.

Correlation calculator 1825 may perform a correlation calculation between samples of the received signal in each of a set of first sampling intervals and samples of the received signal in each of a respective one of a set of second sampling intervals, where each of the set of first sampling intervals and the respective one of the set of second sampling intervals is associated with a respective one of a set of correlation pairs. In some examples, for each of the set of correlation pairs, a beginning of the respective one of the set of first sampling intervals and a beginning of the respective one of the set of second sampling intervals is separated in time by a correlation period equal to a cyclic prefix repetition period. In some cases, each of the set of correlation pairs is associated with one of a set of lags, each of the set of lags corresponding to a different sampling time shift that is shorter than a correlation period between a beginning of one of the set of first sampling intervals and a beginning of the respective one of the set of second sampling intervals associated with one of the set of correlation pairs.

Correlation weighting component 1830 may apply a weight to results of the correlation calculation for each of the set of correlation pairs. In some cases, applying the weight to results of the correlation calculation for each of the set of correlation pairs is based on a load condition associated with the respective one of the set of correlation pairs, a signal quality associated with the respective one of the set of correlation pairs, or a combination thereof.

Detection metric determiner 1835 may determine a communications activity detection metric based on the results of the correlation calculation of each of the set of correlation pairs, which may be based on weighted or comb filtered results. In some cases a detection metric may be determined by dividing a maximum of the summed correlation calculation results for each of the set of lags by an average of summed correlation calculation results for each of the set of lags. In some cases a detection metric may be determined for each of a set of positions of the comb filter, where determining the detection metric includes dividing a result of the correlation calculation for the respective one of the set of positions of the comb filter by an average result of the correlation calculation for the set of positions of the comb filter.

Connection establishment component 1840 may determine whether to attempt a connection establishment within the frequency band based on the communications activity detection metric, or based on other correlation calculations on samples of the signal. In some cases the connection establishment component may attempt to establish a connection with a base station over a channel within the frequency band. In some cases, determining whether to perform a connection establishment within the frequency band includes determining a candidate list of frequency channels for attempting to establish a connection with a base station within the frequency band. In some cases, attempting to establish a connection with the base station over the channel within the frequency band includes performing a synchronization with the base station.

Periodic position summing component 1845 may sum, for each position of a periodic repetition, results of the correlation calculation for ones of the set of correlation pairs associated with the respective position. In some cases, the periodic repetition corresponds to a slot duration having a set of OFDMA symbol durations, each position corresponding to a different one of the set of OFDMA symbol durations, and a comb filter is configured according to a CRS transmission pattern of a cell having slot-level periodicity. In some cases, the periodic repetition corresponds to a frame duration having a set of subframe durations, each position corresponding to a different one of the set of subframe durations, and a comb filter is configured according to a UL/DL TDD configuration having frame-level periodicity.

Comb filtering component 1850 may apply a comb filter to the summed results for the set of positions, apply a comb filter to the results processed according to the set of correlation windows, and apply the comb filter is performed after determining an initial indication of inactivity on the frequency band. In some cases, the comb filter is configured according to a timing of CRS transmissions. In some cases, the comb filter is configured according to one or more UL/DL TDD configurations.

Communications activity scanner 1855 may scan for communications activity within the frequency band, where scanning for communications activity within the frequency band includes performing a correlation calculation on samples of the signal. In some cases the communications activity scanner 1855 may determine a first indication of communications activity within the frequency band based on a detection metric. In some cases the communications activity scanner 1855 may determine a second indication of communications activity within the frequency band based on comb filtered results. In some cases the communications activity scanner 1855 may determine an indication of communications activity within the frequency band based on a maximum detection metric from the detection metrics determined for each the set of positions of the comb filter. In some cases the communications activity scanner 1855 may scan for communications activity within the second frequency band, where scanning for communications activity within the second frequency band includes performing the correlation calculation on samples of the second signal.

Lag summing component 1860 may sum, for each of the set of lags, the weighted results of the correlation calculation for correlation pairs associated with the respective one of the set of lags, where determining the communications activity detection metric is based on the summed correlation calculation results for each of the set of lags. In some cases, each of the set of correlation pairs is associated with one of a set of lags, each of the set of lags corresponding to a different sampling time shift that is shorter than a correlation period between a beginning of one of the set of first sampling intervals and a beginning of the respective one of the set of second sampling intervals associated with one of the set of correlation pairs and the summing includes summing, for each of the set of lags, results of the correlation calculation for the respective one of the set of lags. In some cases, scanning for communications activity within the frequency band includes summing, for each of the set of lags, the results of the correlation calculation for correlation pairs associated with the respective one of the set of lags, and determining a communications activity detection metric is based on the summed correlation calculation results for each of the set of lags.

Correlation window processor 1865 may process, according to a set of correlation windows, results of performing the correlation calculation between the samples of each of the set of first sampling intervals and the samples of the respective one of the set of second sampling intervals. In some cases, scanning for communications activity within the frequency band includes processing, according to a set of correlation windows that are consecutive in the time domain, results of performing the correlation calculation between the samples of each of the set of first sampling intervals and the samples of a respective one of the set of second sampling intervals.

Antenna signal summing component 1870 may sum results of the correlation calculation for correlation pairs for each of the set of antennas.

Correlation window summing component 1875 may sum results of the correlation calculation for correlation pairs for each of the set of correlation windows.

Sample generator 1880 may generate the samples of each of the set of second sampling intervals to span a sampling frequency bandwidth. In some cases, the sample generator 1880 may generate the samples of each of the set of first sampling intervals to span a sampling frequency bandwidth that is greater than a bandwidth of a subcarrier.

Figure 19:
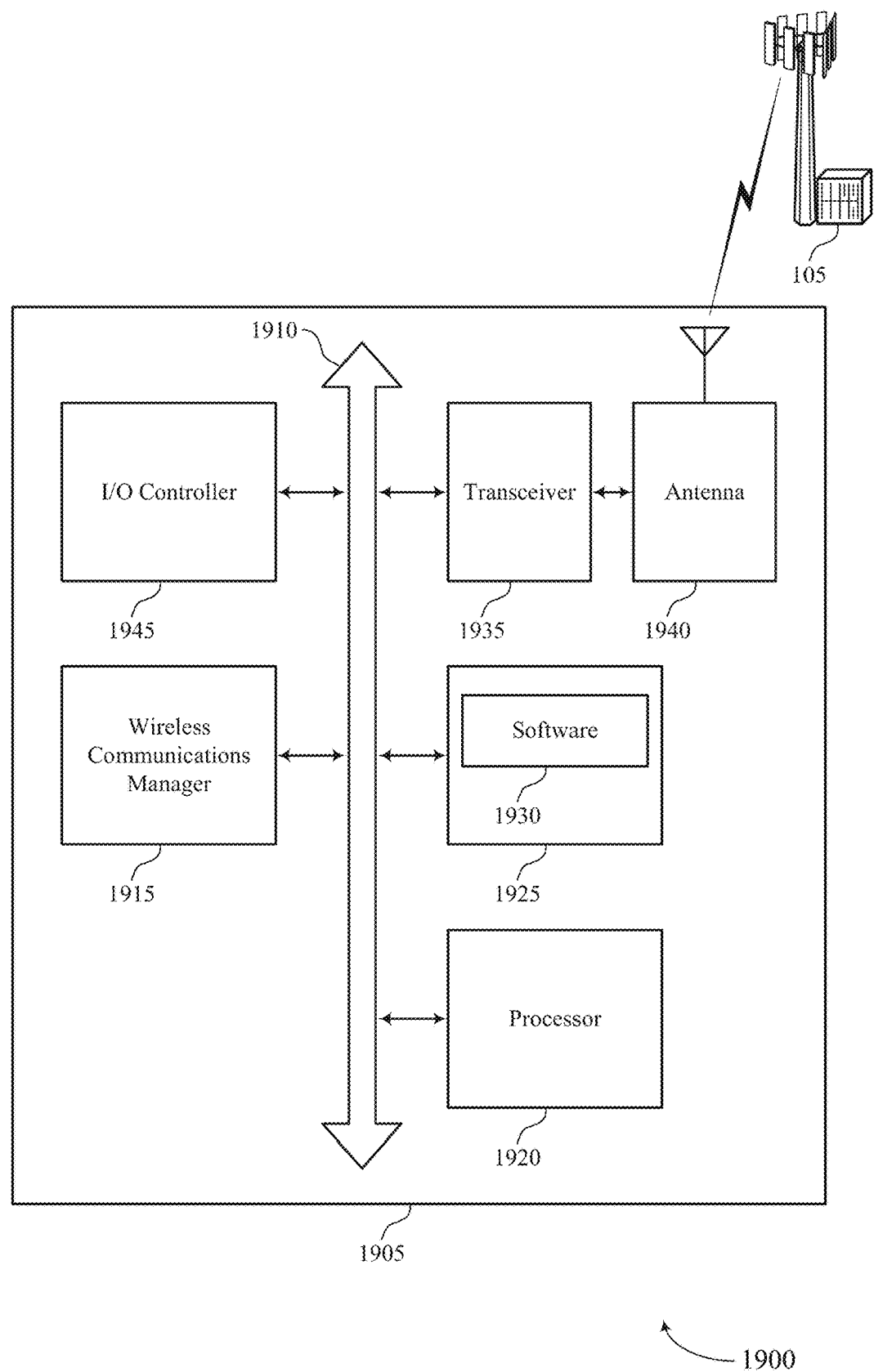
FIG. 19 illustrates a block diagram of a system including a UE that supports correlation-enhanced frequency scanning in, in accordance with aspects of the present disclosure.

FIG. 19 shows a diagram of a system 1900 including a device 1905 that supports correlation-enhanced frequency scanning in accordance with aspects of the present disclosure. Device 1905 may be an example of or include the components of wireless device 1405, wireless device 1505, wireless device 1605, wireless device 1705 or a UE 115 as described above, e.g., with reference to FIGS. 14 through 17. Device 1905 may include components for bi-directional voice and data communications including components for transmitting and receiving communications, including wireless communications manager 1915, processor 1920, memory 1925, software 1930, transceiver 1935, antenna 1940, and I/O controller 1945. These components may be in electronic communication via one or more buses (e.g., bus 1910). Device 1905 may communicate wirelessly with one or more base stations 105.

Processor 1920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting correlation-enhanced frequency scanning).

Memory 1925 may include random access memory (RAM) and read only memory (ROM). The memory 1925 may store computer-readable, computer-executable software 1930 including instructions that, when executed (e.g., by the processor 1920), cause the device 1905 to perform various functions described herein. In some cases, the memory 1925 may contain, among other things, a basic input/output system (BIOS) which may control basic hardware or software operation such as the interaction with peripheral components or devices.

Software 1930 may include code to implement aspects of the present disclosure, including instructions to support correlation-enhanced frequency scanning. Software 1930 may be stored in a non-transitory computer-readable medium such as system memory or other memory (e.g., memory 1925). In some cases, the software 1930 may not be directly executable by the processor 1920 but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions.

I/O controller 1945 may manage input and output signals for device 1905. I/O controller 1945 may also manage peripherals not integrated into device 1905. In some cases, I/O controller 1945 may represent a physical connection or port to an external peripheral. In some cases, I/O controller 1945 may utilize an operating system such as iOS®, ANDROID®, MS-DOS®, MS-WINDOWS®, OS/2®, UNIX®, LINUX®, or another known operating system. In other cases, I/O controller 1945 may represent or interact with a modem, a keyboard, a mouse, a touchscreen, or a similar device. In some cases, I/O controller 1945 may be implemented as part of a processor. In some cases, a user may interact with device 1905 via I/O controller 1945 or via hardware components controlled by I/O controller 1945.

Figure 20:
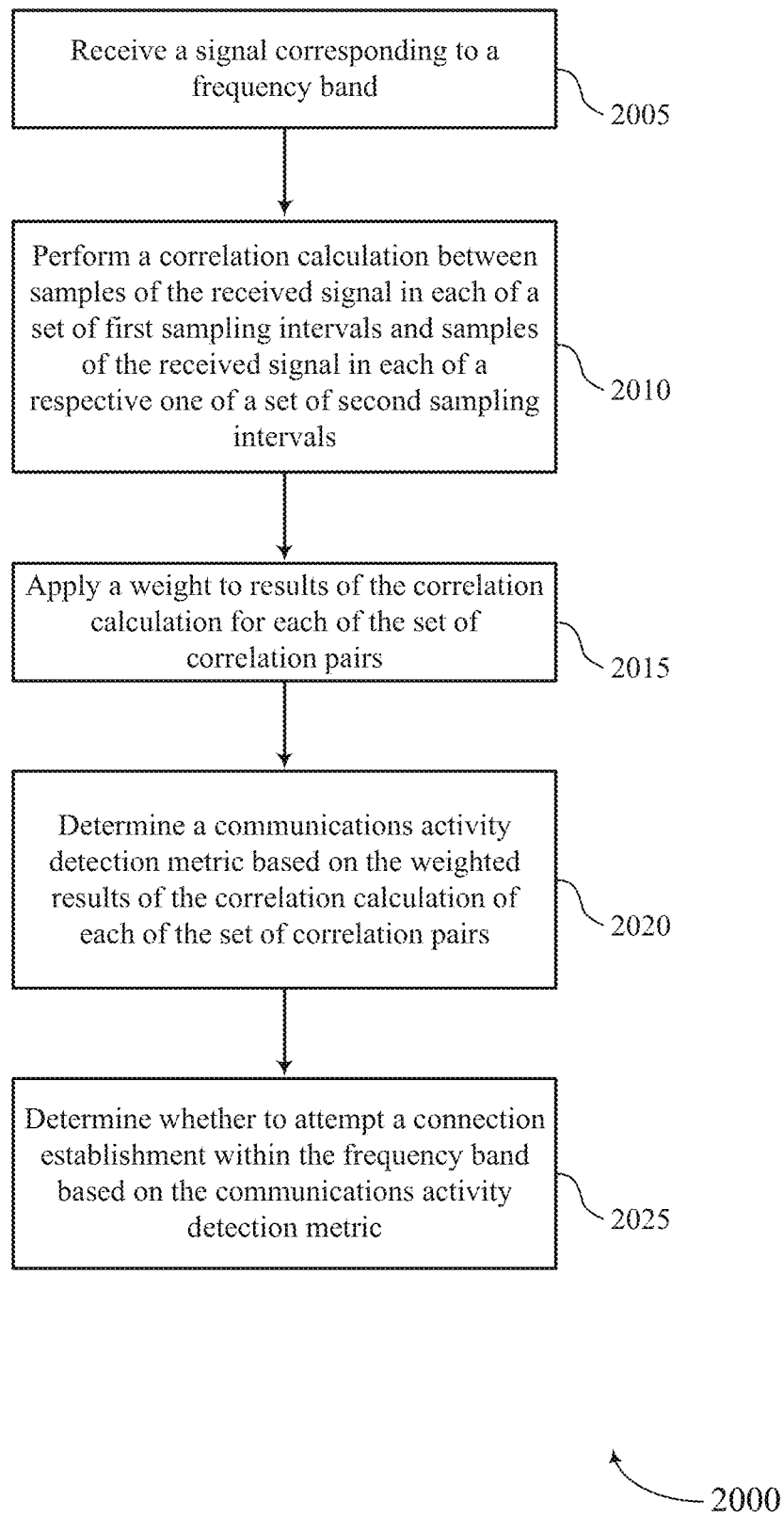
FIGS. 20 through 25 illustrate methods for correlation-enhanced frequency scanning, in accordance with aspects of the present disclosure.

FIG. 20 shows a flowchart illustrating a method 2000 for correlation-enhanced frequency scanning in accordance with aspects of the present disclosure. The operations of method 2000 may be implemented by a UE 115 or its components as described herein. For example, the operations of method 2000 may be performed by a wireless communications manager as described with reference to FIGS. 14 through 19. In some examples, a UE 115 may execute a set of instructions to control the functional elements of the device to perform the functions described below. Additionally or alternatively, the UE 115 may perform aspects of the functions described below using special-purpose hardware.

At 2005 the UE 115 may receive a signal corresponding to a frequency band. The operations of 2005 may be performed according to the methods described herein. In certain examples, aspects of the operations of 2005 may be performed by a signal receiver as described with reference to FIGS. 15 through 18.

At 2010 the UE 115 may perform a correlation calculation between samples of the received signal in each of a plurality of first sampling intervals and samples of the received signal in each of a respective one of a plurality of second sampling intervals. In some examples, each of the plurality of first sampling intervals and the respective one of the plurality of second sampling intervals may be associated with a respective one of a plurality of correlation pairs. The operations of 2010 may be performed according to the methods described herein. In certain examples, aspects of the operations of 2010 may be performed by a correlation calculator as described with reference to FIG. 15, 16, or 18.

At 2015 the UE 115 may apply a weight to results of the correlation calculation for each of the plurality of correlation pairs. The operations of 2015 may be performed according to the methods described herein. In certain examples, aspects of the operations of 2015 may be performed by a correlation weighting component as described with reference to FIG. 15 or 18.

At 2020 the UE 115 may determine a communications activity detection metric based at least in part on the weighted results of the correlation calculation of each of the plurality of correlation pairs. The operations of 2020 may be performed according to the methods described herein. In certain examples, aspects of the operations of 2020 may be performed by a detection metric determiner as described with reference to FIG. 15, 16, or 18.

At 2025 the UE 115 may determine whether to attempt a connection establishment within the frequency band based at least in part on the communications activity detection metric. The operations of 2025 may be performed according to the methods described herein. In certain examples, aspects of the operations of 2025 may be performed by a connection establishment component as described with reference to FIGS. 15 through 18.

Figure 21:
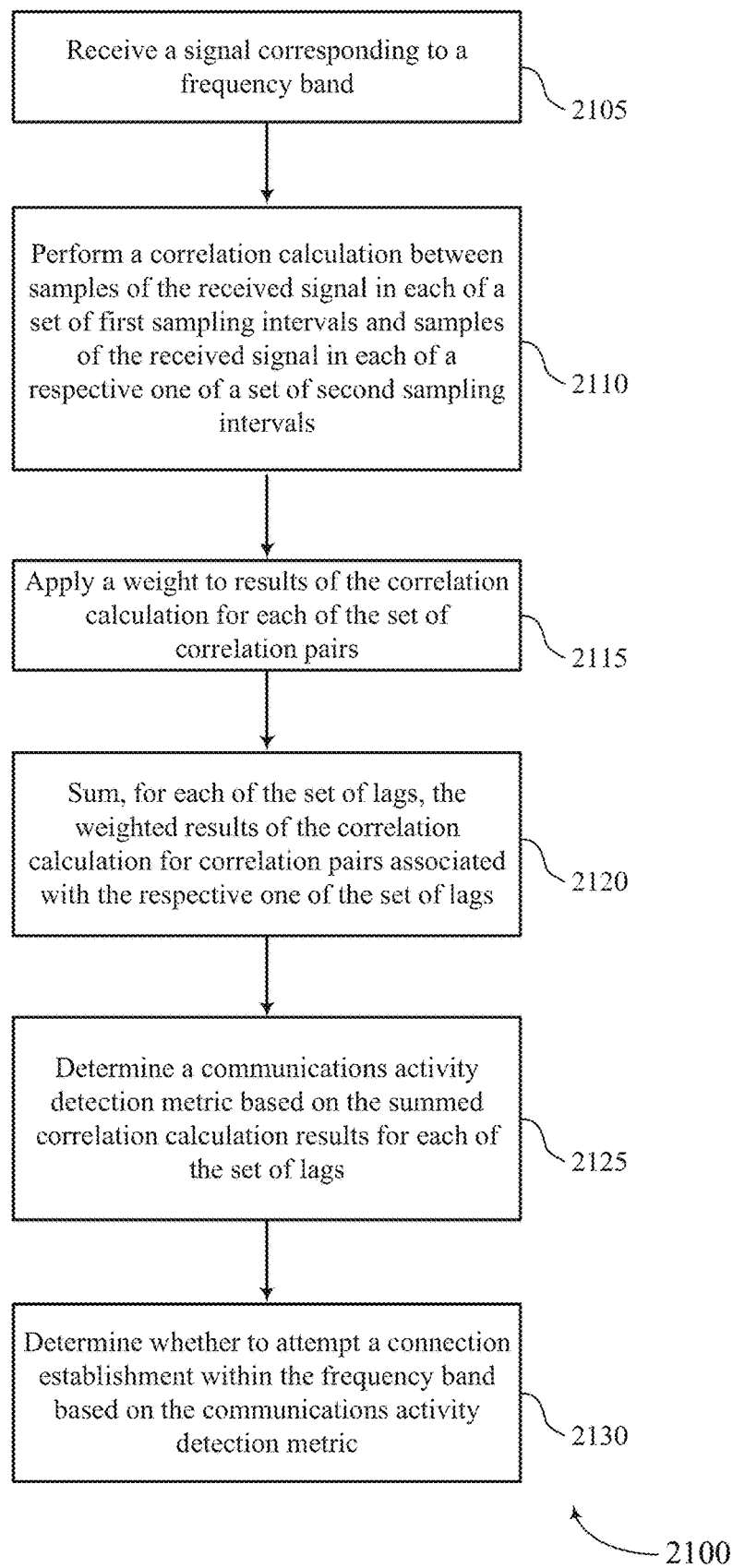

FIG. 21 shows a flowchart illustrating a method 2100 for correlation-enhanced frequency scanning in accordance with aspects of the present disclosure. The operations of method 2100 may be implemented by a UE 115 or its components as described herein. For example, the operations of method 2100 may be performed by a wireless communications manager as described with reference to FIGS. 14 through 19. In some examples, a UE 115 may execute a set of instructions to control the functional elements of the device to perform the functions described below. Additionally or alternatively, the UE 115 may perform aspects of the functions described below using special-purpose hardware.

At 2105 the UE 115 may receive a signal corresponding to a frequency band. The operations of 2105 may be performed according to the methods described herein. In certain examples, aspects of the operations of 2105 may be performed by a signal receiver as described with reference to FIGS. 15 through 18.

At 2110 the UE 115 may perform a correlation calculation between samples of the received signal in each of a plurality of first sampling intervals and samples of the received signal in each of a respective one of a plurality of second sampling intervals. In some examples, each of the plurality of first sampling intervals and the respective one of the plurality of second sampling intervals is associated with a respective one of a plurality of correlation pairs. The operations of 2110 may be performed according to the methods described herein. In certain examples, aspects of the operations of 2110 may be performed by a correlation calculator as described with reference to FIGS. 14 through 19.

At 2115 the UE 115 may apply a weight to results of the correlation calculation for each of the plurality of correlation pairs. The operations of 2115 may be performed according to the methods described herein. In certain examples, aspects of the operations of 2115 may be performed by a correlation weighting component as described with reference to FIG. 15, 16, or 18.

At 2120 the UE 115 may sum, for each of the plurality of lags, the weighted results of the correlation calculation for correlation pairs associated with the respective one of the plurality of lags. The operations of 2120 may be performed according to the methods described herein. In certain examples, aspects of the operations of 2120 may be performed by a lag summing component as described with reference to FIG. 18.

At 2125 the UE 115 may determine a communications activity detection metric based at least in part on the summed correlation calculation results for each of the plurality of lags. In some cases, determining the communications activity detection metric includes dividing a maximum of the summed correlation calculation results for each of the plurality of lags by an average of summed correlation calculation results for each of the plurality of lags. The operations of 2125 may be performed according to the methods described herein. In certain examples, aspects of the operations of 2125 may be performed by a detection metric determiner as described with reference to FIG. 15, 16, or 18.

At 2130 the UE 115 may determine whether to attempt a connection establishment within the frequency band based at least in part on the communications activity detection metric. The operations of 2130 may be performed according to the methods described herein. In certain examples, aspects of the operations of 2130 may be performed by a connection establishment component as described with reference to FIGS. 15 through 18.

Figure 22:
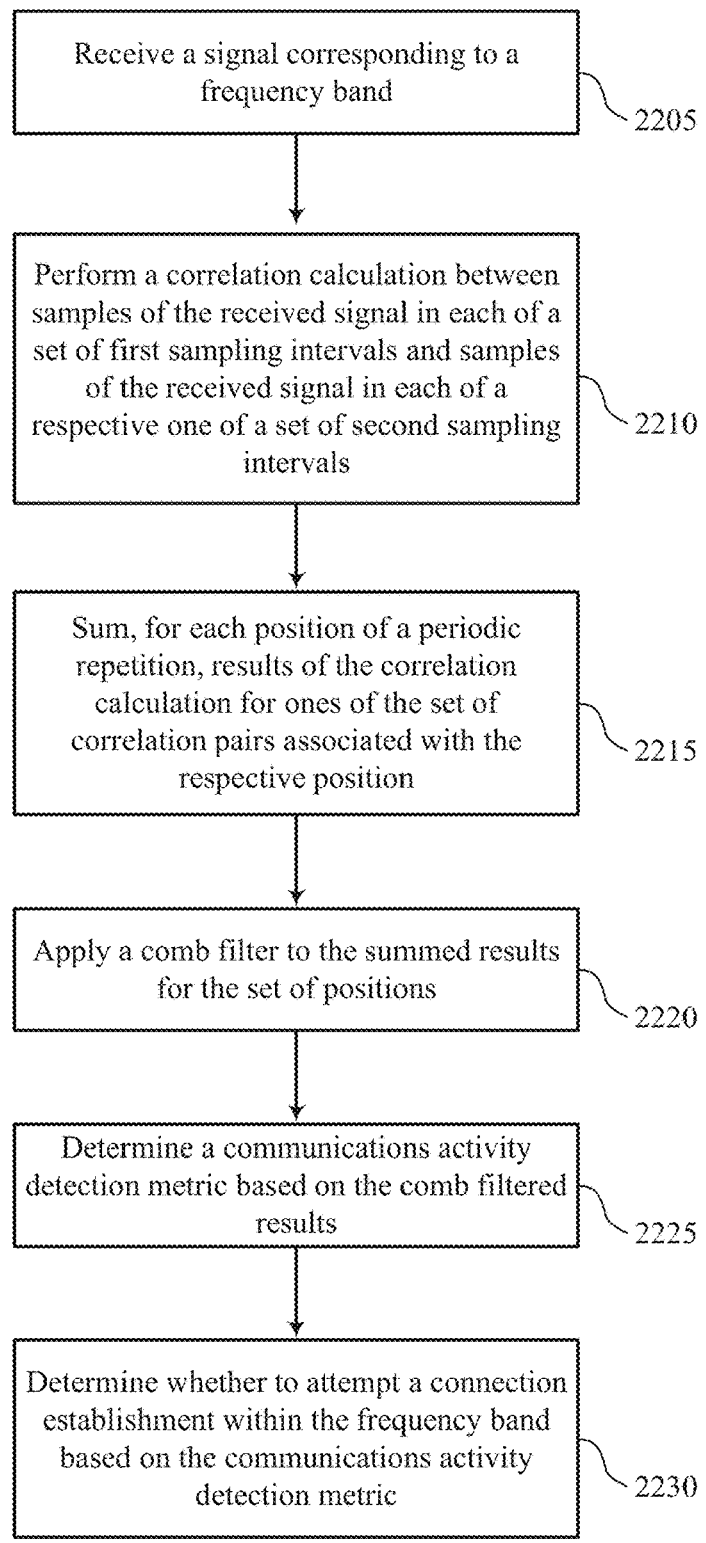

FIG. 22 shows a flowchart illustrating a method 2200 for correlation-enhanced frequency scanning in accordance with aspects of the present disclosure. The operations of method 2200 may be implemented by a UE 115 or its components as described herein. For example, the operations of method 2200 may be performed by a wireless communications manager as described with reference to FIGS. 14 through 19. In some examples, a UE 115 may execute a set of instructions to control the functional elements of the device to perform the functions described below. Additionally or alternatively, the UE 115 may perform aspects of the functions described below using special-purpose hardware.

At 2205 the UE 115 may receive a signal corresponding to a frequency band. The operations of 2205 may be performed according to the methods described herein. In certain examples, aspects of the operations of 2205 may be performed by a signal receiver as described with reference to FIGS. 15 through 18.

At 2210 the UE 115 may perform a correlation calculation between samples of the received signal in each of a plurality of first sampling intervals and samples of the received signal in each of a respective one of a plurality of second sampling intervals. In some examples, each of the plurality of first sampling intervals and the respective one of the plurality of second sampling intervals is associated with a respective one of a plurality of correlation pairs. The operations of 2210 may be performed according to the methods described herein. In certain examples, aspects of the operations of 2210 may be performed by a correlation calculator as described with reference to FIG. 15, 16, or 18.

At 2215 the UE 115 may sum, for each position of a periodic repetition, results of the correlation calculation for ones of the plurality of correlation pairs associated with the respective position. The operations of 2215 may be performed according to the methods described herein. In certain examples, aspects of the operations of 2215 may be performed by a periodic position summing component as described with reference to FIG. 16 or 18.

At 2220 the UE 115 may apply a comb filter to the summed results for the plurality of positions. The operations of 2220 may be performed according to the methods described herein. In certain examples, aspects of the operations of 2220 may be performed by a comb filtering component as described with reference to FIG. 16 or 18.

At 2225 the UE 115 may determine a communications activity detection metric based at least in part on the comb filtered results. The operations of 2225 may be performed according to the methods described herein. In certain examples, aspects of the operations of 2225 may be performed by a detection metric determiner as described with reference to FIG. 15, 16, or 18.

At 2230 the UE 115 may determine whether to attempt a connection establishment within the frequency band based at least in part on the communications activity detection metric. The operations of 2230 may be performed according to the methods described herein. In certain examples, aspects of the operations of 2230 may be performed by a connection establishment component as described with reference to FIGS. 15 through 18.

Figure 23:
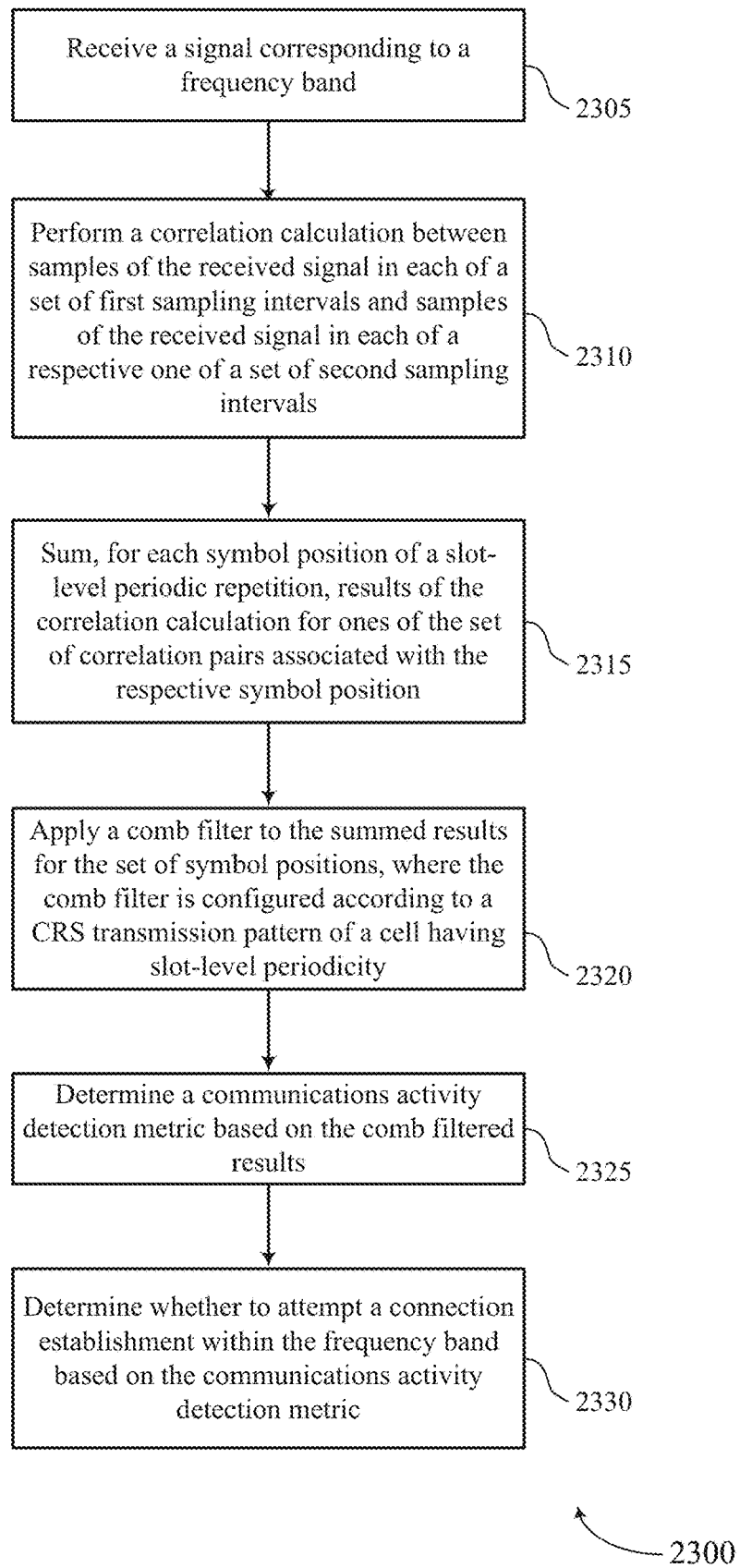

FIG. 23 shows a flowchart illustrating a method 2300 for correlation-enhanced frequency scanning in accordance with aspects of the present disclosure. The operations of method 2300 may be implemented by a UE 115 or its components as described herein. For example, the operations of method 2300 may be performed by a wireless communications manager as described with reference to FIGS. 14 through 19. In some examples, a UE 115 may execute a set of instructions to control the functional elements of the device to perform the functions described below. Additionally or alternatively, the UE 115 may perform aspects of the functions described below using special-purpose hardware.

At 2305 the UE 115 may receive a signal corresponding to a frequency band. The operations of 2305 may be performed according to the methods described herein. In certain examples, aspects of the operations of 2305 may be performed by a signal receiver as described with reference to FIGS. 15 through 18.

At 2310 the UE 115 may perform a correlation calculation between samples of the received signal in each of a plurality of first sampling intervals and samples of the received signal in each of a respective one of a plurality of second sampling intervals. In some examples, each of the plurality of first sampling intervals and the respective one of the plurality of second sampling intervals is associated with a respective one of a plurality of correlation pairs. The operations of 2310 may be performed according to the methods described herein. In certain examples, aspects of the operations of 2310 may be performed by a correlation calculator as described with reference to FIG. 15, 16, or 18.

At 2315 the UE 115 may sum, for each symbol position of a slot-level periodic repetition, results of the correlation calculation for ones of the plurality of correlation pairs associated with the respective symbol position. The operations of 2315 may be performed according to the methods described herein. In certain examples, aspects of the operations of 2315 may be performed by a periodic position summing component as described with reference to FIG. 16 or 18.

At 2320 the UE 115 may apply a comb filter to the summed results for the plurality of symbol positions, where the comb filter is configured according to a CRS transmission pattern of a cell having slot-level periodicity. The operations of 2320 may be performed according to the methods described herein. In certain examples, aspects of the operations of 2320 may be performed by a comb filtering component as described with reference to FIG. 16 or 18.

At 2325 the UE 115 may determine a communications activity detection metric based at least in part on the comb filtered results. The operations of 2325 may be performed according to the methods described herein. In certain examples, aspects of the operations of 2325 may be performed by a detection metric determiner as described with reference to FIG. 15, 16, or 18.

At 2330 the UE 115 may determine whether to attempt a connection establishment within the frequency band based at least in part on the communications activity detection metric. The operations of 2330 may be performed according to the methods described herein. In certain examples, aspects of the operations of 2330 may be performed by a connection establishment component as described with reference to FIGS. 15 through 18.

Figure 24:
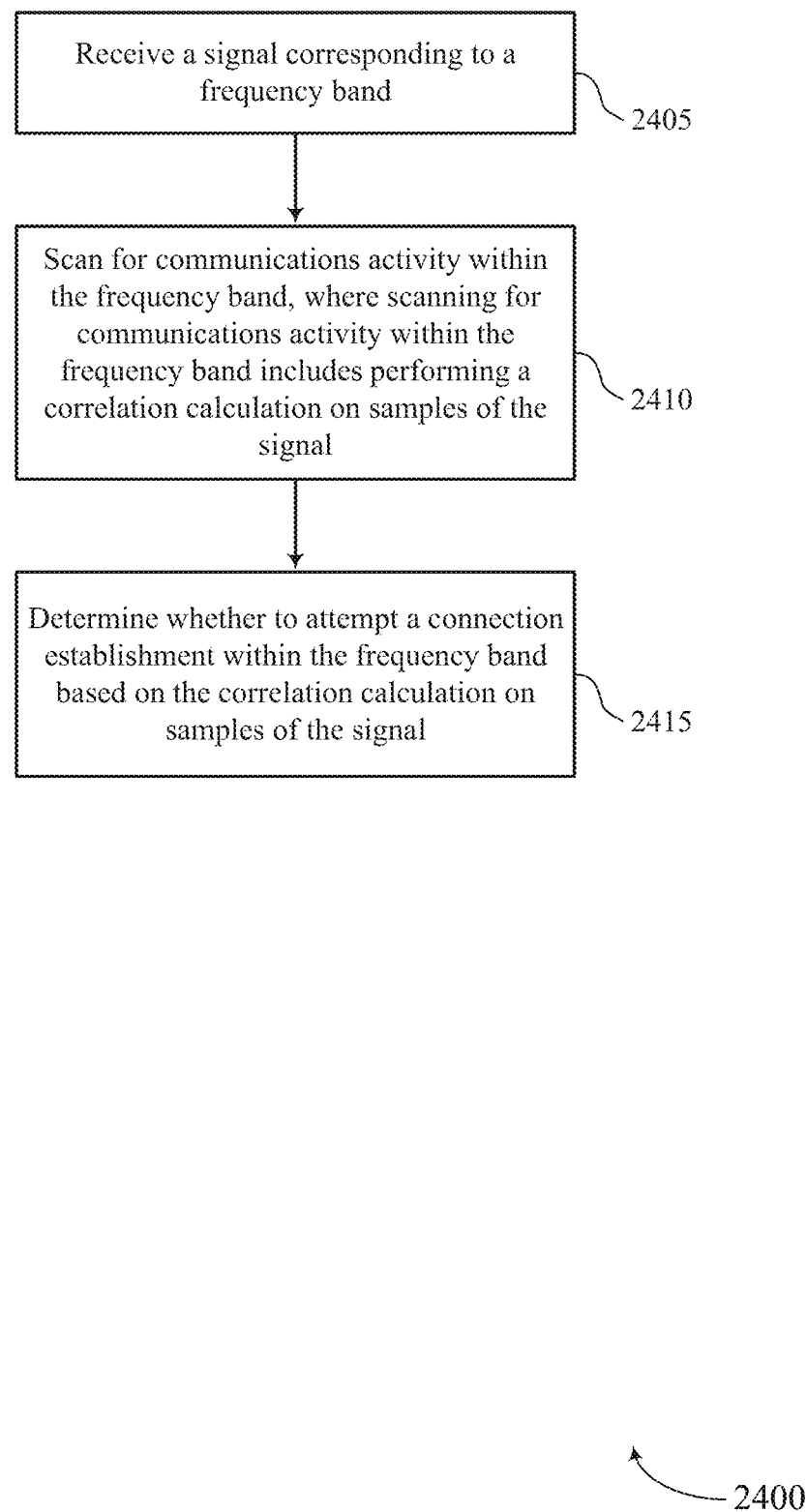

FIG. 24 shows a flowchart illustrating a method 2400 for correlation-enhanced frequency scanning in accordance with aspects of the present disclosure. The operations of method 2400 may be implemented by a UE 115 or its components as described herein. For example, the operations of method 2400 may be performed by a wireless communications manager as described with reference to FIGS. 14 through 19. In some examples, a UE 115 may execute a set of instructions to control the functional elements of the device to perform the functions described below. Additionally or alternatively, the UE 115 may perform aspects of the functions described below using special-purpose hardware.

At 2405 the UE 115 may receive a signal corresponding to a frequency band. The operations of 2405 may be performed according to the methods described herein. In certain examples, aspects of the operations of 2405 may be performed by a signal receiver as described with reference to FIGS. 15 through 18.

At 2410 the UE 115 may scan for communications activity within the frequency band, wherein scanning for communications activity within the frequency band comprises performing a correlation calculation on samples of the signal. The operations of 2410 may be performed according to the methods described herein. In certain examples, aspects of the operations of 2410 may be performed by a communications activity scanner as described with reference to FIG. 17 or 18.

At 2415 the UE 115 may determine whether to attempt a connection establishment within the frequency band based at least in part on the correlation calculation on samples of the signal. The operations of 2415 may be performed according to the methods described herein. In certain examples, aspects of the operations of 2415 may be performed by a connection establishment component as described with reference to FIGS. 15 through 18.

Figure 25:
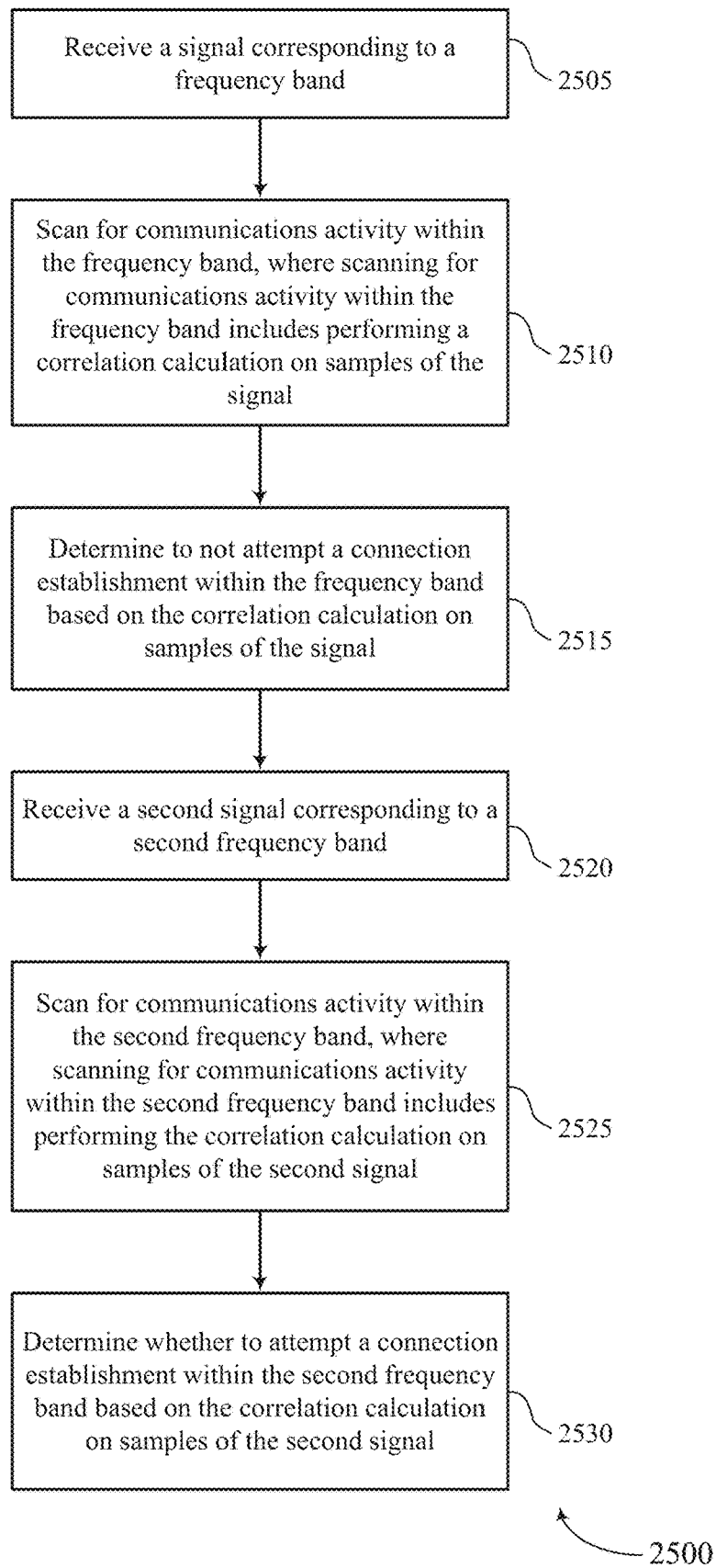

FIG. 25 shows a flowchart illustrating a method 2500 for correlation-enhanced frequency scanning in accordance with aspects of the present disclosure. The operations of method 2500 may be implemented by a UE 115 or its components as described herein. For example, the operations of method 2500 may be performed by a wireless communications manager as described with reference to FIGS. 14 through 19. In some examples, a UE 115 may execute a set of instructions to control the functional elements of the device to perform the functions described below. Additionally or alternatively, the UE 115 may perform aspects of the functions described below using special-purpose hardware.

At 2505 the UE 115 may receive a signal corresponding to a frequency band. The operations of 2505 may be performed according to the methods described herein. In certain examples, aspects of the operations of 2505 may be performed by a signal receiver as described with reference to FIGS. 15 through 18.

At 2510 the UE 115 may scan for communications activity within the frequency band, wherein scanning for communications activity within the frequency band comprises performing a correlation calculation on samples of the signal. The operations of 2510 may be performed according to the methods described herein. In certain examples, aspects of the operations of 2510 may be performed by a communications activity scanner as described with reference to FIG. 17 or 18.

At 2515 the UE 115 may determine to not attempt a connection establishment within the frequency band based at least in part on the correlation calculation on samples of the signal. The operations of 2515 may be performed according to the methods described herein. In certain examples, aspects of the operations of 2515 may be performed by a connection establishment component as described with reference to FIGS. 15 through 18.

At 2520 the UE 115 may receive a second signal corresponding to a second frequency band. The operations of 2520 may be performed according to the methods described herein. In certain examples, aspects of the operations of 2520 may be performed by a signal receiver as described with reference to FIGS. 15 through 18.

At 2525 the UE 115 may scan for communications activity within the second frequency band, wherein scanning for communications activity within the second frequency band comprises performing the correlation calculation on samples of the second signal. The operations of 2525 may be performed according to the methods described herein. In certain examples, aspects of the operations of 2525 may be performed by a communications activity scanner as described with reference to FIG. 17 or 18.

At 2530 the UE 115 may determine whether to attempt a connection establishment within the second frequency band based at least in part on the correlation calculation on samples of the second signal. The operations of 2530 may be performed according to the methods described herein. In certain examples, aspects of the operations of 2530 may be performed by a connection establishment component as described with reference to FIGS. 15 through 18.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a signal corresponding to a frequency band;
   scanning for communications activity within the frequency band, wherein scanning for communications activity within the frequency band comprises performing a correlation calculation between samples of the signal of each of a plurality of first sampling intervals and samples of the signal of a respective one of a plurality of second sampling intervals, wherein each of the plurality of first sampling intervals and the respective one of the plurality of second sampling intervals is associated with a respective one of a plurality of correlation pairs; and
   determining whether to attempt a connection establishment within the frequency band based at least in part on the correlation calculation.

2. The method of claim 1, wherein scanning for communications activity within the frequency band comprises:
   applying a weight to results of the correlation calculation associated with each of the plurality of correlation pairs, wherein the weight is based at least in part on load condition associated with the respective one of the plurality of correlation pairs, a signal quality associated with the respective one of the plurality of correlation pairs, or a combination thereof.

3. The method of claim 1, wherein each of the plurality of correlation pairs is associated with one of a plurality of lags, each of the plurality of lags corresponding to a different sampling time shift that is shorter than a correlation period between a beginning of one of the plurality of first sampling intervals and a beginning of the respective one of the plurality of second sampling intervals associated with one of the plurality of correlation pairs.

4. The method of claim 3, wherein scanning for communications activity within the frequency band comprises:
summing, for each of the plurality of lags, the results of the correlation calculation for correlation pairs associated with the respective one of the plurality of lags.

5. The method of claim 4, wherein:
receiving the signal corresponding to the frequency band comprises receiving the signal via a plurality of antennas; and
summing, for each of the plurality of lags, the results of the correlation calculation comprises summing results of the correlation calculation for correlation pairs for each of the plurality of antennas.

6. The method of claim 4, wherein:
receiving the signal corresponding to the frequency band comprises receiving the signal across a plurality of correlation windows that are consecutive in the time domain; and
summing, for each of the plurality of lags, the results of the correlation calculation comprises summing results of the correlation calculation for correlation pairs for each of the plurality of correlation windows.

7. The method of claim 4, wherein scanning for communications activity within the frequency band comprises:
determining a detection metric by dividing a maximum of the summed correlation calculation results for each of the plurality of lags by an average of summed correlation calculation results for each of the plurality of lags; and
determining a first indication of communications activity within the frequency band based at least in part on the detection metric.

8. The method of claim 7, wherein the first indication of communications activity within the frequency band does not indicate activity within the frequency band, and wherein scanning for communications activity within the frequency band further comprises:
processing, according to a plurality of correlation windows, results of performing the correlation calculation between the samples of each of the plurality of first sampling intervals and the samples of the respective one of the plurality of second sampling intervals;
applying a comb filter to the results processed according to the plurality of correlation windows; and
determining a second indication of communications activity within the frequency band based at least in part on the comb filtered results.

9. The method of claim 1, wherein scanning for communications activity within the frequency band comprises:
processing, according to a plurality of correlation windows that are consecutive in the time domain, results of performing the correlation calculation between the samples of each of the plurality of first sampling intervals and the samples of a respective one of the plurality of second sampling intervals; and
applying a comb filter to the results processed according to the plurality of correlation windows.

10. The method of claim 9, wherein the comb filter is configured according to a timing of cell-specific reference signal (CRS) transmissions.

11. The method of claim 9, wherein the comb filter is configured according to one or more uplink/downlink (UL/DL) time-division duplexing (TDD) configurations.

12. The method of claim 9, wherein applying the comb filter is performed after determining an initial indication of inactivity on the frequency band.

13. The method of claim 9, wherein scanning for communications activity within the frequency band comprises:
determining a detection metric for each of a plurality of positions of the comb filter, wherein determining the detection metric comprises dividing a result of the correlation calculation for the respective one of the plurality of positions of the comb filter by an average result of the correlation calculation for the plurality of positions of the comb filter; and
determining an indication of communications activity within the frequency band based at least in part on a maximum detection metric from the detection metrics determined for each the plurality of positions of the comb filter.

14. The method of claim 1, wherein, for each of the plurality of correlation pairs, a beginning of the respective one of the plurality of first sampling intervals and a beginning of the respective one of the plurality of second sampling intervals is separated in time by a correlation period equal to a cyclic prefix repetition period.

15. The method of claim 1, wherein scanning for communications activity within the frequency band comprises:
generating the samples of each of the plurality of first sampling intervals to span a sampling frequency bandwidth; and
generating the samples of each of the plurality of second sampling intervals to span the sampling frequency bandwidth.

16. The method of claim 15, wherein the sampling frequency bandwidth is greater than a bandwidth of a subcarrier.

17. The method of claim 1, wherein determining whether to attempt a connection establishment within the frequency band comprises determining to not attempt a connection establishment within the frequency band, the method further comprising:
receiving a second signal corresponding to a second frequency band;
scanning for communications activity within the second frequency band, wherein scanning for communications activity within the second frequency band comprises performing the correlation calculation on samples of the second signal; and
determining whether to attempt a connection establishment within the second frequency band based at least in part on the correlation calculation on samples of the second signal.

18. The method of claim 1, wherein determining whether to attempt a connection establishment within the frequency band comprises determining to attempt a connection establishment within the frequency band, the method further comprising:
attempting to establish a connection with a base station over a channel within the frequency band.

19. An apparatus for wireless communication, comprising:
a processor;
memory in electronic communication with the processor; and
instructions stored in the memory and executable by the processor to cause the apparatus to:
receive a signal corresponding to a frequency band;
scan for communications activity within the frequency band, wherein scanning for communications activity within the frequency band comprises performing a correlation calculation between samples of the signal of each of a plurality of first sampling intervals and samples of the signal of a respective one of a plurality of second sampling intervals, wherein each of the plurality of first sampling intervals and the respective one of the plurality of second sampling intervals is associated with a respective one of a plurality of correlation pairs; and determine whether to attempt a connection establishment within the frequency band based at least in part on the correlation calculation.

20. The apparatus of claim 19, wherein each of the plurality of correlation pairs is associated with one of a plurality of lags, each of the plurality of lags corresponding to a different sampling time shift that is shorter than a correlation period between a beginning of one of the plurality of first sampling intervals and a beginning of the respective one of the plurality of second sampling intervals associated with one of the plurality of correlation pairs.

21. The apparatus of claim 20, wherein the instructions to scan for communications activity within the frequency band are executable by the processor to cause the apparatus to:
sum, for each of the plurality of lags, the results of the correlation calculation for correlation pairs associated with the respective one of the plurality of lags.

22. The apparatus of claim 21, wherein:
the instructions to receive the signal corresponding to the frequency band comprises are executable by the processor to cause the apparatus to receive the signal via a plurality of antennas; and
the instructions to sum, for each of the plurality of lags, the results of the correlation calculation are executable by the processor to cause the apparatus to sum results of the correlation calculation for correlation pairs for each of the plurality of antennas.

23. The apparatus of claim 19, wherein the instructions to scan for communications activity within the frequency band are executable by the processor to cause the apparatus to:
process, according to a plurality of correlation windows that are consecutive in the time domain, results of performing the correlation calculation between the samples of each of the plurality of first sampling intervals and the samples of a respective one of the plurality of second sampling intervals; and
apply a comb filter to the results processed according to the plurality of correlation windows.

24. The apparatus of claim 23, wherein the comb filter is configured according to a timing of cell-specific reference signal (CRS) transmissions.

25. The apparatus of claim 23, wherein the comb filter is configured according to one or more uplink/downlink (UL/DL) time-division duplexing (TDD) configurations.

26. The apparatus of claim 19, wherein, for each of the plurality of correlation pairs, a beginning of the respective one of the plurality of first sampling intervals and a beginning of the respective one of the plurality of second sampling intervals is separated in time by a correlation period equal to a cyclic prefix repetition period.

27. An apparatus for wireless communication, comprising:
means for receiving a signal corresponding to a frequency band;
means for scanning for communications activity within the frequency band, wherein scanning for communications activity within the frequency band comprises performing a correlation calculation between samples of the signal of each of a plurality of first sampling intervals and samples of the signal of the respective one of a plurality of second sampling intervals, wherein each of the plurality of first sampling intervals and the respective one of the plurality of second sampling intervals is associated with a respective one of a plurality of correlation pairs; and
means for determining whether to attempt a connection establishment within the frequency band based at least in part on the correlation calculation.

28. A non-transitory computer-readable medium storing code for wireless communication, the code comprising instructions executable by a processor to:
receive a signal corresponding to a frequency band;
scan for communications activity within the frequency band, wherein scanning for communications activity within the frequency band comprises performing a correlation calculation between samples of the signal of each of a plurality of first sampling intervals and samples of the signal of a respective one of a plurality of second sampling intervals, wherein each of the plurality of first sampling intervals and the respective one of the plurality of second sampling intervals is associated with a respective one of a plurality of correlation pairs; and
determine whether to attempt a connection establishment within the frequency band based at least in part on the correlation calculation.

* * * * *